United States Patent
Kimura et al.

(10) Patent No.: US 10,523,382 B2
(45) Date of Patent: Dec. 31, 2019

(54) COMMUNICATION CONTROL DEVICE, COMMUNICATION CONTROL METHOD, AND PROGRAM

(71) Applicant: SONY CORPORATION, Tokyo (JP)

(72) Inventors: Ryota Kimura, Tokyo (JP); Ryo Sawai, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/325,836

(22) PCT Filed: Jun. 11, 2015

(86) PCT No.: PCT/JP2015/066824
§ 371 (c)(1),
(2) Date: Jan. 12, 2017

(87) PCT Pub. No.: WO2016/031343
PCT Pub. Date: Mar. 3, 2016

(65) Prior Publication Data
US 2017/0163391 A1     Jun. 8, 2017

(30) Foreign Application Priority Data

Aug. 28, 2014 (JP) .................................. 2014-173848

(51) Int. Cl.
*H04W 4/00* (2018.01)
*H04L 5/00* (2006.01)
(Continued)

(52) U.S. Cl.
CPC ........... *H04L 5/0012* (2013.01); *H04W 16/14* (2013.01); *H04W 72/04* (2013.01);
(Continued)

(58) Field of Classification Search
USPC ....... 370/201, 229, 230, 252, 328, 329, 330, 370/343
See application file for complete search history.

(56) References Cited

U.S. PATENT DOCUMENTS

| | | | |
|---|---|---|---|
| 5,394,433 A * | 2/1995 | Bantz ..................... | H04B 1/713 375/132 |
| 6,275,518 B1 * | 8/2001 | Takahashi .............. | H04B 1/715 370/321 |

(Continued)

FOREIGN PATENT DOCUMENTS

| | | |
|---|---|---|
| CN | 101145833 A | 3/2008 |
| JP | HEI 08-204615 A | 8/1996 |

(Continued)

OTHER PUBLICATIONS

International Search Report dated Sep. 1, 2015 in PCT/JP2015/066824 filed Jun. 11, 2015.

(Continued)

*Primary Examiner* — Kwang B Yao
*Assistant Examiner* — Nguyen H Ngo
(74) *Attorney, Agent, or Firm* — Xsensus LLP

(57) ABSTRACT

A communication control device, a communication control method, and a program which can reduce interference caused among different radio systems. The communication control device includes: a communication unit configured to communicate with an apparatus belonging to a first radio network; and a control unit configured to control whether or not a radio communication apparatus belonging to the first radio network performs frequency hopping based on information of a second radio network different from the first radio network.

24 Claims, 60 Drawing Sheets

(51) Int. Cl.
*H04W 16/14* (2009.01)
*H04W 72/04* (2009.01)
*H04W 72/10* (2009.01)

(52) U.S. Cl.
CPC ... *H04W 72/0446* (2013.01); *H04W 72/0453* (2013.01); *H04W 72/10* (2013.01)

(56) References Cited

U.S. PATENT DOCUMENTS

| | | | | |
|---|---|---|---|---|
| 7,054,301 | B1* | 5/2006 | Sousa | H04B 1/715 370/343 |
| 8,428,101 | B1* | 4/2013 | Sarca | H04B 1/713 370/330 |
| 2005/0195883 | A1* | 9/2005 | Choi | H04B 1/7176 375/130 |
| 2005/0254555 | A1* | 11/2005 | Teague | H04B 1/715 375/136 |
| 2006/0013285 | A1* | 1/2006 | Kobayashi | H04B 1/7143 375/132 |
| 2007/0064770 | A1* | 3/2007 | Horiguchi | H04B 1/715 375/133 |
| 2008/0069275 | A1* | 3/2008 | Horiguchi | H04B 7/10 375/347 |
| 2009/0011767 | A1* | 1/2009 | Malladi | H04B 1/713 455/450 |
| 2011/0064117 | A1* | 3/2011 | Subramanian | H04B 1/713 375/135 |
| 2012/0052827 | A1 | 3/2012 | Sadek et al. | |
| 2012/0142386 | A1 | 6/2012 | Mody et al. | |
| 2013/0077497 | A1* | 3/2013 | Bae | H04W 74/0858 370/241 |
| 2013/0171984 | A1* | 7/2013 | Nakata | H04W 16/16 455/422.1 |
| 2013/0308685 | A1* | 11/2013 | Nagai | H04W 72/02 375/133 |
| 2014/0056288 | A1* | 2/2014 | Wyper | H04W 88/06 370/336 |
| 2014/0133520 | A1* | 5/2014 | Khan | H04B 1/7143 375/133 |
| 2014/0269334 | A1* | 9/2014 | Karschnia | H04B 1/713 370/241 |
| 2014/0302882 | A1* | 10/2014 | Webb | H04W 72/082 455/509 |
| 2015/0009843 | A1* | 1/2015 | Takahashi | H04J 11/0059 370/252 |
| 2015/0223243 | A1* | 8/2015 | Tabet | H04W 28/085 370/330 |
| 2016/0020822 | A1* | 1/2016 | Li | H04B 1/715 375/133 |

FOREIGN PATENT DOCUMENTS

| | | |
|---|---|---|
| JP | 2008-72646 A | 3/2008 |
| JP | 2012-151815 A | 8/2012 |
| JP | 2013-523013 A | 6/2013 |
| JP | 2013-538524 A | 10/2013 |
| WO | WO 2008/137777 A1 | 11/2008 |

OTHER PUBLICATIONS

Extended European Search Report dated Feb. 28, 2018 in Patent Application No. 15836751.6.
Japanese Office Action dated Feb. 26, 2019, issued in corresponding Japanese Patent Application No. 2016-545005.
Office Action dated Sep. 10, 2019, issued in corresponding Chinese Patent Application No. 201580044512.0, 16 pages with English Translation.

* cited by examiner

COMMUNICATION CONTROL DEVICE, COMMUNICATION CONTROL METHOD, AND PROGRAM

TECHNICAL FIELD

The present disclosure relates to a communication control device, a communication control method, and a program.

BACKGROUND ART

In recent years, a radio system which transmits information via radio communication is used in various situations. The radio system includes, for example, a cellular system, a satellite broadcasting system, a wireless local area network (LAN) system, a TV broadcasting system, a radio broadcasting system, or the like. There is a case where, in such radio systems, in the case where frequency bands utilized overlap with each other, radio transmission interferes with each other. It is therefore desire to provide a technology for avoiding interference among different radio systems.

For example, the following Patent Literature 1 discloses a technology of avoiding a primary system from being fatally interfered in the case where there are a plurality of secondary systems upon secondary utilization of a frequency band.

CITATION LIST

Patent Literature

Patent Literature 1: JP 2012-151815A

DISCLOSURE OF INVENTION

Technical Problem

Nowadays, as a radio system becomes widespread and is utilized more densely, it is desired to further improve a technology for avoiding interference among radio systems. Therefore, the present disclosure proposes new and improved communication control device, communication control method and program which can reduce interference caused among different radio systems.

Solution to Problem

According to the present disclosure, there is provided a communication control device including: a communication unit configured to communicate with an apparatus belonging to a first radio network; and a control unit configured to control whether or not a radio communication apparatus belonging to the first radio network performs frequency hopping based on information of a second radio network different from the first radio network.

According to the present disclosure, there is provided a communication control method including: communicating with an apparatus belonging to a first radio network; and controlling whether or not a radio communication apparatus belonging to the first radio network performs frequency hopping based on information of a second radio network different from the first radio network.

According to the present disclosure, there is provided a program causing a computer to function as: a communication unit configured to communicate with an apparatus belonging to a first radio network; and a control unit configured to control whether or not a radio communication apparatus belonging to the first radio network performs frequency hopping based on information of a second radio network different from the first radio network.

Advantageous Effects of Invention

As described above, according to the present disclosure, it is possible to reduce interference caused among different radio systems. Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
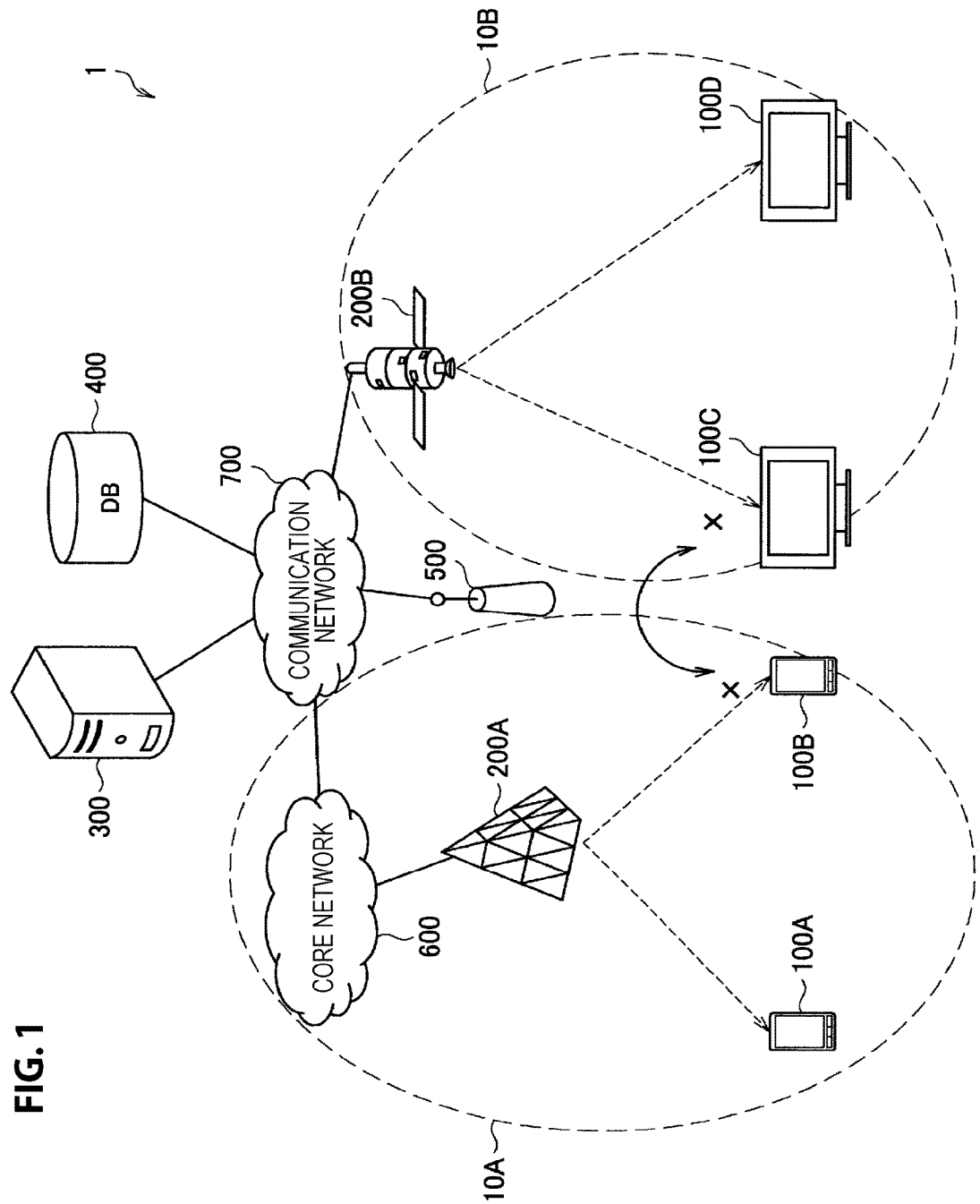
FIG. 1 is an explanatory diagram for explaining outline of a communication system according to an embodiment of the present disclosure.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as receiving stations 100A, 100B, 100C, and so on as appropriate. On the other hand, when not particularly distinguishing each of multiple elements having substantially the same function and structure, only the same sign will be given. For example, the receiving stations 100A, 100B, 100C will be simply designated as the receiving station 100 when not being particularly distinguished.

Note that description will be provided in the following order.
1. Outline
2. Configuration example
2-1. Receiving station
2-2. Transmitting station
2-3. Communication control device
2-4. DB
2-5. Sensor apparatus
3. Operation processing
3-1. Radio system control processing
3-2. Operation mode decision processing
3-3. Network information acquisition processing
3-4. Interference determination processing
3-5. Overlapping determination processing of use frequency bands
3-6. Temporal change determination processing of use frequency band
3-7. Frequency hopping setting decision processing
3-8. DB registration information registration processing
3-9. Transmission setting switching processing
4. Application examples
5. Conclusion 1. Outline FIG. 1 is an explanatory diagram for explaining outline of a communication system according to an embodiment of the present disclosure. As illustrated in FIG. 1, a communication system 1 according to the present embodiment includes a plurality of radio systems 10.

Each radio system 10 includes one or more receiving stations 100 and one or more transmitting stations 200. The receiving station 100 is a radio communication apparatus which receives data transmitted from the transmitting station 200. More accurately, the receiving station 100 is a radio communication apparatus which receives data which is transmitted from the transmitting station 200 while frequency hopping is performed. For example, the receiving station 100 is a user terminal (user equipment (UE)) in a cellular system, a client apparatus in a wireless LAN system or a TV receiver in a terrestrial broadcasting system or a satellite broadcasting system. The transmitting station 200 is an apparatus which transmits data to the receiving station 100. More accurately, the transmitting station 200 is an apparatus which transmits data to the receiving station 100 while performing frequency hopping. For example, the transmitting station 200 is a base station (evolutional Node B (eNB)) in a cellular system, a base station (access point) in a wireless LAN system, a tower in a terrestrial broadcasting system or a satellite in a satellite broadcasting system. Note that there is a case where one apparatus functions as one of the receiving station 100 and the transmitting station 200 or a case where one apparatus functions as both the receiving station 100 and the transmitting station 200. For example, the UE can function as the receiving station 100 which receives data from the eNB in downlink and can function as the transmitting station 200 which transmits data to the eNB in uplink.

Here, as illustrated in FIG. 1, the communication system 1 according to the present embodiment includes a plurality of different radio systems 10.

For example, a radio system 10A is a cellular system complying with LTE, LTE-Advanced or a communication scheme equivalent to these. The radio system 10A includes one or more receiving stations 100 (that is, a receiving station 100A and a receiving station 100B), a transmitting station 200A and a core network 600. In the example illustrated in FIG. 1, the receiving stations 100A and 100b are UEs, and the transmitting station 200 is an eNB. There may be a relay node or small cell (including a femtocell, a nano cell, a pico cell, a micro cell, or the like) base station between the UE 100 and the eNB 200. Further, the eNB 200 may function as a macro cell base station, and the UE 100 may function as a small cell base station. The core network 600 can include a communication node such as a router, a mobility management entity (MME), a serving gateway (S-GW), a packet data network gateway (P-GW), a policy and charging rule function (PCRF) and a home eNodeB gateway (HeNB-GW). Note that, inversely with the example illustrated in FIG. 1, the UE may function as the transmitting station 200, and the eNB may function as the receiving station 100.

For example, the radio system 10B is a satellite broadcasting system. The radio system 10B includes one or more receiving stations 100 (that is, a receiving station 100C and a receiving station 100D), and a transmitting station 200B.

In the example illustrated in FIG. 1, the receiving stations 100C and 100D are TV receivers, and the transmitting station 200 is a satellite. Note that, inversely with the example illustrated in FIG. 1, the TV receiver may function as the transmitting station 200, and the satellite may function as the receiving station 100.

The communication system 1 can include an arbitrary radio system such as, for example, a wireless LAN system, a TV broadcasting (terrestrial broadcasting) system, a radio broadcasting system and a radar system, other than the examples illustrated in FIG. 1.

There is a case where use frequency bands overlap with each other among the plurality of radio systems 10 included in the communication system 1. Overlapping of the frequency bands can occur, for example, in the case where, as in TV white space, a frequency band assigned to the TV broadcasting system is secondarily utilized by another radio system 10 with low priority. Secondary utilization of the frequency refers to secondary utilization of part or all of frequency channels preferentially assigned to one system, by another system. Typically, a system to which a frequency channel is preferentially assigned is referred to as a primary system, and a system which secondarily utilizes the frequency channel is referred to as a secondary system. Secondary utilization of a frequency has been discussed as one of measures for mitigating depletion of frequency resources in the future.

As another example of such discussion, for example, in the U.S., frequency operation of sharing the same frequency band among a plurality of radio systems having different priority (also referred to as Tier) has been studied. For example, in study of "the U.S. FCC, "GN Docket No. 12-354 NOTICE OF PROPOSED RULEMAKING AND ORDER", December 2012", a 3.5 GHz which is used as non-federal fixed-satellite service and radar of the Department of Defense is proposed as a candidate for a band of such frequency operation. Further, the study is carried out assuming that a database which provides channel information, location information and priority information relating to a frequency band to be operated, which is called a spectrum access system (SAS) is employed.

In the case where frequency bands overlap with each other as in secondary utilization of the frequency, there is a case where radio transmission interferes with each other among different radio systems 10. Therefore, in the communication system 1 according to the present disclosure, interference among different radio systems 10 is avoided by the communication control device 300 controlling whether or not frequency hopping is performed when each radio system 10 performs radio transmission. Note that frequency hopping refers to the receiving station 100 utilizing a frequency resource while switching a plurality of frequency resources within a time unit assigned to communication of one transmitting station 200 (user)

The communication control device 300 is an apparatus which controls radio communication in the plurality of radio systems 10 included in the communication system 1. In the example illustrated in FIG. 1, the communication control device 300 is a server. The server 300 controls radio communication in each radio system 10 based on information of a radio network (hereinafter, also referred to as network information) operated by each radio system 10. The network information can include, for example, information indicating a frequency band utilized by the radio system 10, information indicating a communication area, a communication time slot, or the like. The server 300 acquires this network information from, for example, the DB 400 or the sensor apparatus 500 via a communication network 700. Note that, other than the examples illustrated in FIG. 1, for example, the communication control device may be implemented as the receiving station 100, the transmitting station 200, the DB 400, the sensor apparatus 500, or an arbitrary apparatus (a physical apparatus or a logical apparatus) other than these. Further, a plurality of communication control devices 300 may be provided within the communication system 1. For example, the communication control device 300 may be provided for each radio system 10. Note that a radio system 10 whose radio communication is to be controlled by the communication control device 300 will be also referred to as a radio system 10 to be controlled in the following description.

The communication network 700 is a wired or wireless communication network such as, for example, a packet data network (PDN) and the Internet.

The DB 400 is a storage apparatus which stores network information. The DB 400 registers/updates the network information received from each radio system 10 and transmits the network information in response to an inquiry. Note that, hereinafter, the network information stored in the DB 400 will be also referred to as DB registration information.

The sensor apparatus 500 is an apparatus which senses frequency utilization situations by the surrounding radio systems 10 to collect network information. Hereinafter, the network information collected by the sensor apparatus 500 will be also referred to as sensing information. Note that the DB registration information is the same type of information as that of the sensing information, or the DB registration information is a different type of information from that of the sensing information. Further, other than the example illustrated in FIG. 1, for example, the sensor apparatus may be implemented as the receiving station 100, the transmitting station 200 or an arbitrary apparatus (a physical apparatus or a logical apparatus) other than these apparatuses. Further, the sensor apparatus 500 may be provided independently from each radio system 10 or may belong to each radio system 10.

The outline of the communication system 1 according to the present embodiment has been described above.

2. Configuration Example

Subsequently, a configuration example of each component included in the communication system 1 according to the present embodiment will be described with reference to FIG. 2 to FIG. 33.

2-1. Receiving Station

Figure 2:
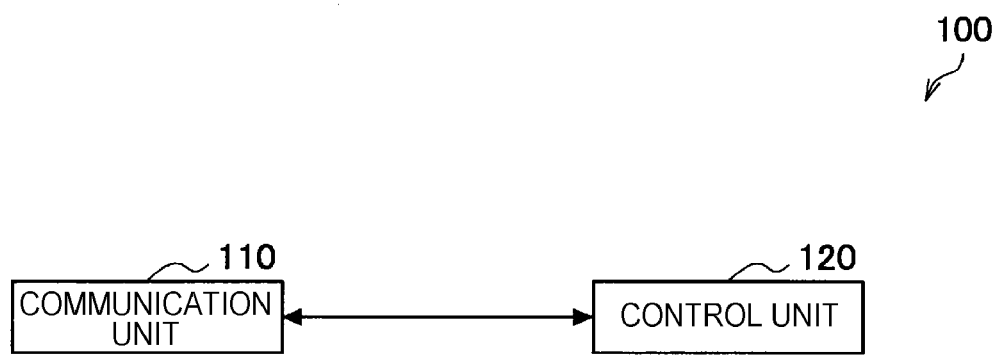
FIG. 2 is a block diagram illustrating an example of a logical configuration of a receiving station according to the present embodiment.

FIG. 2 is a block diagram illustrating an example of a logical configuration of the receiving station 100 according to the present embodiment. As illustrated in FIG. 2, the receiving station 100 according to the present embodiment includes a communication unit 110 and a control unit 120.

2-1-1. Communication Unit

The communication unit 110 is a communication interface which mediates communication between the receiving station 100 and other apparatuses. The communication unit 110 transmits/receives data with other apparatuses in a wired or wireless manner.

For example, the communication unit 110 functions as a radio communication unit which performs radio communication with the transmitting station 200. In this case, for example, the communication unit 110 receives a radio signal transmitted from the transmitting station 200 while frequency hopping is performed. The communication unit 110 may have a function as an amplifier, a frequency converter, a demodulator, or the like, and, for example, can output the received data to the control unit 120. In addition, the communication unit 110 may transmit a radio signal to the transmitting station 200 through an antenna. The communication unit 110 may have a function as a modulator, an amplifier, or the like, and, for example, may perform modulation, power amplification, or the like, on the data output from the control unit 120 and transmit the data.

In addition, the communication unit 110 transmits/receives data to/from the communication control device 300, the DB 400 or the sensor apparatus 500 in a wired/wireless manner.

(Sensing Function)

The communication unit 110 may have a function as the sensor apparatus 500 which will be described later. For example, the communication unit 110 acquires sensing information by measuring a reception radio wave level (strength) concerning a use frequency band of the radio system 10 to which the receiving station 100 itself belongs. For example, the communication unit 110 receives a request for the network information from the communication control device 300 and transmits the sensing information acquired by the communication unit 110 to the communication control device 300 directly or indirectly via an arbitrary communication node such as the transmitting station 200.

(Data Reception Function)

The communication unit 110 receives data transmitted from the transmitting station 200. As will be described later, the transmitting station 200 can transmit data while performing frequency hopping based on frequency hopping setting information. In this case, the communication unit 110 receives the data transmitted from the transmitting station 200 based on the frequency hopping setting information. More specifically, the communication unit 110 performs reception and decoding for a radio resource portion according to a frequency hopping pattern used by the transmitting station 200. Note that the frequency hopping setting information is information relating to frequency hopping performed by the transmitting station 200 belonging to the radio system 10 to be controlled. More detailed description will be provided later.

The communication unit 110 receives the frequency hopping setting information from the communication control device 300 directly or indirectly via an arbitrary communication node such as the transmitting station 200. Further, the communication unit 110 may notify the transmitting station 200 of the frequency hopping setting information acquired from the communication control device 300. The receiving station 100 performs this notification, for example, in the case where a base station of a cellular system is implemented as the receiving station 100, and a user terminal is implemented as the transmitting station 200. A frequency hopping setting information notification function will be described in detail later in description regarding the transmitting station 200.

2-1-2. Control Unit

The control unit 120, which functions as an arithmetic processing apparatus and a control apparatus, controls the whole operation within the receiving station 100 according to various kinds of programs. The control unit 120 is implemented with an electronic circuit such as, for example, a central processing unit (CPU) and a microprocessor. Note that the control unit 120 may include a read only memory (ROM) which stores a program, an operation parameter, or the like, to be used and a random access memory (RAM) which temporarily stores a parameter, or the like, which changes as appropriate.

For example, the control unit 120 controls the receiving station 100 to receive the data transmitted by the transmitting station 200 while frequency hopping is performed, based on the frequency hopping setting information acquired from the communication control device 300. Specifically, the control unit 120 controls the communication unit 110 to perform decoding processing assuming that the transmitting station 200 performs data transmission while performing frequency hopping using the frequency hopping setting information.

For example, the control unit 120 controls the communication unit 110 to acquire sensing information. In this event, the control unit 120 may control the communication unit 110 to acquire the sensing information periodically or control the communication unit 110 to acquire the sensing information by being triggered by reception of a request from the server 300. The control unit 120 controls the communication unit 110 to transmit the acquired sensing information to the communication control device 300 periodically or in response to a request. Note that, in the case where the receiving station 100 is implemented as, for example, a user terminal of a cellular system, an uplink control channel (PUCCH) or an uplink data channel (PUSCH) is utilized for transmitting the sensing information to the transmitting station 200.

Note that the control unit 120 can have a function as a control unit 320 of the communication control device 300 which will be described later.

2-2. Transmitting Station

Figure 3:
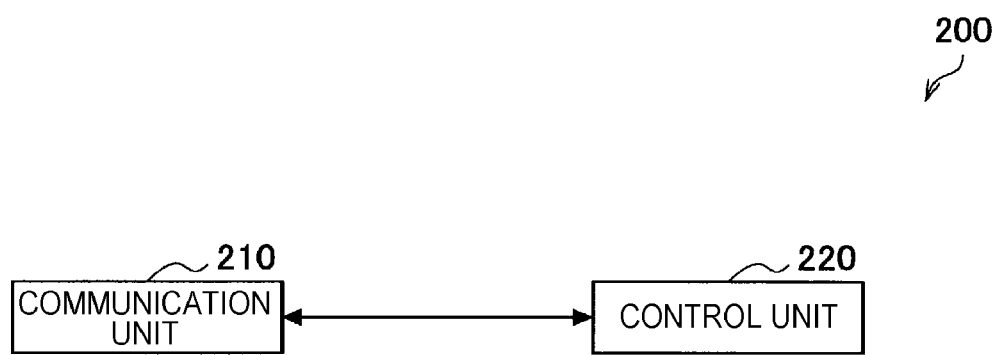
FIG. 3 is a block diagram illustrating an example of a logical configuration of a transmitting station according to the present embodiment.

FIG. 3 is a block diagram illustrating an example of a logical configuration of the transmitting station 200 according to the present embodiment. As illustrated in FIG. 3, the transmitting station 200 according to the present embodiment includes a communication unit 210 and a control unit 220.

[2-2-1. Communication Unit]

The communication unit 210 is a communication interface which mediates communication between the transmitting station 200 and other apparatuses. The communication unit 210 transmits/receives data to/from other apparatuses in a wired or wireless manner.

For example, the communication unit 210 functions as a radio communication unit which performs radio communication with the receiving station 100. In this case, for example, the communication unit 210 transmits a radio signal subjected to frequency hopping to the receiving station 100 via an antenna. The communication unit 210 may have a function as a modulator, an amplifier, or the like, and, for example, may perform modulation, power amplification, or the like, on the data output from the control unit 220 and transmit the data. Further, the communication unit 210 may receive a radio signal transmitted from the receiving station 100. The communication unit 210 may have a function as an amplifier, a frequency converter, a demodulator, or the like, and, for example, can output the received data to the control unit 220.

In addition, the communication unit 210 transmits/receives data to/from the communication control device 300, the DB 400 or the sensor apparatus 500 in a wired/wireless manner.

(Sensing Function)

The communication unit 210 may have a function as a sensor apparatus 500 which will be described later. For example, the communication unit 210 acquires the sensing information by measuring a reception radio wave level concerning a frequency band utilized at the radio system 10 to which the transmitting station 200 itself belongs. For example, the communication unit 210 receives a request for the network information from the communication control device 300 and transmits the sensing information acquired by the communication unit 210 to the communication control device 300 directly or indirectly via an arbitrary communication node such as the receiving station 100.

(Frequency Hopping Function)

The communication unit 210 transmits data to the receiving station 100. In this event, the transmitting station 200 can transmit data while performing frequency hopping based on an instruction from the communication control device 300. More specifically, the communication unit 210 performs frequency hopping based on the frequency hopping setting information received from the communication control device 300. The frequency hopping can be executed in various units. An example of the units will be described below.

<Frequency Direction>
 subcarrier unit
 subcarrier block unit (such as a resource block)
 frequency channel unit (a component carrier of carrier aggregation, a channel of channel bonding)
<Time Direction>
 symbol unit (such as a digital modulation symbol and an OFDM/SC-FDMA symbol)
 symbol block unit (such as a block of a plurality of symbols and a slot)
 frame unit (such as a subframe and a packet)
 frame block unit (such as a radio frame)
 unit of further upper layer (such as an IP packet and a session)

The communication unit 210 performs frequency hopping by utilizing a radio resource according to a rule indicated in the frequency hopping setting information. Hereinafter, a utilization rule of the radio resource will be also referred to as a frequency hopping pattern. An example of the frequency hopping pattern is illustrated in FIG. 4 to FIG. 6.

Figure 4:
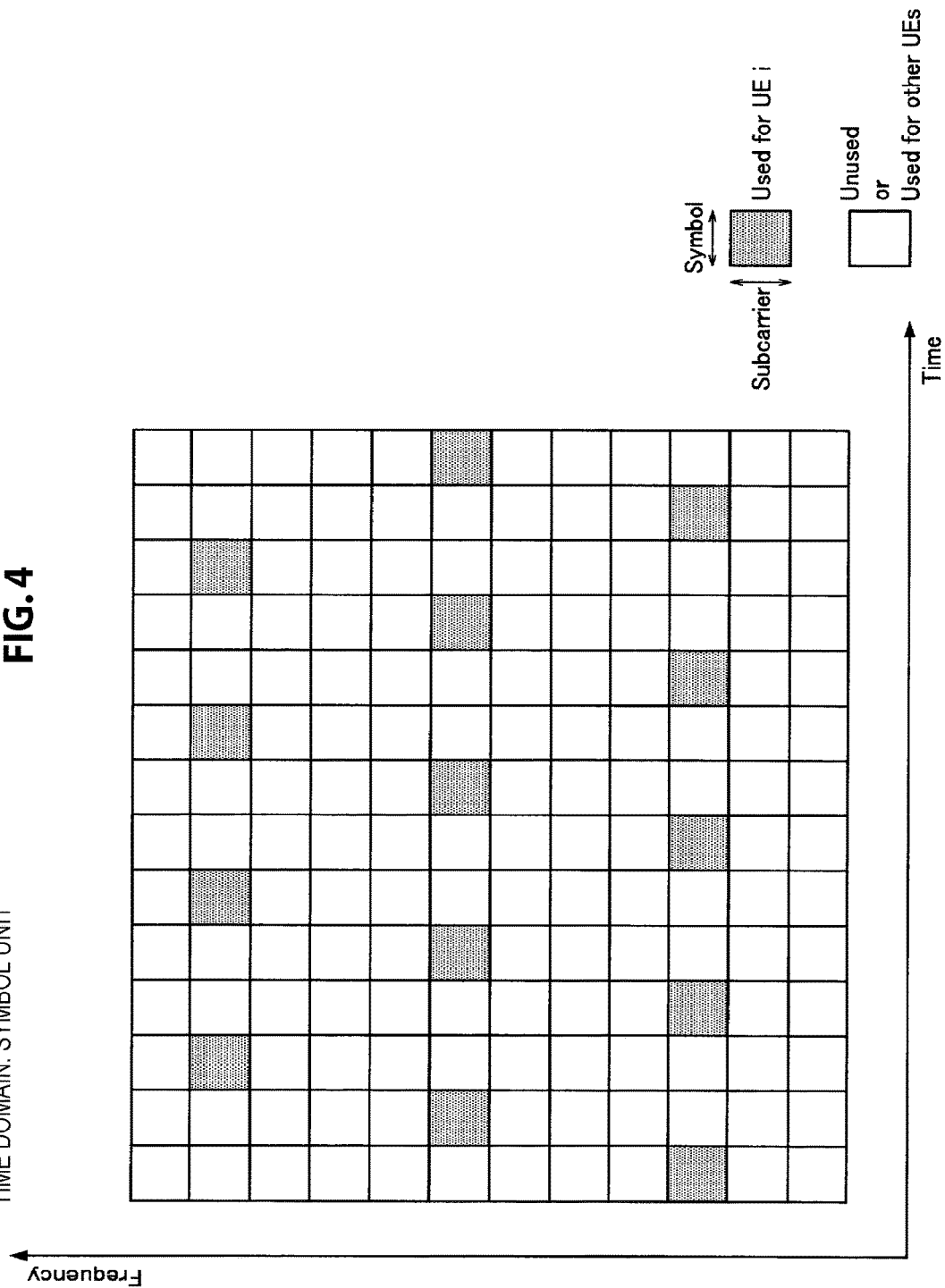
FIG. 4 is an explanatory diagram for explaining an example of a frequency hopping pattern in a radio system to be controlled according to the present embodiment.
Figure 5:
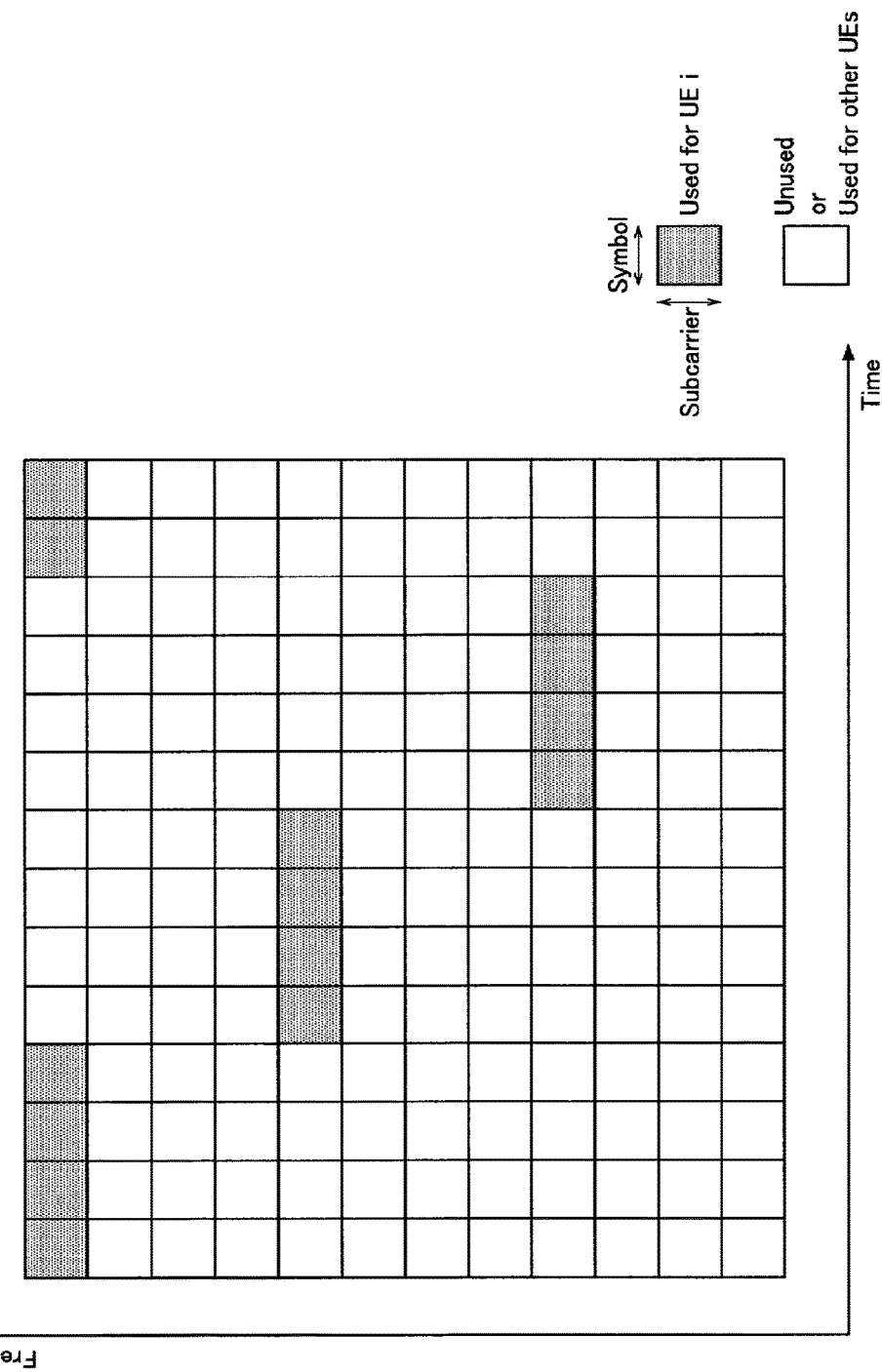
FIG. 5 is an explanatory diagram for explaining an example of a frequency hopping pattern in a radio system to be controlled according to the present embodiment.
Figure 6:
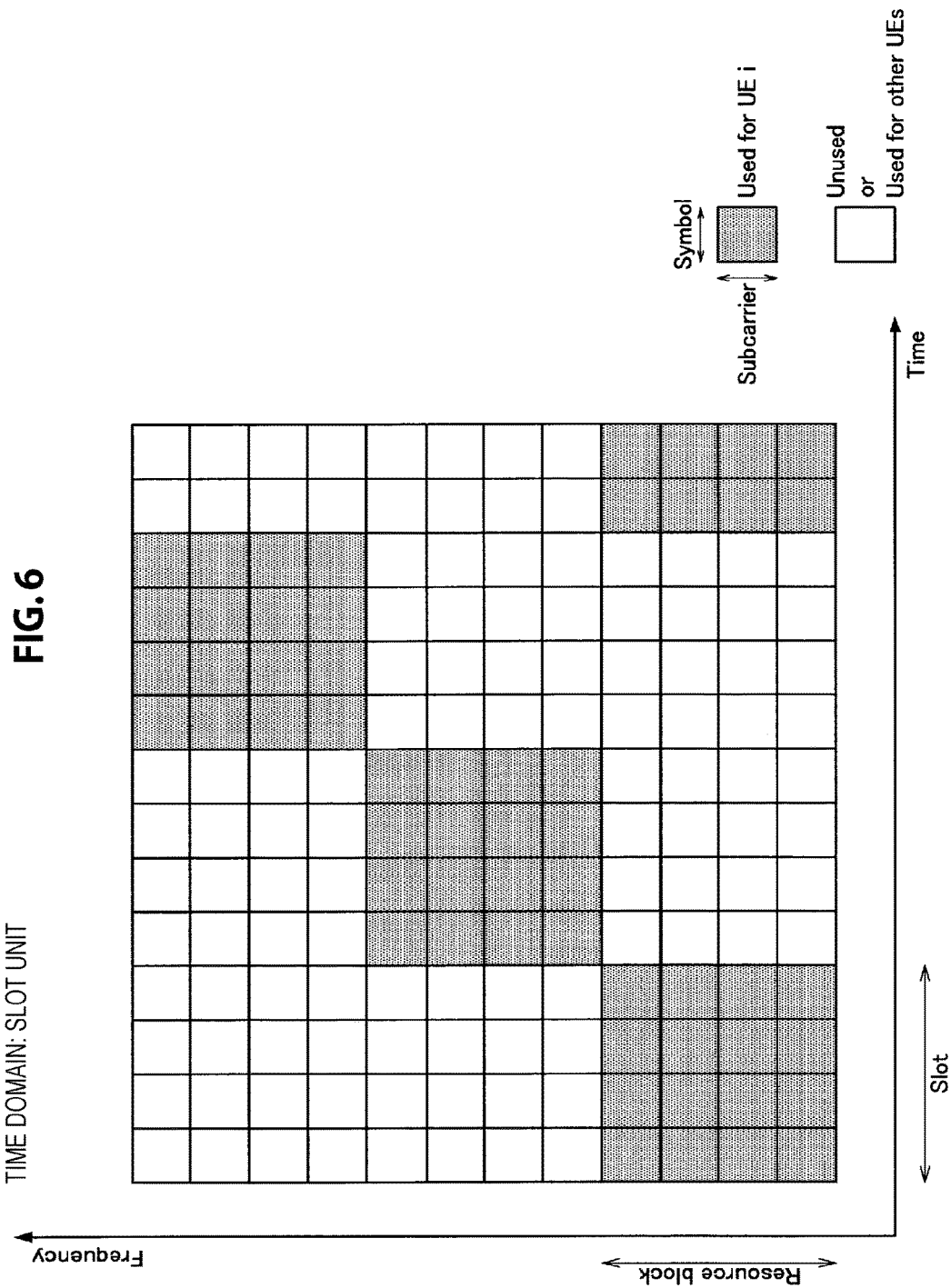
FIG. 6 is an explanatory diagram for explaining an example of a frequency hopping pattern in a radio system to be controlled according to the present embodiment.

FIG. 4 to FIG. 6 are explanatory diagrams for explaining an example of the frequency hopping pattern in the radio system 10 to be controlled according to the present embodiment. FIG. 4 illustrates a frequency hopping pattern in which hopping is performed in a subcarrier unit in a frequency direction and in a symbol unit in a time direction. FIG. 5 illustrates a frequency hopping pattern in which hopping is performed in a subcarrier unit in a frequency direction and in a symbol block unit in a time direction. FIG. 6 illustrates a frequency hopping pattern in which hopping is performed in a resource block unit in a frequency direction and in a slot unit in a time direction. These diagrams illustrate frequency hopping patterns for transmitting data to a terminal i which is the receiving station 100. The communication unit 210 can transmit data using a radio resource along the frequency hopping pattern illustrated in each diagram.

(Specific Frequency Hopping Implementing Means)

The communication unit 210 can transmit data while performing frequency hopping using various means. For example, the communication unit 210 performs frequency hopping in a physical layer (PHY layer). Here, a case will be described as an example with reference to FIG. 7 where a multicarrier modulation scheme such as orthogonal frequency-division multiplexing (OFDM) and orthogonal frequency-division multiple access (OFDMA) is employed. Further, a case will be described with reference to FIG. 8 where a multicarrier modulation scheme such as single-carrier frequency-division multiple access (SC-FDMA) is employed.

Figure 7:
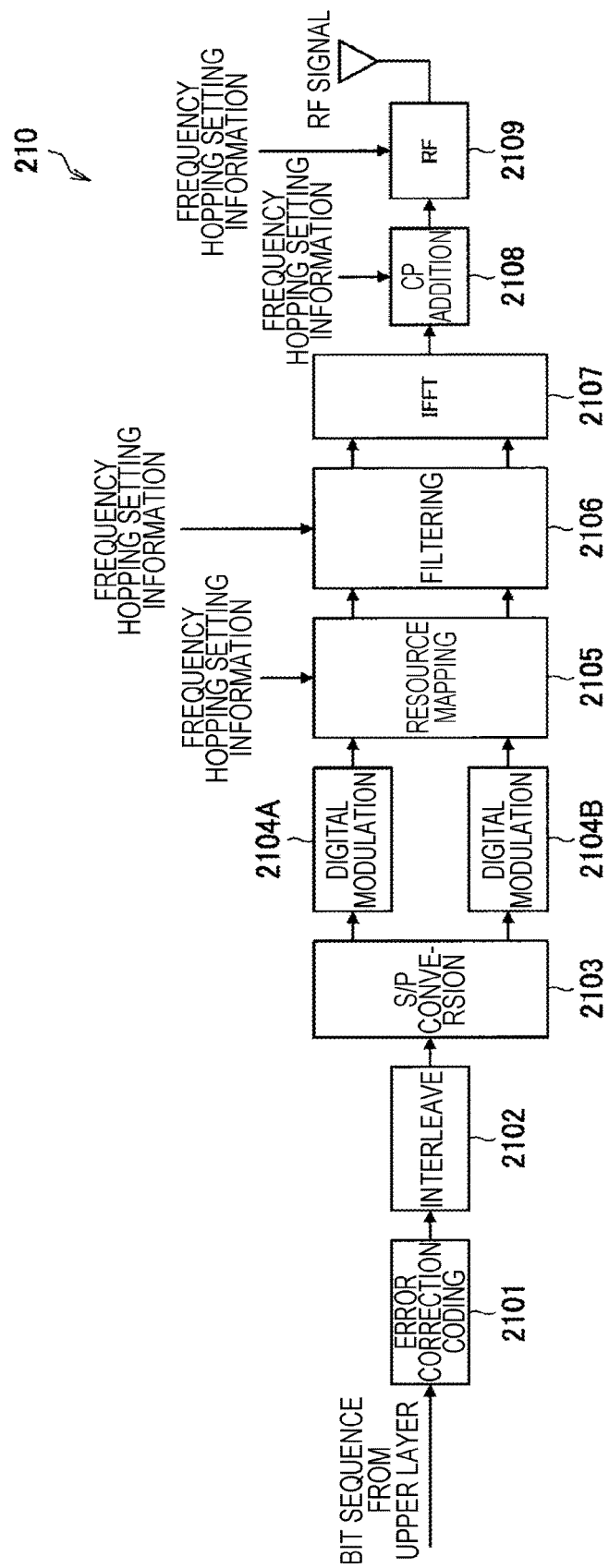
FIG. 7 is an explanatory diagram for explaining an example of a functional configuration of a communication unit of the transmitting station according to the present embodiment.

FIG. 7 is an explanatory diagram for explaining an example of a functional configuration of the communication unit 210 of the transmitting station 200 according to the present embodiment. As illustrated in FIG. 7, the communication unit 210 has an error correction coding function 2101, an interleave function 2102, a serial to parallel (S/P) conversion function 2103, a digital modulation function 2104A, a digital conversion function 2104B, a resource mapping function 2105, a filtering function 2106, an inverse fast Fourier transform (IFFT) function 2107, a cyclic prefix (CP) addition function 2108 and a radio frequency (RF) function 2109.

Figure 8:
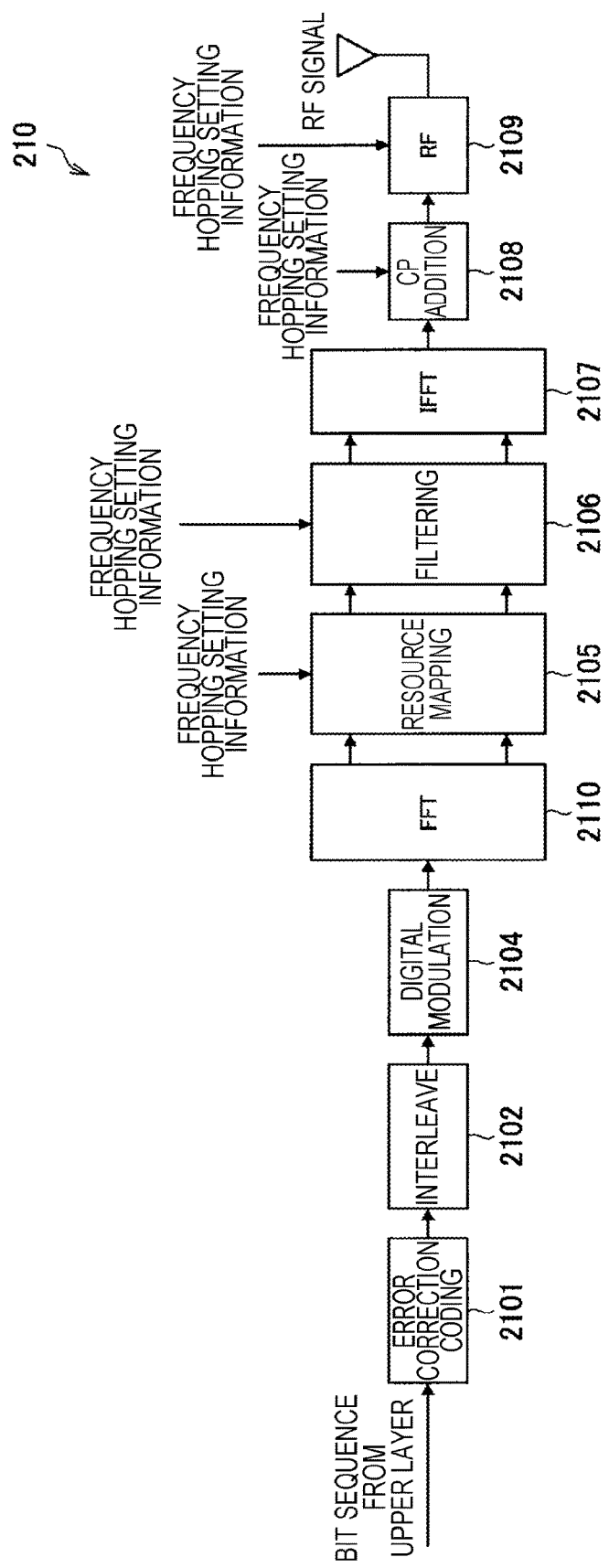
FIG. 8 is an explanatory diagram for explaining an example of a functional configuration of a communication unit of the transmitting station according to the present embodiment.

FIG. 8 is an explanatory diagram for explaining an example of a functional configuration of the communication unit 210 of the transmitting station 200 according to the present embodiment. As illustrated in FIG. 8, the communication unit 210 has an error correction coding function 2101, an interleave function 2102, a digital modulation function 2104, an FFT function 2110, a resource mapping function 2105, a filtering function 2106, an IFFT function 2107, a CP addition function 2108 and an RF function 2109.

In any functional configuration, frequency hopping can be executed by, for example, transmission data being mapped to radio resources according to the frequency hopping pattern when resources are mapped by the resource mapping function 2105. Specifically, for example, the resource mapping function 2105 changes a mapping destination according to time when modulation symbols are mapped to frequency direction resources such as a subcarrier, a resource block and a component carrier. Further, frequency hopping can be executed by radio transmission being performed along the frequency hopping pattern when a radio signal is transmitted by the RF function 2109. Specifically, for example, the RF function 2109 changes a carrier frequency according to time using a frequency synthesizer, or the like.

Here, the filtering function 2106 will be described in detail. As illustrated in FIG. 7, the communication unit 210 of the transmitting station 200 performs IFFT to generate an OFDM signal after error correction coding, interleave, digital modulation, resource mapping, or the like, are performed. At that time, the communication unit 210 can lower a level of out-of-band radiation of a signal by further performing filtering. Such type of OFDM is often also referred to as, for example, "Filtered OFDM", "Pulse shape OFDM", "Filter bank multicarrier", or the like.

An OFDM signal x(t) associated with filtering is defined with the following equation.

[Math. 1]

$$x(t) = \sum_{k=0}^{K-1} \sum_{l=-\infty}^{+\infty} c_{k,l} g_k(t - lT) \exp\{j2\pi k \Delta_F (t - lT)\} \qquad \text{Equation 1}$$

Here, K is the number of subcarriers. $c_{k,1}$ is a signal component (corresponding to a digital modulation symbol such as a PSK and a QAM in the case of OFDM) of a subcarrier k. $g_k(t)$ is a filtering coefficient. T is an OFDM symbol length. $\Delta_F$ is subcarrier spacing. Note that, it can be said that a normal OFDM signal which is not associated with filtering corresponds to a signal obtained by applying the filtering coefficient $g_k(t)$ in the following equation to the above-described equation 1.

[Math. 2]

$$g_k(t) = \begin{cases} 1, & 0 \le t < T \\ 0, & \text{otherwise} \end{cases} \quad \text{Equation 2}$$

In the case where a signal is generated by performing filtering, the communication unit 210 may convert the signal into an RF signal and transmit the RF signal without adding a CP which would be added for each OFDM symbol in the case of normal OFDM. In this case, if it is possible to appropriately eliminate or equalize interference between symbols at the receiving station 100 side, it is possible to reduce out-of-band radiation and prevent degradation of frequency utilization efficiency.

As described above, because the communication unit 210 has the filtering function 2106, it is possible to lower an out-of-band radiation level and contribute to reduction in interference with other radio systems 10. Therefore, in the case where the communication unit 210 performs filtering and frequency hopping in combination, it is possible to further increase an effect of reducing interference with other radio systems 10. For example, the communication unit 210 may switch whether or not to perform filtering according to whether or not frequency hopping is performed. Still further, the communication unit 210 may switch whether or not to perform CP addition according to whether or not filtering is performed. For example, in the case where filtering is performed by employing Filtered OFDM, or the like, because there is a case where it is difficult to add a CP, the communication unit 210 may omit CP addition in the case where filtering is performed and may add a CP in the case where filtering is not performed. Still further, the communication unit 210 may switch whether or not to perform up-sampling according to whether or not filtering is performed. The communication unit 210 can further lower an out-of-band radiation level by making filtering ON coordinate with up-sampling ON.

The example where frequency hopping is performed in the PHY layer has been described above. Other than the above example, the communication unit 210 may perform frequency hopping in an upper layer of the PHY layer. Here, as an example, an example where frequency hopping is performed in a L2 layer or upper layer, for example, in a datalink layer (MAC layer) will be described with reference to FIG. 9 and FIG. 10.

Figure 9:
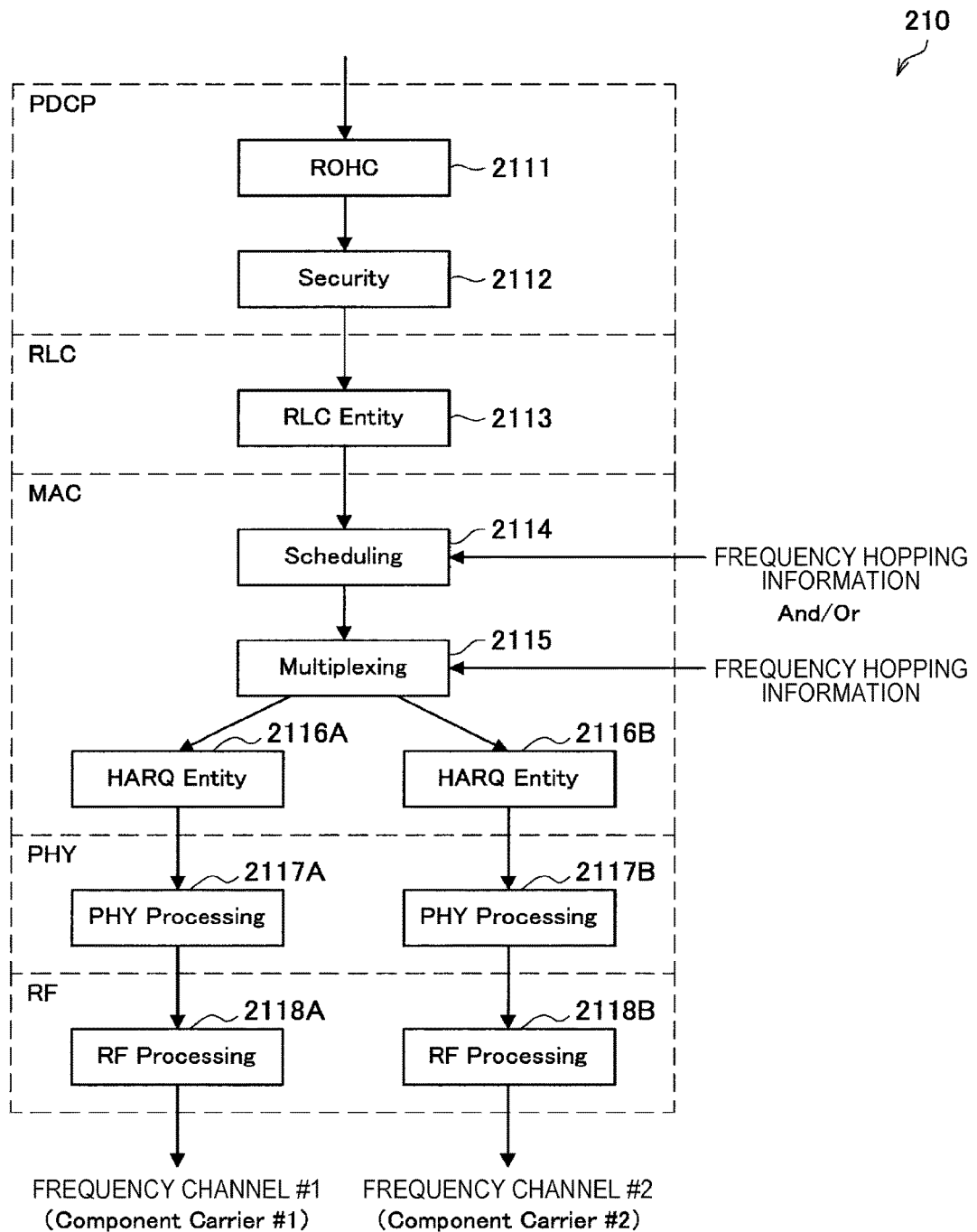
FIG. 9 is an explanatory diagram for explaining an example of a functional configuration of a communication unit of the transmitting station according to the present embodiment.

FIG. 9 is an explanatory diagram for explaining an example of a functional configuration of the communication unit 210 of the transmitting station 200 according to the present embodiment. As illustrated in FIG. 9, the communication unit 210 has a robust header compression (ROHC) function 2111, a security function 2112, a radio link control (RLC) entity function 2113, a scheduling function 2114, a multiplexing function 2115, hybrid automatic repeat request (HARQ) entity functions 2116A and 2116B, PHY processing functions 2117A and 2117B, and RF processing functions 2118A and 2118B. Note that PDCP in the drawing is a packet data convergence protocol.

This functional configuration example is an example in the case where the communication unit 210 performs HARQ in a frequency channel unit. The communication unit 210 performs frequency hopping in the scheduling function 2114 and/or the multiplexing function 2115. In this functional configuration example, the HARQ entity function 2116 is provided in a later stage of the scheduling function 2114 and the multiplexing function 2115 which can perform frequency hopping. Therefore, concerning a hopping unit in a time direction, hopping is preferably applied in at least a frame (subframe) unit.

Note that the order of these functions is arbitrary, and, for example, the HARQ entity function 2116 may be provided in a later stage of the scheduling function 2114, and the multiplexing function 2115 may be provided in a later stage of the HARQ entity function 2116. In this case, concerning a hopping unit in a time direction, hopping can be applied in a unit equal to or smaller than a frame unit.

Figure 10:
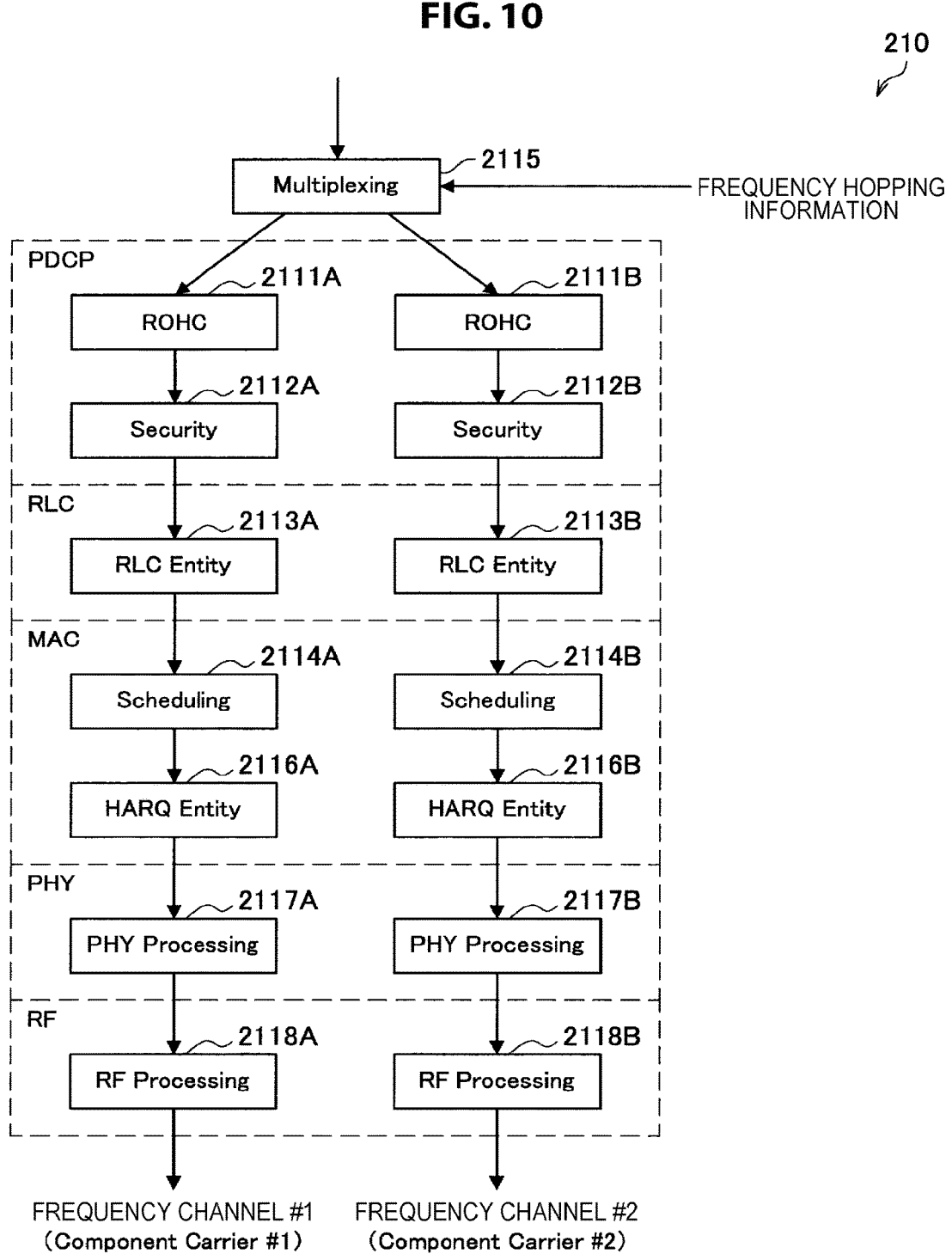
FIG. 10 is an explanatory diagram for explaining an example of a functional configuration of a communication unit of the transmitting station according to the present embodiment.

FIG. 10 is an explanatory diagram for explaining an example of a functional configuration of the communication unit 210 of the transmitting station 200 according to the present embodiment. As illustrated in FIG. 10, the communication unit 210 has a multiplexing function 2115, ROHC functions 2111A and 2111B, security functions 2112A and 2112B, RLC entity functions 2113A and 2113B, scheduling functions 2114A and 2114B, HARQ entity functions 2116A and 2116B, PHY processing functions 2117A and 2117B, and RF processing functions 2118A and 2118B.

This functional configuration example is an example in the case where the communication unit 210 has a function of the L2 layer as well as a function of the L1 layer for each frequency channel. In this case, hopping is preferably performed in a data unit of an upper layer. For example, an IP layer packet corresponds to this example. Hopping in a frequency direction can be performed according to which frequency channel is used to transmit a packet. Concerning a time direction, for example, hopping can be performed by the scheduling functions 2114A and 2114B and/or the RF functions 2118A and 2118B.

(Frequency Hopping Setting Information Notification Function)

The communication unit 210 receives the frequency hopping setting information from the communication control device 300 directly or indirectly via an arbitrary communication node such as the receiving station 100. Further, the communication unit 210 may notify the receiving station 100 of the frequency hopping setting information acquired from the communication control device 300. The transmitting station 200 performs this notification in the case where, for example, the base station of the cellular system is implemented as the transmitting station 200 and the user terminal is implemented as the receiving station 100.

The communication unit 210 can notify the receiving station 100 of the frequency hopping setting information using various means. An example of the means will be specifically described below.

(1) Notify for Each Communication Link

The communication unit 210 notifies the receiving station 100 of the frequency hopping setting information every time a communication link occurs for data transmission/reception. In this case, the frequency hopping setting information is transmitted using a control channel for each communication link by the radio communication apparatus belonging to the radio system 10 to be controlled by the communication control device 300.

In the case where a system operates based on a subframe or a slot as in the cellular system, a control channel and a data channel relate to this function. For example, the communication unit 210 stores the frequency hopping setting information in a control channel (for example, PDCCH) within a subframe, and transmits the information to the receiving station 100. Specifically, the communication unit 210 can store the frequency hopping setting information in downlink control information (DCI) of the PDCCH. The communication unit 210 then applies frequency hopping based on the frequency hopping setting information to a data channel.

There is a variety of possible relationship between a control channel in which the frequency hopping setting information is stored and a data channel to which frequency hopping is applied. A specific example of this relationship will be described below with reference to FIG. 11 to FIG. 13.

Figure 11:
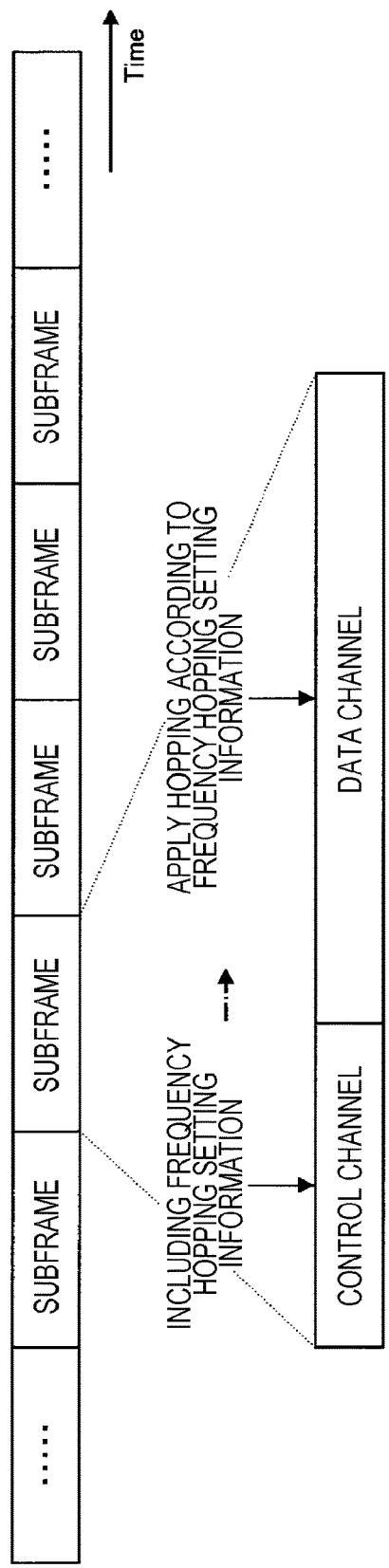
FIG. 11 is an explanatory diagram for explaining an example of relationship between a control channel and a data channel in frequency hopping setting information notification processing according to the present embodiment.

FIG. 11 is an explanatory diagram for explaining an example of the relationship between the control channel and the data channel in the frequency hopping setting information notification processing according to the present embodiment. In the example illustrated in FIG. 11, frequency hopping based on the frequency hopping setting information is applied to the data channel within the same subframe as that of the control channel in which the frequency hopping setting information is stored. This example can be applied in, for example, downlink communication from the base station to the user terminal.

Figure 12:
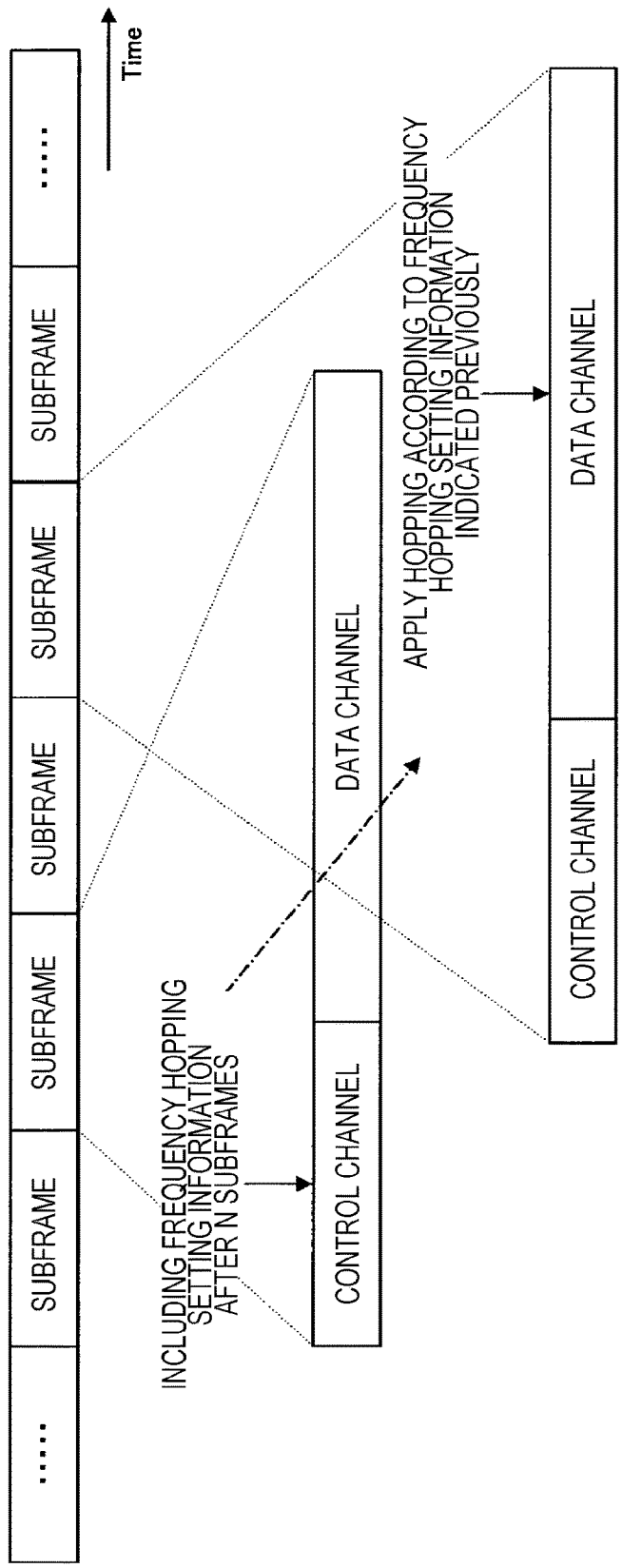
FIG. 12 is an explanatory diagram for explaining an example of relationship between a control channel and a data channel in frequency hopping setting information notification processing according to the present embodiment.

FIG. 12 is an explanatory diagram for explaining an example of the relationship between the control channel and the data channel in the frequency hopping setting information notification processing according to the present embodiment. In the example illustrated in FIG. 12, frequency hopping based on the frequency hopping setting information is applied to a data channel within a subframe different from a subframe in which the frequency hopping setting information is stored. This example can be applied in, for example, downlink communication from the base station to the user terminal. Further, as another example, in time division duplex (TDD), the base station can give an instruction of frequency hopping of an uplink data channel of the user terminal using a downlink control channel.

Figure 13:
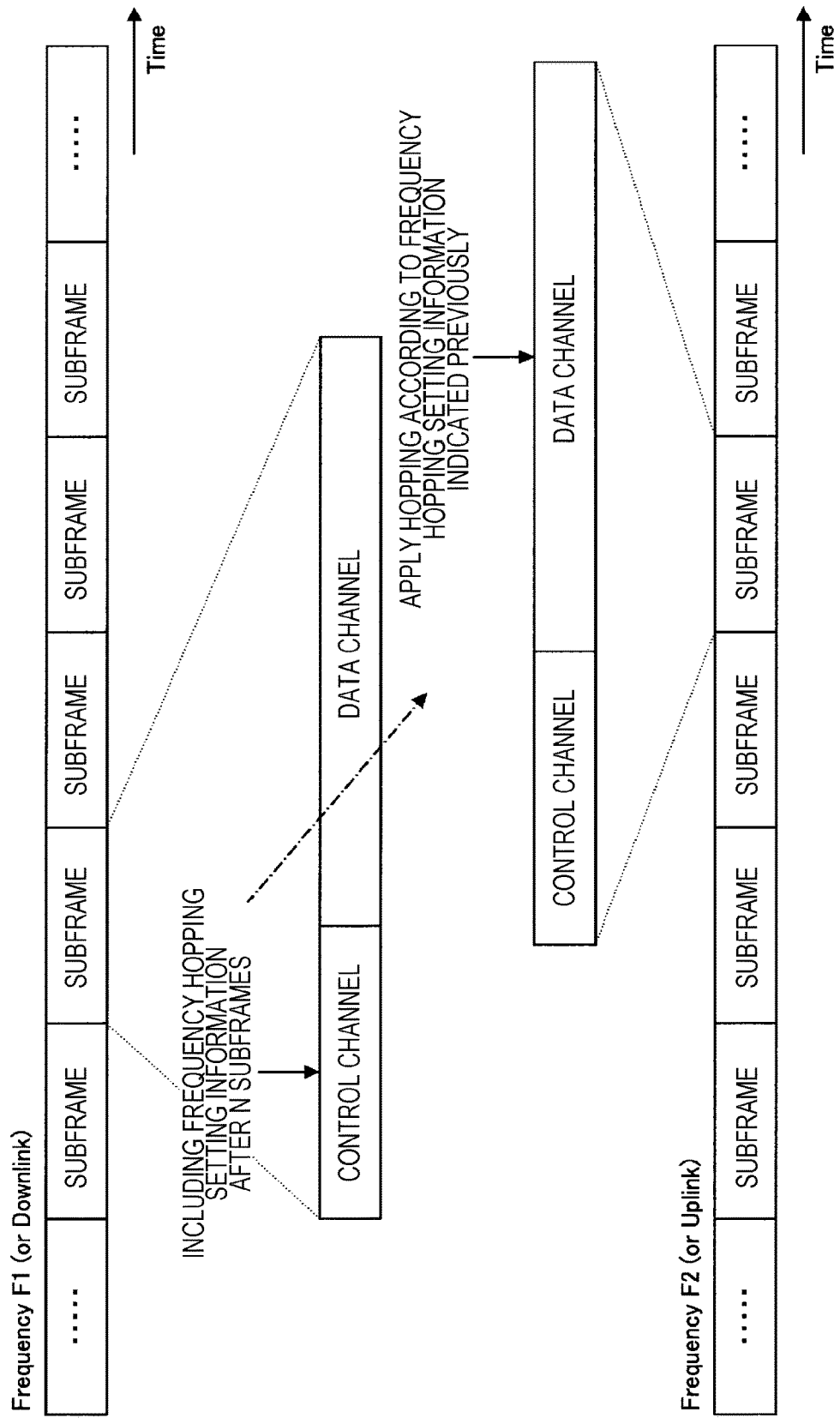
FIG. 13 is an explanatory diagram for explaining an example of relationship between a control channel and a data channel in frequency hopping setting information notification processing according to the present embodiment.

FIG. 13 is an explanatory diagram for explaining an example of relationship between the control channel and the data channel in the frequency hopping setting information notification processing according to the present embodiment. In the example illustrated in FIG. 13, frequency hopping based on the frequency hopping setting information is applied to a data channel within a subframe of a frequency different from a subframe in which the frequency hopping setting information is stored. This example can be applied, for example, in the case where, in frequency division duplex (FDD), the base station gives an instruction of frequency hopping in uplink transmission of the user terminal using a downlink control channel, and the user terminal applies the instructed frequency hopping upon uplink transmission of the user terminal. Further, upon application of carrier aggregation discussed in LTE-A, frequency hopping of a data channel of one frequency can be instructed using a control channel of another frequency (component carrier).

A case where a system operates based on a subframe or a slot as in the cellular system has been described above. Other than the example described above, for example, storage of the frequency hopping setting information and application of frequency hopping based on the frequency hopping setting information may be performed between different control channels or may be performed between different data channels.

On the other hand, in the case where a system operates based on a packet as in a wireless LAN system, a header portion and a data portion of a packet relate to this function. For example, the communication unit 210 stores the frequency hopping setting information in the header portion within the packet and applies frequency hopping based on the frequency hopping setting information to the data portion.

There is a variety of possible relationship between a header portion in which the frequency hopping setting information is stored and a data portion to which frequency hopping is applied. A specific example of this relationship will be described below with reference to FIG. 14.

Figure 14:
FIG. 14 is an explanatory diagram for explaining an example of relationship between a header portion and a data portion in the frequency hopping setting information notification processing according to the present embodiment.

FIG. 14 is an explanatory diagram for explaining an example of the relationship between the header portion and the data portion in the frequency hopping setting information notification processing according to the present embodiment. In the example illustrated in FIG. 14, frequency hopping based on the frequency hopping setting information is applied to a data portion (PHY data) subsequent to a header portion (PHY header) within the same packet, in which the frequency hopping setting information is stored.

(2) Notify for Each Single or Plurality of Apparatuses

The communication unit 210 gives notification of the frequency hopping setting information for each single or plurality of receiving stations 100 which perform data transmission/reception. In this case, the frequency hopping setting information is unicasted by a radio communication apparatus belonging to the radio system 10 to be controlled by the communication control device 300. A timing of the notification may be a different cycle from that of notification for each communication link.

For example, in the cellular system, the communication unit 210 transmits the frequency hopping setting information to the receiving station 100 using a system information block (SIB). Notification of the SIB is performed by utilizing an LTE downlink data channel (PDSCH) for system information. Notification of the SIB is basically performed periodically, and updated periodically. Of course, notification of the SIB is performed non-periodically. Here, a specific example of notification using the SIB will be described with reference to FIG. 15.

Figure 15:
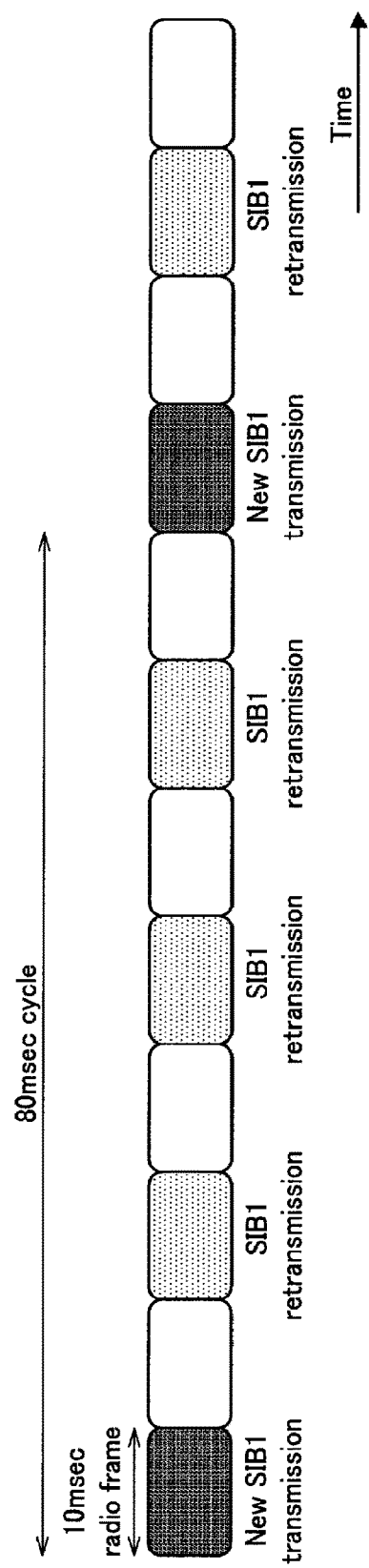
FIG. 15 is an explanatory diagram for explaining an example of the frequency hopping setting information notification processing according to the present embodiment.

FIG. 15 is an explanatory diagram for explaining an example of the frequency hopping setting information notification processing according to the present embodiment. FIG. 15 illustrates an example where the communication unit 210 transmits the SIB using every other radio frames of 10 msec in LTE downlink. In this example, the communication unit 210 transmits the SIB in which the same frequency hopping setting information is stored four times and updates frequency hopping setting information to be transmitted at intervals of 80 msec.

The communication unit 210 may perform notification as to which subframe is used to perform notification of the SIB using, for example, a master information block (MIB). Notification of the MIB is performed using an LTE downlink broadcast channel (PBCH) unlike with the SIB. Notification/retransmission of the MIB is basically performed periodically, and the MIB is updated periodically.

Figure 16:
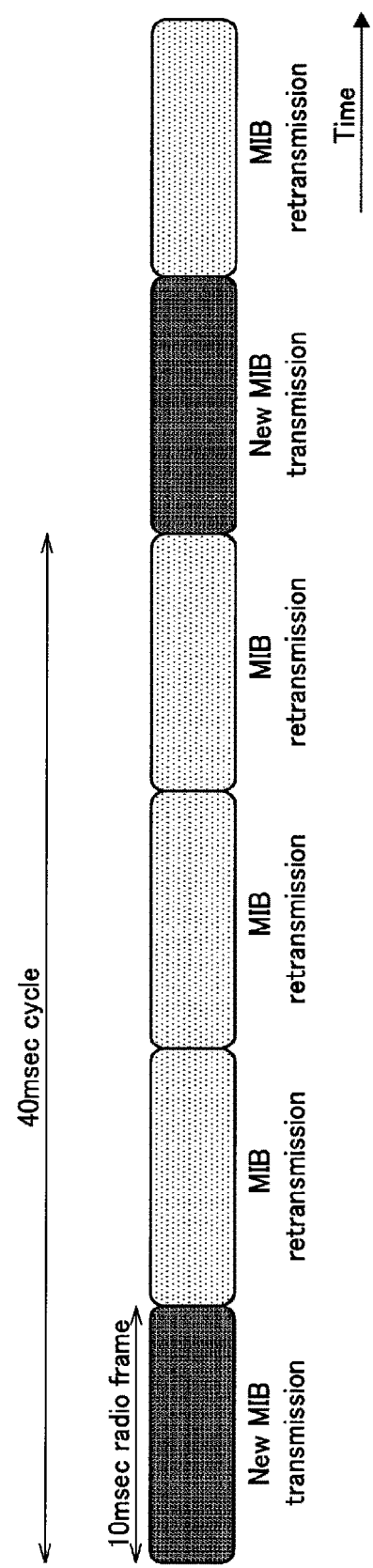
FIG. 16 is an explanatory diagram for explaining an example of the frequency hopping setting information notification processing according to the present embodiment.

FIG. 16 is an explanatory diagram for explaining an example of the frequency hopping setting information notification processing according to the present embodiment. FIG. 16 illustrates an example where the MIB is transmitted continuously using radio frames of 10 msec in LTE downlink. In this example, the communication unit 210 transmits the MIB in which the same information is stored four times and updates information to be transmitted at intervals of 40 msec.

The communication unit 210 may transmit the frequency hopping setting information as, for example, RRC signaling in a radio resource control (RRC) layer other than the SIB. Note that notification of the RRC signaling is basically performed using the PDSCH.

In the above-described example where notification is performed for each apparatus, the communication unit 210 transmits data by applying the same frequency hopping setting information unless the frequency hopping setting information is updated. Note that the communication unit 210 may set a specific apparatus as a transmission destination. The communication unit 210 may, for example, set one specific apparatus as a transmission destination by performing unicast transmission or may set a plurality of specific apparatuses as transmission destinations by performing multicast transmission.

(3) Notify Whole System or Part of System

The communication unit 210 notifies the whole system or part of the system of the frequency hopping setting information. In this case, the frequency hopping setting information is broadcasted by the radio communication apparatus belonging to the radio system 10 to be controlled by the communication control device 300. For example, an apparatus which controls the whole radio system 10 to be controlled performs broadcast transmission to apparatuses which are controlled by the apparatus. For example, a base station in a cellular system, or an access point in a wireless LAN system performs broadcast transmission.

For example, in the cellular system, the communication unit 210 performs notification of the frequency hopping setting information using a broadcast channel (PBCH). Normally, a radio resource of the cellular system is made a subframe (or a slot) in a time direction, and the PBCH is regularly transmitted from the base station in downlink using the subframe (or the slot). The communication unit 210 stores the frequency hopping setting information in this PBCH. In the cellular system like LTE, the communication unit 210 may store the frequency hopping setting information in the master information block (MIB) or the system information block (SIB).

For example, in the wireless LAN system, the communication unit 210 broadcasts the frequency hopping setting information. For example, in the case of the wireless LAN system which operates based on a packet, the communication unit 210 performs transmission using a broadcast packet.

In the above-described example where notification is performed to the whole system (or part of the system), the communication unit 210 transmits data by applying the same frequency hopping setting information unless the frequency hopping setting information is updated. Note that the communication unit 210 may set a plurality of specific apparatuses as transmission destinations by performing multicast transmission.

The specific means for performing notification of the frequency hopping setting information has been described above.

Figure 17:
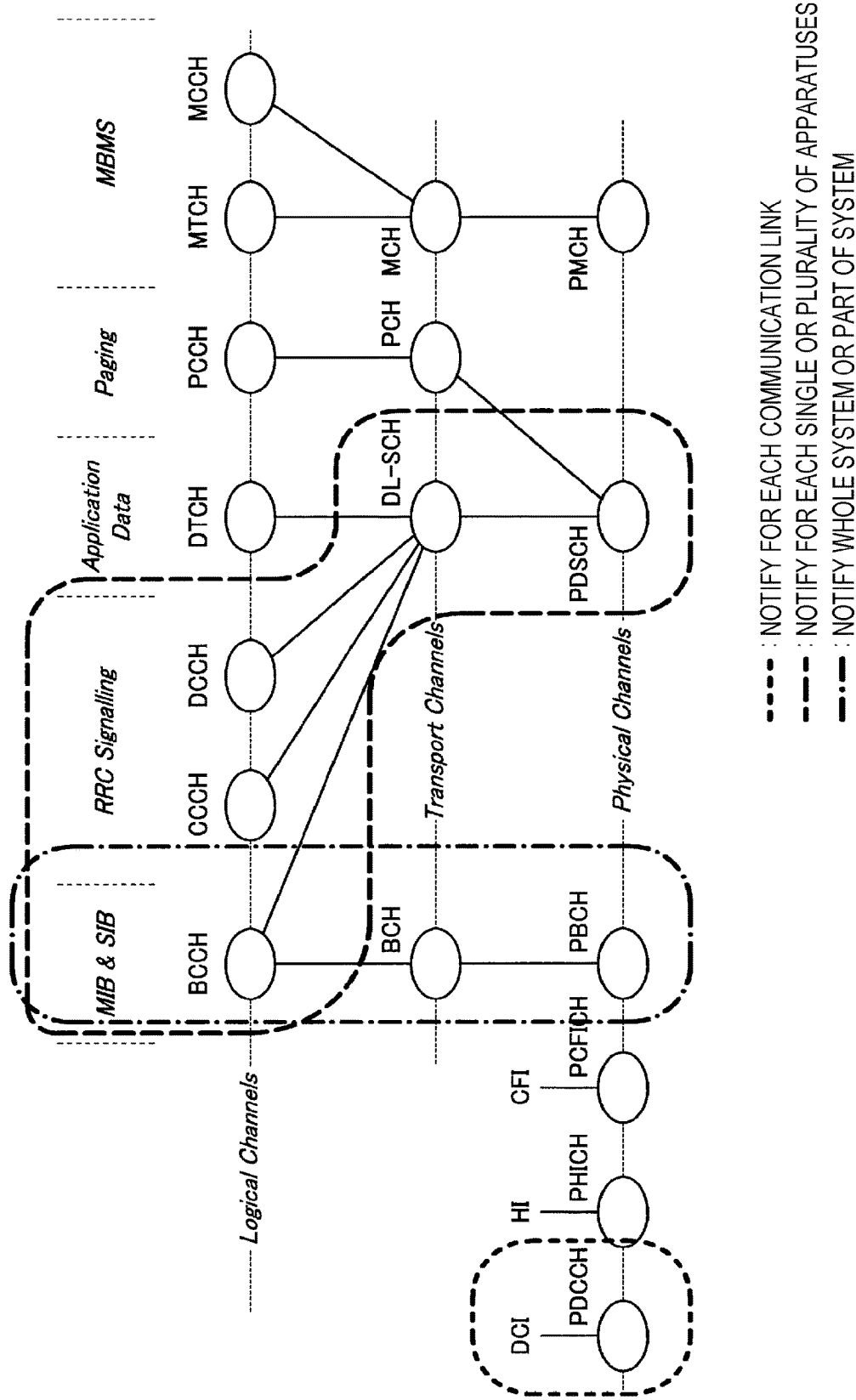
FIG. 17 is an explanatory diagram for explaining relationship between frequency hopping setting information notification means and channels according to the present embodiment.

FIG. 17 is an explanatory diagram for explaining relationship between frequency hopping setting information notification means and channels according to the present embodiment. An upper part of FIG. 17 illustrates a logical channel, a middle part illustrates a transport channel, and a lower part illustrates a physical channel. In FIG. 17, (1), (2) and (3) specifically described above are respectively mapped to channels. For example, in the case of "(1) notification for each communication link", notification is performed using a PDCCH while the frequency hopping setting information is stored as a DCI in the physical channel. Further, in the case of "(2) notification for each single or plurality of apparatuses", notification is performed using a PDSCH after the frequency hopping setting information is stored as the SIB or the RRC signaling in the logical channel. Further, in the case of "(3) notification to whole system or part of system", notification is performed using the PBCH after the frequency hopping setting information is stored as the MIB or the SIB in the logical channel. In this manner, procedure as to whether processing is performed in the logical channel or in the physical channel can change according to a channel used for notification.

[2-2-2. Control Unit]

The control unit 220, which functions as an arithmetic processing apparatus and a control apparatus, controls the whole operation within the transmitting station 200 according to various kinds of programs. For example, the control unit 220 is implemented with an electronic circuit such as a CPU and a microprocessor. Note that the control unit 220 may include a ROM which stores a program, an operation parameter, or the like, to be used and a RAM which temporarily stores a parameter, or the like, which changes as appropriate.

For example, the control unit 220 performs control so that the transmitting station 200 transmits data while performing frequency hopping. More specifically, the control unit 220 controls the communication unit 210 to transmit data while performing frequency hopping based on the frequency hopping setting information acquired from the communication control device 300.

For example, the control unit 220 controls the communication unit 210 to transmit the frequency hopping setting information which is information relating to frequency hopping performed by the transmitting station 200 to the receiving station 100 belonging to the same radio system 10 as the transmitting station 200.

For example, the control unit 220 controls the communication unit 210 to acquire sensing information. In this event, the control unit 220 may control the communication unit 210 to acquire the sensing information periodically or may control the communication unit 210 to acquire the sensing information by being triggered by reception of a request from the server 300. The control unit 520 controls the communication unit 210 to transmit the acquired sensing information to the communication control device 300 periodically or in response to a request.

Note that the control unit 220 can have a function as a control unit 320 of the communication control device 300 which will be described later.

2-3. Communication Control Device

Figure 18:
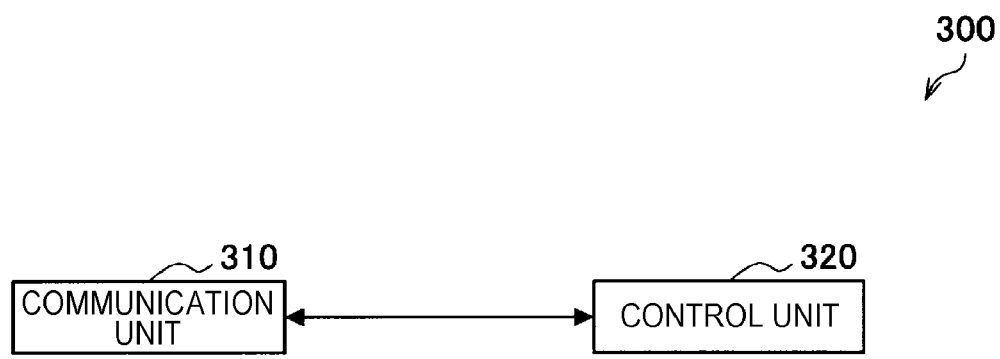
FIG. 18 is a block diagram illustrating an example of a logical configuration of a communication control device according to the present embodiment.

FIG. 18 is a block diagram illustrating an example of a logical configuration of the communication control device 300 according to the present embodiment. As illustrated in FIG. 18, the communication control device 300 according to the present embodiment includes a communication unit 310 and a control unit 320.

2-3-1. Communication Unit

The communication unit 310 is a communication interface which mediates communication between the communication control device 300 and other apparatuses. The communication unit 310 transmits/receives data to/from other apparatuses in a wired or wireless manner.

For example, the communication unit 310 performs communication with apparatuses (the receiving station 100 and the transmitting station 200) belonging to each radio system 10. In addition, the communication unit 310 performs communication with the DB 400 and the sensor apparatus 500.

Note that the communication control device 300 may be the same as or independent from the receiving station 100 or the transmitting station 200. Here, the meaning of the same/independent includes meaning of logically the same/independent as well as meaning of physically the same/independent. The communication unit 310 performs transmission/reception through a wired or wireless communication circuit in the case of an independent apparatus and performs transmission/reception inside the apparatus in the case of the same apparatus.

(Network Information Collection Function)

The communication unit 310 transmits a request for network information and receives the network information. For example, the communication unit 310 acquires the network information of other radio systems 10 from the DB 400 by transmitting a request to the DB 400 and receiving a reply of DB registration information. Further, the communication unit 310 acquires network information of other radio systems 10 from the sensor apparatus 500 by transmitting a request to the sensor apparatus 500 and receiving a reply of sensing information. The communication unit 310 may directly receive the network information from the DB 400 or the sensor apparatus 500 or may receive the network information by way of other arbitrary communication nodes. The communication unit 310 may acquire the network information for control processing of the radio system 10 by the control unit 320 or may regularly acquire/update the network information. While a cycle of acquisition/updating is arbitrary, for example, the cycle is preferably set within a range between 30 seconds and one day.

(Frequency Hopping Setting Information Notification Function)

The communication unit 310 notifies each radio system 10 of the frequency hopping setting information generated by the control unit 320. For example, the communication unit 310 transmits the frequency hopping setting information to the receiving station 100 and the transmitting station 200 included in each radio system 10 directly or indirectly via an arbitrary communication node.

By this means, for example, in the cellular system, the UE and the eNB which function as the receiving station 100 or the transmitting station 200 acquire the frequency hopping setting information. In any case, the UE acquires the frequency hopping setting information by way of the eNB. The eNB transmits the frequency hopping setting information to the UE using, for example, a broadcast channel or a broadcast packet. Further, concerning device-to-device communication (D2D communication) in which communication is directly performed between terminals, two or more UEs which function as the receiving station 100 or the transmitting station 200 acquire the frequency hopping setting information by way of the eNB.

Note that the communication unit 310 may perform notification of each information included in the frequency hopping pattern setting information at a time or may perform notification in a divided manner.

(Frequency Hopping Pattern Registration Function)

The communication unit 310 transmits a frequency hopping pattern decided by the control unit 320 to the DB 400.

By this means, in the case where the communication control device 300 is provided, for example, for each of the radio system 10, a frequency hopping pattern to be utilized by the own system can be shared with other radio systems 10 via the DB 400. By this means, it is possible to select frequency hopping patterns so that the frequency hopping patterns of the respective radio systems 10 do not overlap with each other.

2-3-2. Control Unit

The control unit 320, which functions as an arithmetic processing apparatus and a control apparatus, controls the whole operation within the communication control device 300 according to various kinds of programs. The control unit 320 is implemented with an electronic circuit such as, for example, a CPU and a microprocessor. Note that the control unit 320 may include a ROM which stores a program, an operation parameter, or the like, to be used and a RAM which temporarily stores a parameter, or the like, which changes as appropriate.

The control unit 320 controls radio communication of the radio system 10 to be controlled based on the network information. Specifically, the control unit 320 performs control as to whether the transmitting station 200 belonging to the radio system 10 to be controlled performs frequency hopping based on the network information of another radio system 10 (second radio network) different from the radio system 10 to be controlled (first radio network). The control unit 320 generates the frequency hopping setting information by collecting the network information, deciding an operation mode of the radio system 10 to be controlled and deciding a frequency hopping pattern of the radio system 10 to be controlled. Each function of the control unit 320 will be sequentially described below.

(Network Information Collection Function)

For example, the control unit 320 acquires the network information via the communication unit 310. For example, the control unit 320 may acquire DB registration information from the DB 400 as the network information. The control unit 230 acquires the DB registration information returned from the DB 400 by, for example, transmitting a request for the network information to the DB 400. Alternatively, the control unit 320 may acquire sensing information from the sensor apparatus 500 (the sensor apparatus 500 or a communication node such as the receiving station 100 and the transmitting station 200 which functions as the sensor apparatus 500) as the network information. The control unit 320 acquires the sensing information returned from the sensor apparatus 500 by, for example, transmitting a request for the network information to the sensor apparatus 500. The control unit 320 may acquire the network information relating to a plurality of radio systems at the same time.

(Definition of Network Information)

Note that the control unit 320 may use either the DB registration information or the sensing information as the network information or may use the both in combination. A specific example of specific content of the network information will be described below.

DB Registration Information

For example, the DB registration information includes information indicated in the following table. The following table indicates DB registration information relating to one radio system 10. The DB registration information for a plurality of radio systems 10 may be provided at the same time.

TABLE 1

DB registration information

Information indicating operating system
Information indicating operator
Information indicating operating frequency band
Information indicating operating location
Information indicating operating period
Information indicating priority
Information indicating frequency hopping pattern "Information indicating operating system" is identification information for identifying the radio system 10. "Information indicating operator" is identification information for identifying an operator which operates the radio system 10. "Information indicating operating frequency band" is information indicating a frequency band utilized by the radio system 10. "Information indicating operating location" is information indicating a location where the radio system 10 is operated. "Information indicating operating period" is information indicating a temporal range in which the radio system 10 is operated. "Information indicating priority" is information indicating priority of the radio system 10. "Information indicating frequency hopping pattern" is information indicating a frequency hopping pattern employed by the radio system 10.

Note that the "frequency hopping pattern" can include, for example, a flag indicating whether or not frequency hopping is performed, and information indicating the frequency hopping pattern in the case where frequency hopping is performed. Further, information relating to a plurality of frequency hopping patterns which can be employed by the radio system 10 may be stored in the "frequency hopping pattern". In this case, information indicating which frequency hopping pattern is utilized to perform frequency hopping is also included.

Another example of the DB registration information is indicated in the following table.

TABLE 2

DB registration information

Information indicating operating system
Information indicating operator
Information indicating lower limit of operating frequency band
Information indicating upper limit of operating frequency band
Information indicating operating location
Information indicating operating period
Information indicating priority
Information indicating threshold λ of OBWR
Information indicating frequency hopping pattern "Information indicating lower limit of operating frequency band" is information indicating a lower limit of a frequency band utilized by the radio system 10. "Information indicating upper limit of operating frequency band" is information indicating an upper limit of a frequency band utilized by the radio system 10. "Information indicating threshold λ of OBWR" is information indicating a threshold relating to a ratio of overlapping of use frequency bands which will be described later.

Note that information included in the DB registration information indicated in the above-described table includes information which may be omitted. For example, when the communication control device 300 includes information indicating at least any of the operating location, the operating period and the operating frequency band of the radio system 10 to be controlled in a request for the network information, information corresponding to the included information may not be provided as the DB registration information. That is, by the DB 400 side selectively providing the DB registration information relating to the radio systems 10 which are likely to interfere as a result of the operating locations, the operating periods and the operating frequency bands overlapping with each other or coming close to each other, these information may be omitted.

Other than the above-described examples, the DB registration information may be a parameter which is allowed by the radio system 10 to be controlled. In this case, for example, the control unit 320 includes information of the radio system 10 to be controlled in a request for the network information, and the DB 400 side calculates an allowable parameter. An example of the DB registration information in this case is indicated in the following table.

TABLE 3

DB registration information

Information indicating allowable frequency band
Information indicating allowable location
Information indicating allowable period
Information indicating allowable maximum transmission power
Information indicating allowable priority
Information indicating allowable frequency hopping pattern "Information indicating allowable frequency band" is information indicating a frequency band which can be utilized by the radio system 10 to be controlled. "Information indicating allowable location" is information indicating a location where the radio system 10 to be controlled can operate a radio network by utilizing the allowable frequency band. "Information indicating allowable location" is information indicating a period during which the radio system 10 to be controlled can operate a radio network at the allowable location by utilizing the allowable frequency band. "Information indicating allowable maximum transmission power" is information indicating maximum transmission power which can be used by the transmitting station 200 included in the radio system 10 to be controlled. "Information indicating allowable priority" is information indicating priority of the radio system 10 to be controlled. "Information indicating allowable frequency hopping pattern" is information indicating a frequency hopping pattern which is allowed to be employed at the radio system 10 to be controlled.

Sensing Information

The sensing information is provided in the case where there is a radio system 10 which can be sensed by the sensor apparatus 500. For example, the sensing information includes information indicated in the following table. The sensing information for a plurality of radio systems 10 may be provided at the same time.

TABLE 4

Sensing information

Information indicating system to be sensed
Information indicating flag indicating presence/absence of system
Information indicating sensing frequency band
Information indicating sensing location
Information indicating sensing period
Information indicating priority
Information indicating sensing frequency hopping pattern "Information indicating system to be sensed" is identification information for identifying the radio system 10 to be sensed. "Information indicating flag indicating presence/ absence of system" is a flag indicating whether or not the radio system 10 to be controlled can be sensed. "Information indicating sensing frequency band" is information indicating a frequency band in which radio communication by the radio system 10 to be controlled can be sensed and information relating to a frequency band utilized by the radio system 10 to be sensed. "Information indicating sensing location" is information indicating a location of the sensor apparatus 500 which performs sensing and information relating to a location where the radio system 10 to be sensed is operated. "Information indicating sensing period" is information indicating a period during which a transmission wave by the target radio system 10 can be sensed and information relating to a period during which the radio system 10 to be sensed is operated. "Information indicating priority" is information indicating priority of the radio system 10 to be sensed. "Information indicating sensing frequency hopping pattern" is information indicating a sensed frequency hopping pattern.

Note that, for example, the sensor apparatus 500 can identify which radio system 10 performs the sensed radio communication from a waveform of a received wave. Further, the sensor apparatus 500 can store priority for each radio system 10.

On the other hand, there can be a case where it is difficult to identify which radio system 10 performs the sensed radio communication, for example, in the case where the sensor apparatus 500 senses only a received power level. In this case, for example, the control unit 320 determines the "flag indicating presence/absence of system" by comparing the sensed received power level with a threshold. An example of the sensing information in this case is indicated in the following table.

TABLE 5

Sensing information

Information indicating system to be sensed
Information indicating sensing level result
Information indicating sensing frequency band
Information indicating sensing location
Information indicating sensing period
Information indicating priority
Information indicating sensing frequency hopping pattern "Information indicating sensing level result" is information indicating a received power level sensed by the sensor apparatus 500. The sensing level result may be information indicating a value of the received power level, or, as indicated in the following table, may be information indicating a result of division of the received power level into N classes.

TABLE 6

| Received power value | to −50 dBm | −50 dBm to −60 dBm | −60 dBm to −70 dBm | ... | −40-10*(N − 2)dBm to −40-10*(N − 1)dBm | −40-10*(N − 2)dBm to |
|---|---|---|---|---|---|---|
| Sensing level result | 0 | 1 | 2 | ... | N − 2 | N − 1 |

(Operation Mode Decision Function)

The control unit 320 decides the operation mode of the radio system 10 to be controlled to be a frequency hopping mode or a normal mode. Note that the frequency hopping mode is an operation mode in which the transmitting station 200 transmits data while performing frequency hopping.

The normal mode is an operation mode in which the transmitting station 200 transmits data without performing frequency hopping. The control unit 320 can decide the operation mode based on various criteria. An example of the criteria for deciding the operation mode will be described below. Note that the control unit 320 may decide the operation mode by arbitrarily combining the criteria described below.

Necessity of Acquisition of Network Information

For example, the control unit 320 may decide the operation mode based on whether it is necessary to acquire the network information. For example, the control unit 320 can decide the normal mode in the case where it is required under law to acquire the network information of other radio systems 10 and it is not required to set the frequency hopping mode as the operation mode. Whether or not it is necessary to acquire the network information can comply with radio wave regulations of each country such as, for example, the U.S. Federal SAS and Europe license shared access (LSA). A form in which the operation mode is decided based on whether or not it is necessary to acquire the network information is useful in the case where it is difficult to acquire accurate network information of the radio system 10 to be controlled. For example, concerning a system such as radar whose use frequency band changes over time, there is a case where it is difficult to acquire accurate information of a frequency band, time, a location, or the like, utilized by the system. Further, there is also a case where the DB 400 provides a radio parameter (such as, for example, a frequency (center and width) which is allowed to be utilized, allowable maximum transmission power and allowable utilization period) which is allowed to be utilized by the radio system 10 to be controlled in place of the network information of other radio systems 10. In such a case, it can be difficult to evaluate a possibility that the radio system 10 to be controlled interferes with other radio systems 10. Also in such a case, it is possible to reduce interference with other radio systems (for example, a radar system) by the radio system 10 to be controlled by applying frequency hopping.

Priority of Network

Further, the control unit 320 may decide the operation mode based on priority of other radio systems 10. For example, the control unit 320 may decide the frequency hopping mode as the operation mode in the case where priority of other radio systems 10 is higher than priority of the radio system 10 to be controlled, and decide the normal mode as the operation mode in the case where the priority of other radio systems 10 is lower than the priority of the radio system 10 to be controlled. By this means, it is possible to reduce interference with a radio system 10 having higher priority and improve communication quality of the radio system 10 to be controlled. Note that the control unit 320 may decide the frequency hopping mode as the operation mode in the case where there is a possibility that other radio systems 10 having priority equal to the priority of the radio system 10 to be controlled exist. The control unit 320 determines a possibility that there exist other radio systems 10 having higher priority based on the network information of each radio system 10.

The priority may be arbitrarily set by the control unit 320 or may be set based on radio wave regulations of the country where the radio system 10 is used, such as, for example, the U.S. Federal SAS and Europe LSA. Here, a specific example of the priority will be described with reference to FIG. 19 to FIG. 21.

Figure 19:
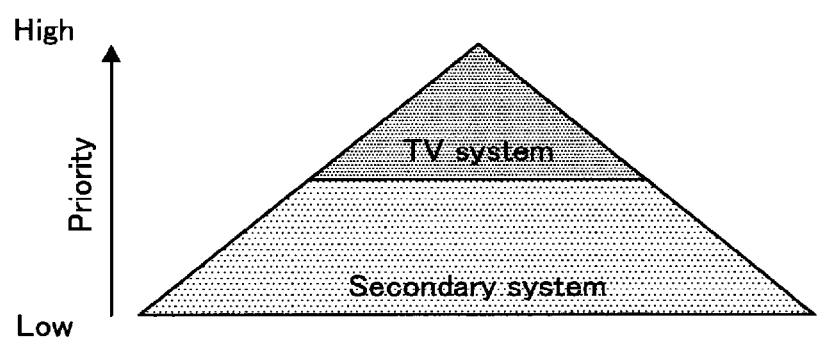
FIG. 19 is an explanatory diagram for explaining an example of priority of radio systems in the present embodiment.
Figure 20:
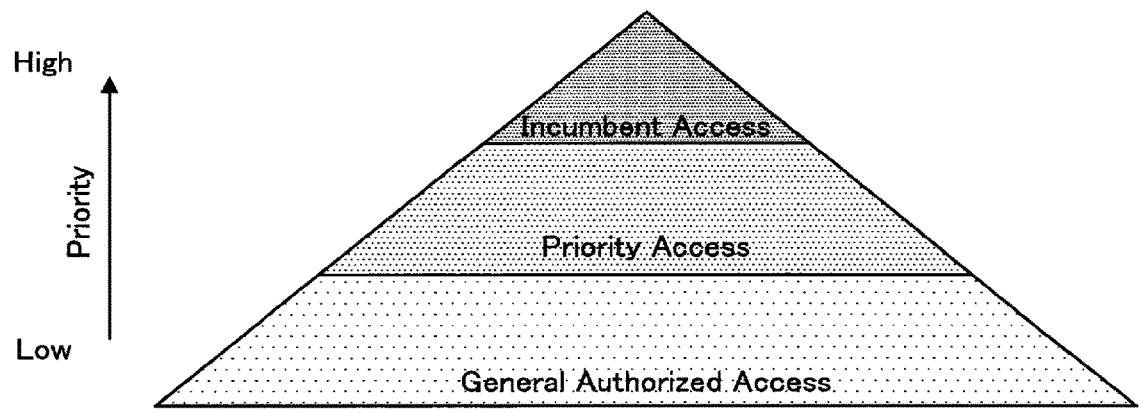
FIG. 20 is an explanatory diagram for explaining an example of priority of radio systems in the present embodiment.
Figure 21:
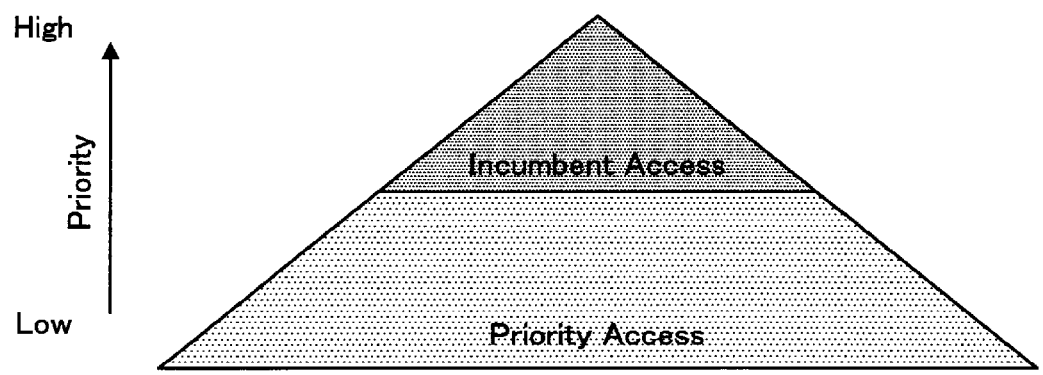
FIG. 21 is an explanatory diagram for explaining an example of priority of radio systems in the present embodiment.

FIG. 19 to FIG. 21 are explanatory diagrams for explaining an example of priority of the radio system 10 in the present embodiment. FIG. 19 illustrates an example of priority relating to TV white space. As illustrated in FIG. 19, because the TV system should be protected against interference from other radio systems, high priority is set. Priority lower than the priority of the TV system is set at other radio systems which can interfere with the TV system. FIG. 20 illustrates an example of priority in the U.S. Federal SAS. FIG. 21 illustrates an example of priority in Europe LSA. As illustrated in FIG. 20 and FIG. 21, two or three levels of priority can be set. Of course, an arbitrary level of four or more levels of priority may be set.

Possibility of Interference

Other than above, the control unit 320 may decide the operation mode based on whether or not there is a possibility that the radio system 10 to be controlled may interfere with other radio systems 10. For example, the control unit 320 may decide the frequency hopping mode as the operation mode in the case where there is a possibility of interference, and decide the normal mode as the operation mode in the case where there is no possibility of interference. The control unit 320 determines the possibility of interference based on the network information of each radio system 10.

Interference Determination Based on Overlapping of Use Frequency Bands

For example, the control unit 320 determines that there is a possibility of interference in the case where there is a possibility that a use frequency band of the radio system 10 to be controlled may at least partially overlap with use frequency bands of other radio systems 10. The control unit 320 determines overlapping of use frequency bands based on the network information and determines a possibility of interference based on this determination result.

In the case where the control unit 320 determines overlapping of the use frequency bands based on the sensing information, it is preferable to provide ranges in determination compared to the case where determination is performed based on the DB registration information. For example, the control unit 320 may regard that there is a possibility that use frequency bands may overlap in the case where another radio system 10 which utilizes a band within a predetermined range from the use frequency band of the radio system 10 to be controlled is detected. By this means, it is possible to prevent interference with other radio systems 10 more strongly. Further, by setting a range where there is a possibility of overlapping and determining the range within a predetermined width, it is possible to exempt other radio systems 10 which are less likely to interfere from determination. Of course, providing ranges in determination may also be performed in a similar manner in determination processing based on the DB registration information.

The control unit 320 may determine overlapping of use frequency bands based on whether or not other radio systems 10 change use frequency bands over time. For example, the control unit 320 may determine that there is a possibility of overlapping of use frequency bands in the case where other radio systems 10 change the use frequency bands over time, because there is a possibility that the use frequency bands may overlap while other radio systems 10 change the use frequency bands. By this means, it is possible to prevent interference with other radio systems 10 more strongly.

Further, the control unit 320 may determine that there is a possibility of overlapping of use frequency bands in the case where a direction in which other radio systems 10 change the use frequency bands over time is a direction approaching the use frequency band of the radio system 10 to be controlled. By this means, it is possible to prevent interference with other radio systems 10 more strongly. Further, the control unit 320 may determine that there is no possibility of overlapping of use frequency bands in the case where a direction in which other radio systems 10 change the use frequency bands over time is a direction away from the use frequency band of the radio system 10 to be controlled. By this means, it is possible to reduce cases where it is determined that there is a possibility of overlapping of use frequency bands, so that it is possible to prevent the radio system 10 to be controlled from performing unnecessary frequency hopping. Note that the radio system 10 which changes the use frequency band over time can include, for example, a radar system.

The control unit 320 determines whether or not other radio systems 10 change the use frequency bands over time based on the network information of the other radio systems 10. The control unit 320 may know whether or not other radio systems 10 change the use frequency bands over time from the DB registration information or may know from the sensing information through determination processing. In the case where it is determined whether or not other radio systems 10 change the use frequency bands over time based on the sensing information, the sensor apparatus 500 preferably senses a wider bandwidth around the frequency band of the radio system 10 to be controlled as well as the use frequency band of the radio system 10 to be controlled. Sensing by the sensor apparatus 500 and the determination processing at the control unit 320 will be described with reference to FIG. 22 and FIG. 23.

Figure 22:
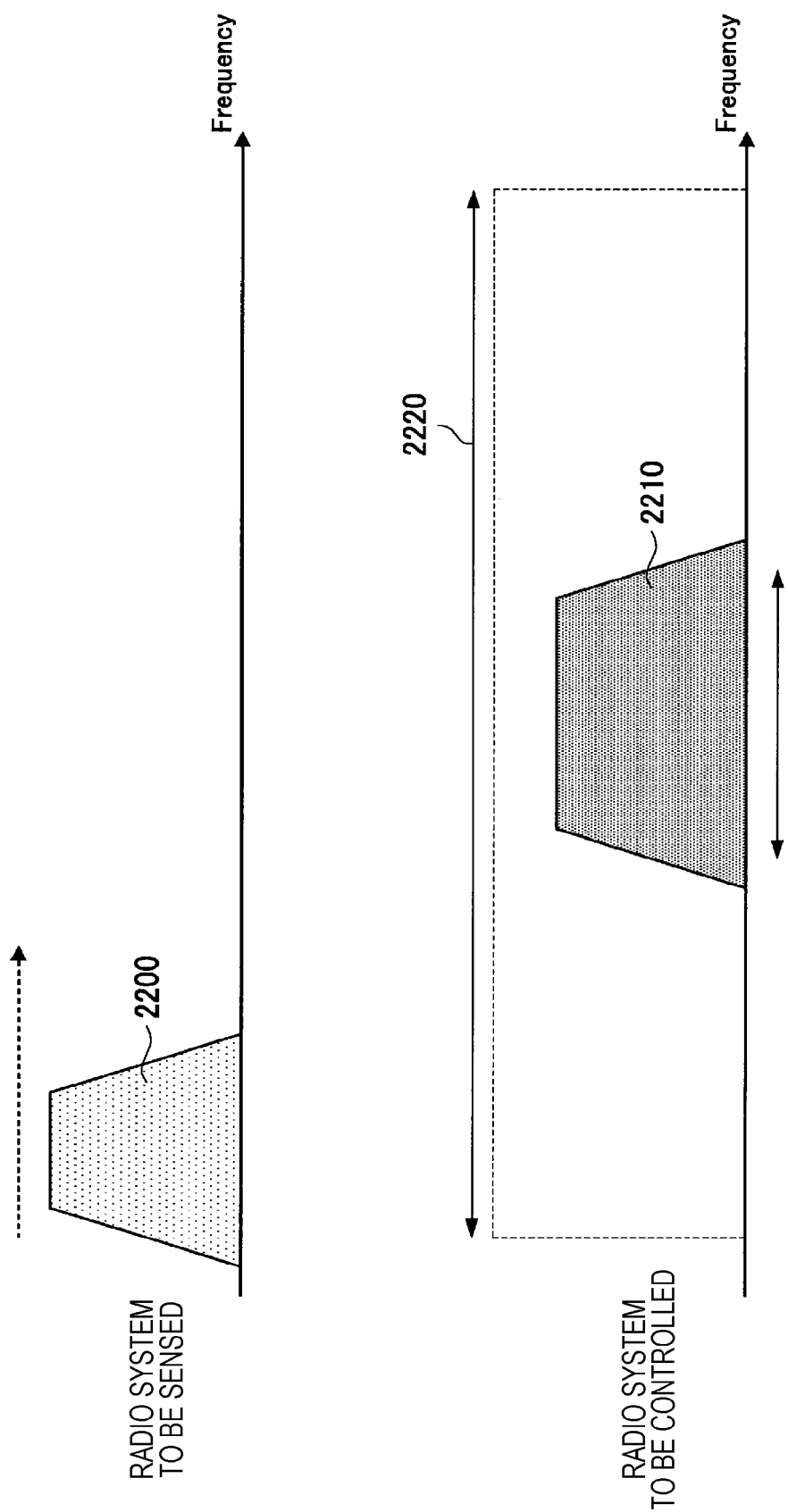
FIG. 22 is an explanatory diagram for explaining temporal change of use frequency bands by the radio system according to the present embodiment.
Figure 23:
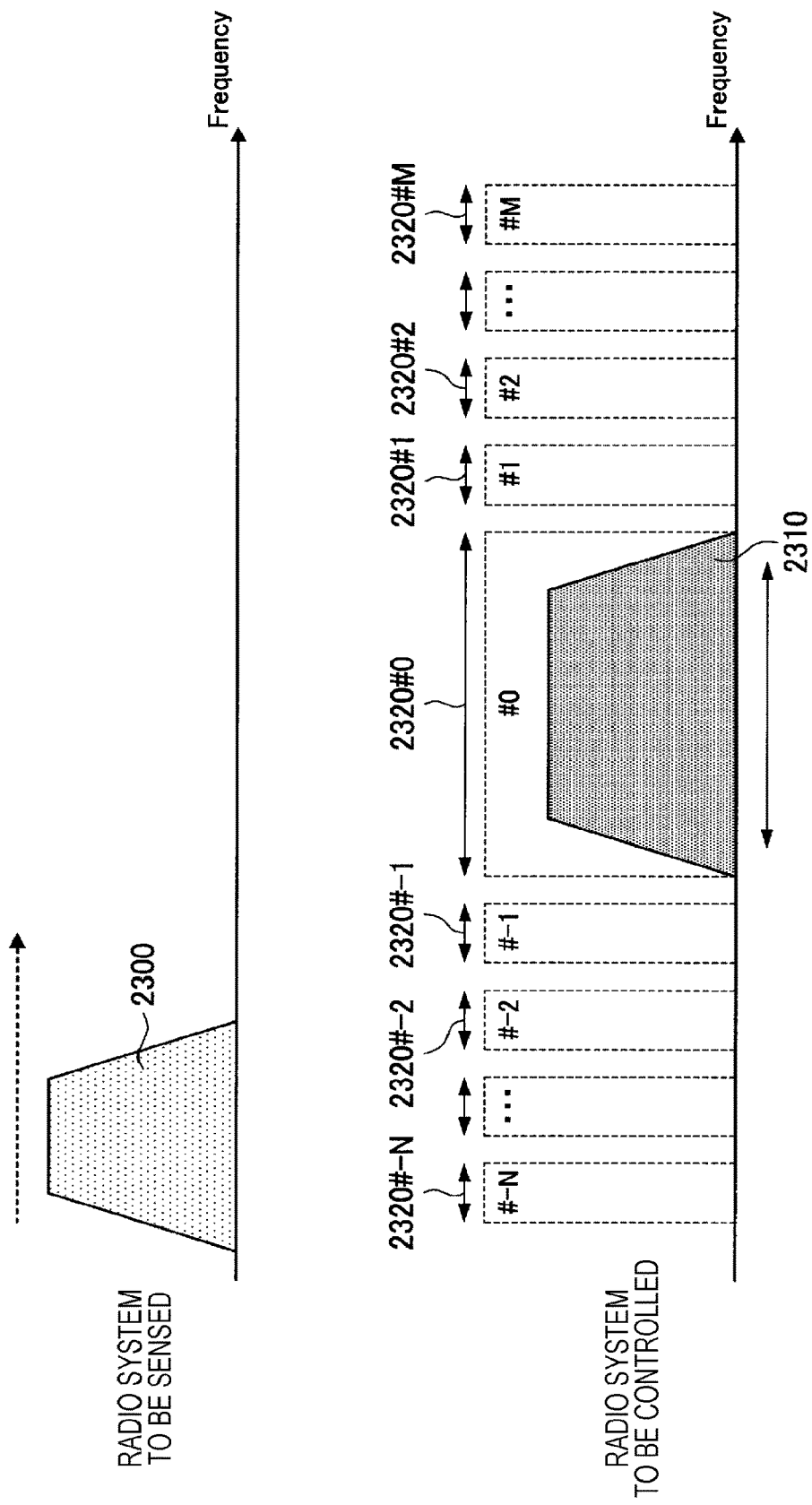
FIG. 23 is an explanatory diagram for explaining temporal change of use frequency bands by the radio system according to the present embodiment.

FIG. 22 and FIG. 23 are explanatory diagrams for explaining temporal change of the use frequency band by the radio system 10 according to the present embodiment.

For example, FIG. 22 illustrates an example where the radio system to be sensed changes the use frequency band from a low band to a high band over time. A reference numeral 2200 indicates a frequency band to be utilized by another radio system 10 which is not to be controlled, and a reference numeral 2210 indicates a frequency band to be utilized by the radio system 10 to be controlled. Further, the sensor apparatus 500 senses a range (reference numeral 2220) wider than the frequency band to be utilized by the radio system 10 to be controlled. In this manner, by the sensor apparatus 500 sensing a wider range, the control unit 320 can detect that there exists a radio system 10 which changes a frequency band over time and that a direction in which the radio system 10 changes the frequency band over time is a direction approaching the use frequency band before the frequency band overlaps with the use frequency band of the radio system to be controlled. By this means, it is possible to promptly execute frequency hopping at the radio system 10 to be controlled, so that it is possible to increase a possibility of reducing interference with other radio systems 10 and preventing degradation.

Here, while FIG. 22 illustrates an example where the sensor apparatus 500 continuously senses a bandwidth, as illustrated in FIG. 23, the sensor apparatus 500 may discretely sense a bandwidth. A reference numeral 2300 indicates a frequency band utilized by another radio system 10 which is not to be controlled, and a reference numeral 2310 indicates a frequency band utilized by the radio system 10 to be controlled. Further, the sensor apparatus 500 senses a range wider than the frequency band utilized by the radio system 10 to be controlled for each of bands which are obtained by discretely separating the band into indexes #–N to #M (reference numerals 2320#–N2320#M). In the case where the sensor apparatus 500 discretely performs sensing, because a state where the use frequency changes over time appears as detected change of the channel, the control unit 320 can easily detect temporal change of the use frequency of the radio system 10. Further, because, at the sensor apparatus 500, one sensing band can be made narrower, for example, also in the case where energy detection is performed in individual bands, it is possible to moderate requirements of a sensing technology which are individually required. Note that, while, in FIG. 23, a bandwidth is set at intervals of a fixed frequency, the bandwidth may be set at an arbitrary interval. Further, while FIG. 23 illustrates a bandwidth to be sensed such that the use frequency band of the radio system 10 to be controlled is the widest, and other bandwidths are narrow, the bandwidths may be equal or other bandwidths may be wider. In this case, it is possible to make sensing at the sensor apparatus 500 simpler.

Note that, while FIG. 22 and FIG. 23 illustrate examples where the frequency band changes from a low band to a high band over time, the same also applies to the case where the frequency band changes from a high band to a low band over time. Further, the above-described temporal change of the use frequency band is made different from hopping in a time direction in frequency hopping. For example, it is also possible to regard change of the use frequency band in a unit longer than an arbitrary unit in a time direction as temporal change and regard change of the use frequency band in a shorter unit as hopping. Other than the above, it is also possible to regard change of the frequency band without performing communication as in the radar system as temporal change and regard change of the frequency band while performing communication as hopping.

Interference Determination Based on Overlapping of Operating Locations

For example, the control unit 320 determines that there is a possibility of interference in the case where there is a possibility that the operating location of the radio system 10 to be controlled may at least partially overlap with the operating locations of other radio systems 10. The control unit 320 determines overlapping of the operating locations based on the network information and determines a possibility of interference based on this determination result.

Interference Determination Based on Overlapping of Operating Periods

For example, the control unit 320 determines that there is a possibility of interference in the case where the operating period of the radio system 10 to be controlled may at least partially overlap with the operating periods of other radio systems 10. The control unit 320 determines overlapping of the operating periods based on the network information and determines a possibility of interference based on this determination result.

The use frequency band, the operating location and the operating period have been described above as an example of the criteria for determining a possibility of interference. The control unit 320 may use these determination criteria in combination. For example, the control unit 320 may determine that there is a possibility of interference in the case where at least one of these is satisfied. Further, the control unit 320 can determine that there is no possibility of interference in the case where at least one of these is different or overlapping is equal to or less than a predetermined ratio.

Ratio of Overlapping of Use Frequency Bands

The control unit 320 may decide the operation mode based on a ratio of the use frequency band of the radio system 10 to be controlled overlapping with the use frequency bands of other radio systems 10. The control unit 320 calculates a ratio of overlapping of the frequency bands based on the network information of each radio system 10. Hereinafter, this ratio will be also referred to as an overlap bandwidth ratio (OBWR). There are various ways how the frequency bands overlap and various methods for calculating the ratio OBWR. Specific examples will be described below with reference to FIG. 24 to FIG. 27.

FIG. 24 to FIG. 27 are explanatory diagrams for explaining an example of calculation of a ratio of overlapping of the use frequency bands. FIG. 24 to FIG. 27 illustrate examples where part of in-band radiation overlaps among the use frequency bands of two radio systems 10. Further, in each drawing, an upper part indicates a frequency band utilized by the other radio system 10 which is not to be controlled, and a lower part indicates a frequency band utilized by the radio system 10 to be controlled. Further, F1L and F1H respectively indicate a lower limit and an upper limit of the use frequency band of the other radio system 10. In a similar manner, F2L and F2H respectively indicate a lower limit and an upper limit of the use frequency band of the radio system 10 to be controlled. A calculation equation of the OBWR in the drawing is an equation for calculating a ratio OBWR of overlapping of the frequency bands. Here, a ratio of overlapping is calculated using a bandwidth utilized by the other radio system as a reference (denominator).

Figure 24:
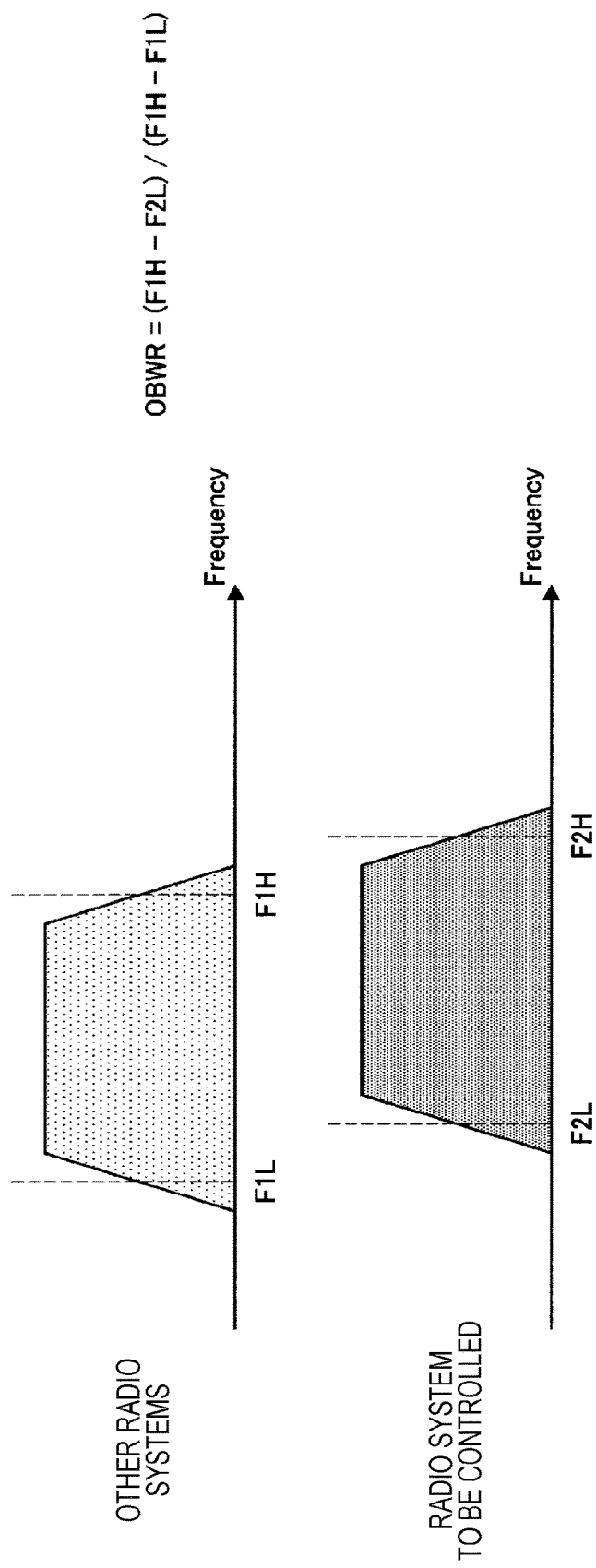
FIG. 24 is an explanatory diagram for explaining an example of calculation of a ratio of overlapping of use frequency bands.
Figure 25:
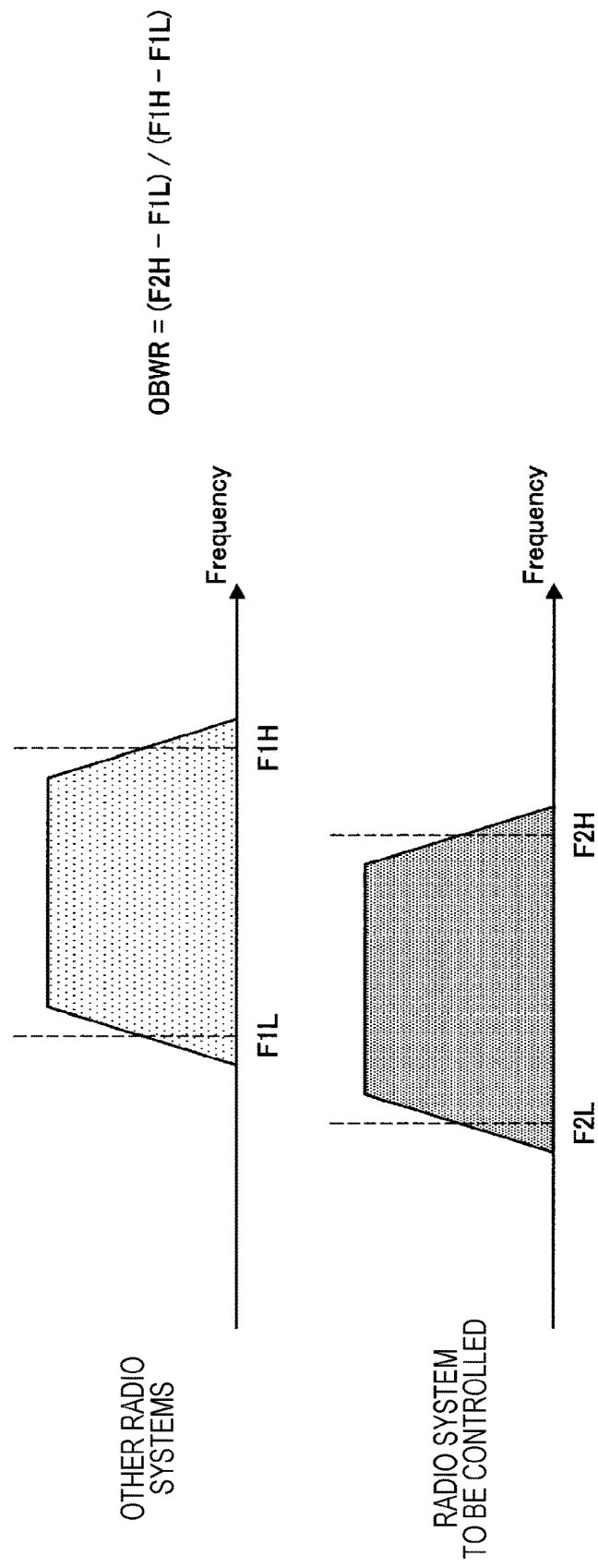
FIG. 25 is an explanatory diagram for explaining an example of calculation of a ratio of overlapping of use frequency bands.
Figure 26:
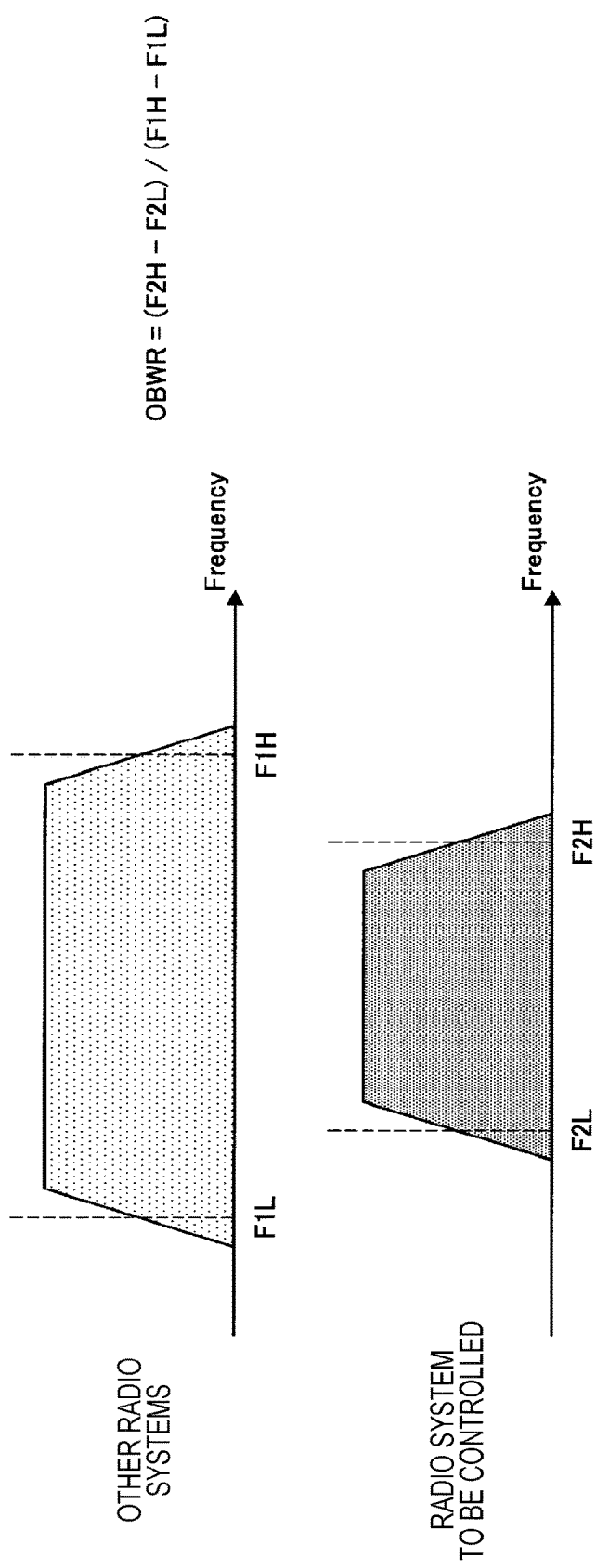
FIG. 26 is an explanatory diagram for explaining an example of calculation of a ratio of overlapping of use frequency bands.
Figure 27:
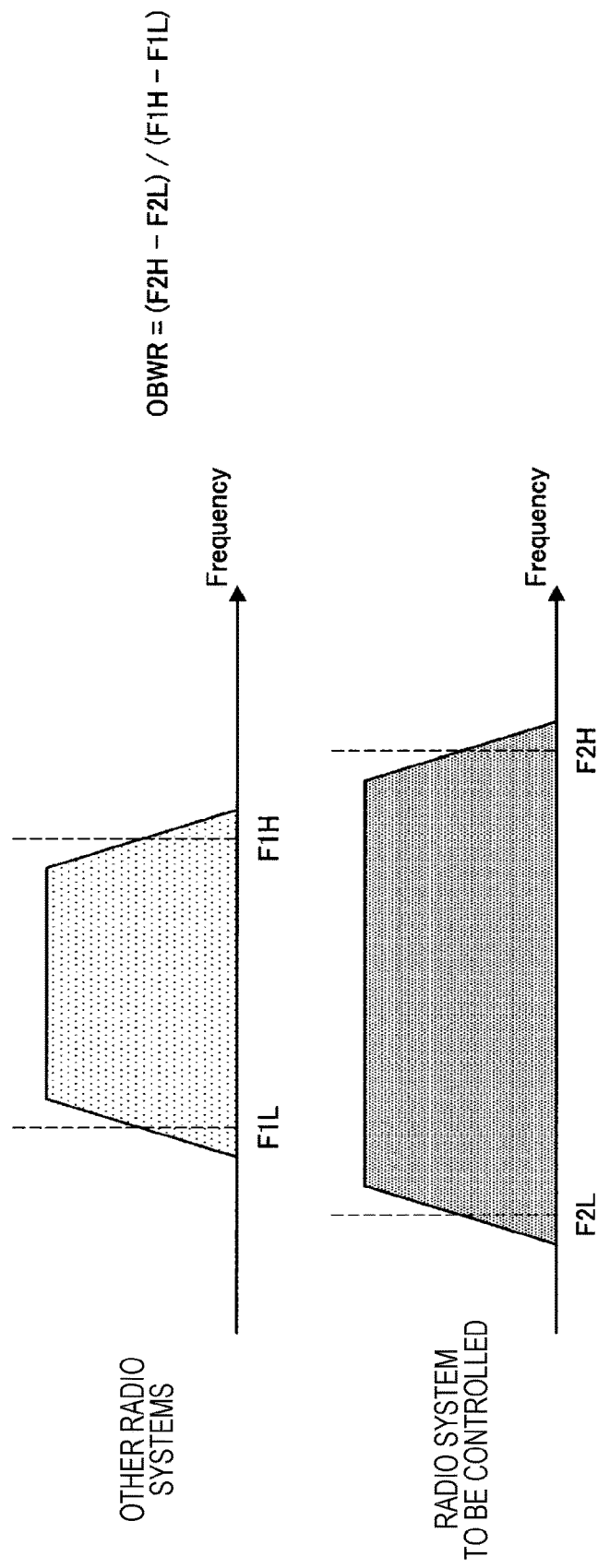
FIG. 27 is an explanatory diagram for explaining an example of calculation of a ratio of overlapping of use frequency bands.

More specifically, in the example of FIG. 24, the ratio OBWR is calculated from (F1H−F2L)/(F1H−F1L). In the example of FIG. 25, the ratio OBWR is calculated from (F2H−F1L)/(F1H−F1L). In the example of FIG. 26, the ratio OBWR is calculated from (F2H−F2L)/(F1H−F1L). In the example of FIG. 27, the ratio OBWR is calculated from (F2H−F2L)/(F1H−F1L).

For example, the control unit 320 decides the operation mode based on whether or not the calculated ratio OBWR exceeds a threshold λ. For example, the control unit 320 decides the frequency hopping mode as the operation mode in the case where the ratio OBWR exceeds the threshold λ and decides the normal mode as the operation mode in the case where the ratio OBWR is equal to or less than the threshold λ. The threshold λ can be provided from, for example, the DB 400, or the like. Further, the threshold λ may be different according to other radio systems 10 to be calculated.

Note that, while, in FIG. 24 to FIG. 27, concerning F1L, F1H, or the like, a reference corresponding to a bandwidth of 3 dB is used, a method for setting such a value is not necessarily desirable. As another method for setting F1L, F1H, or the like, for example, a value also taking into account out-of-band radiation may be set. Further, F1L, F1H, or the like, are preferably registered in the DB 400 for each radio system and provided as part of the network information. Further, other than the examples illustrated in FIG. 24 to FIG. 27, for example, there are a possible case where the use frequency bands of the two radio systems 10 completely match, a possible case where the in-band radiation overlaps with the out-of-band radiation, or the like.

An example of criteria for deciding the operation mode has been described above.

(Frequency Hopping Pattern Decision Function)

The control unit 320 decides information relating to the frequency hopping pattern according to information of the radio system 10 with which the radio system 10 to be controlled is likely to interfere.

For example, the control unit 320 decides a frequency band in which frequency hopping is performed according to network information of the radio system 10 with which the radio system 10 to be controlled is likely to interfere. Specifically, for example, the control unit 320 decides to perform frequency hopping in a frequency band which overlaps with the frequency bands utilized by other radio systems 10 which are likely to interfere. By this means, it is possible to reduce interference with other radio systems 10. Further, the radio system 10 to be controlled can utilize more radio resources while being interfered with other radio systems 10. An example of frequency hopping in the case where such control is performed will be described with reference to FIG. 28 and FIG. 29.

Figure 28:
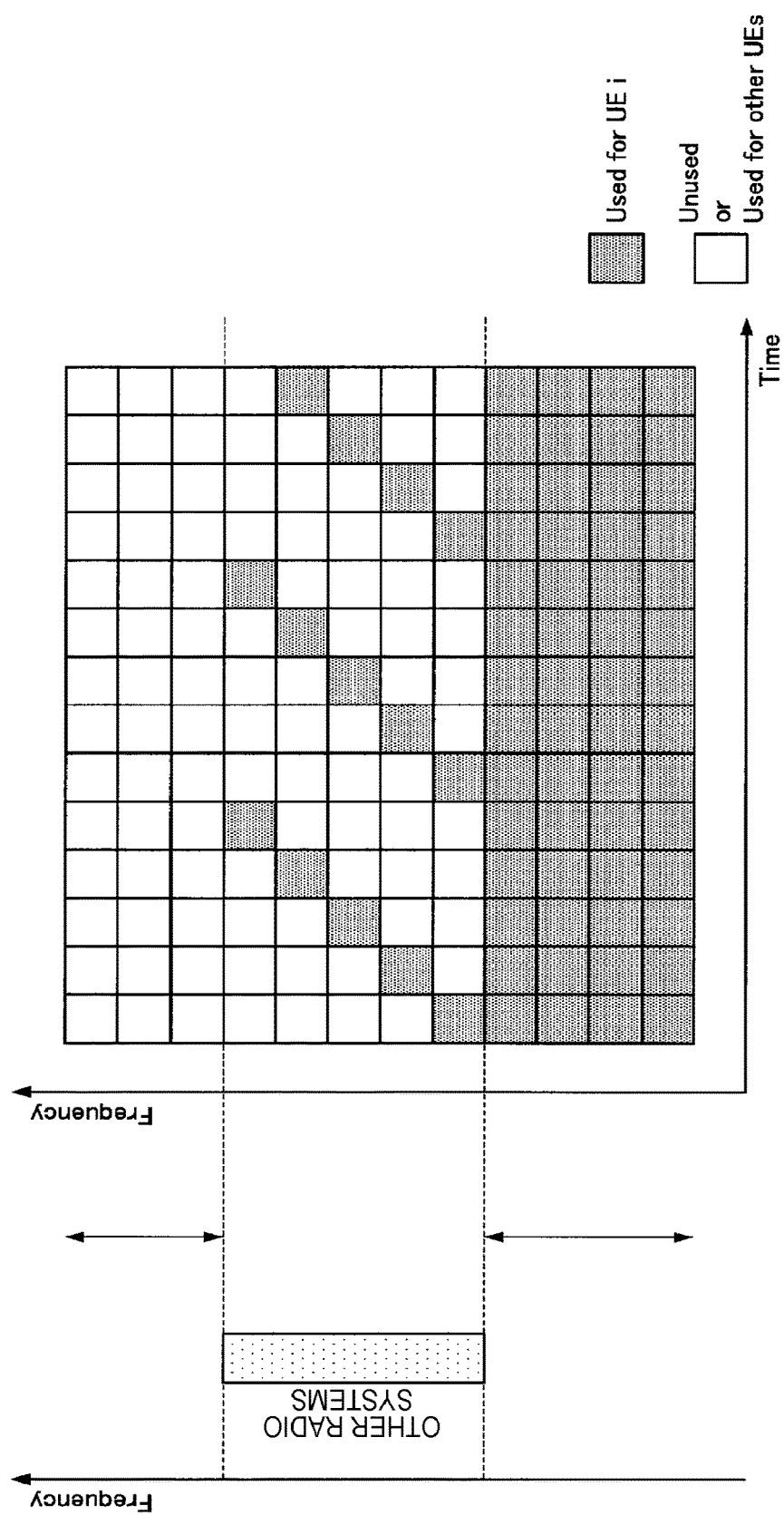
FIG. 28 is an explanatory diagram for explaining an example of a frequency hopping pattern in the radio system to be controlled according to the present embodiment.
Figure 29:
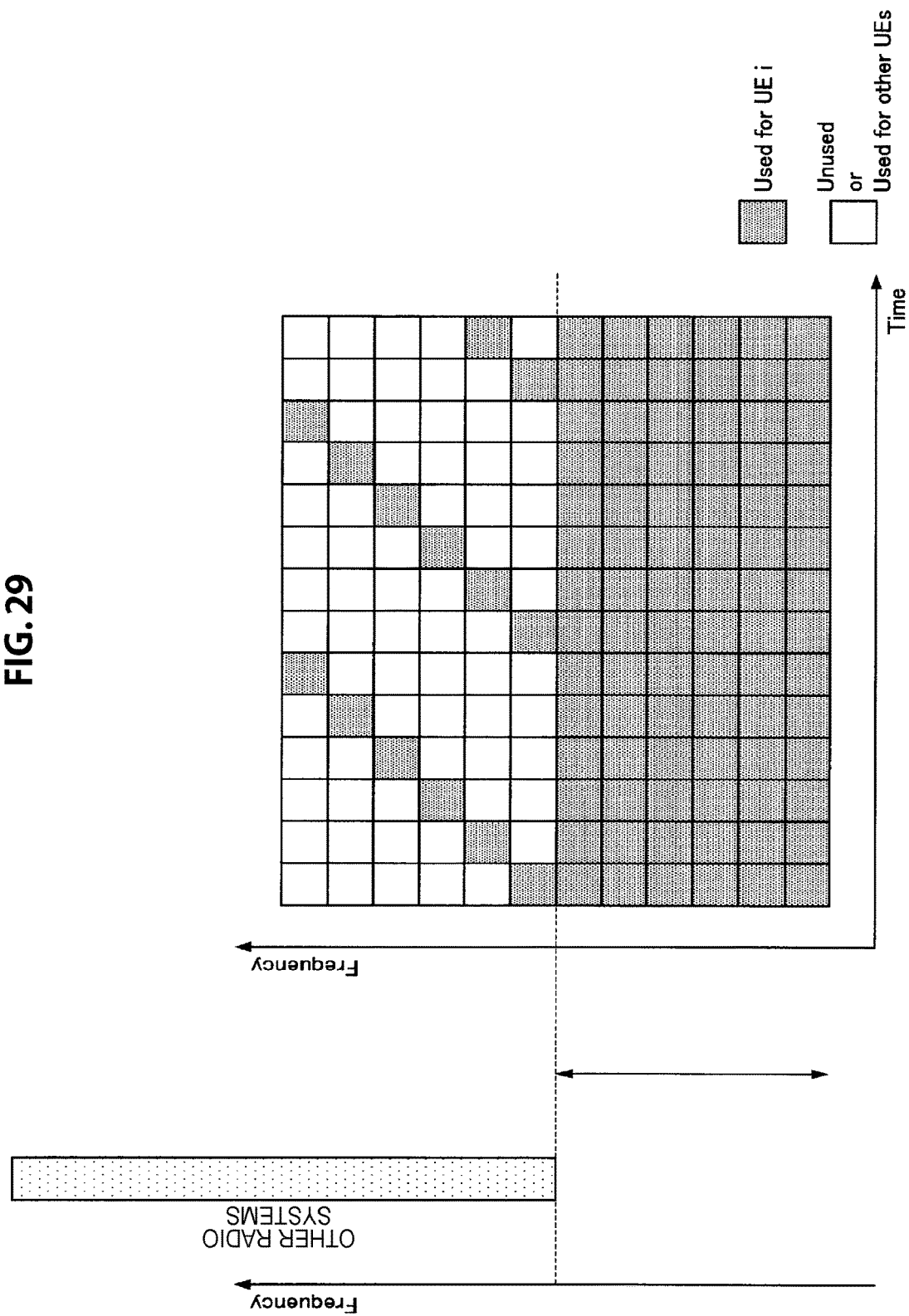
FIG. 29 is an explanatory diagram for explaining an example of a frequency hopping pattern in the radio system to be controlled according to the present embodiment.

FIG. 28 and FIG. 29 are explanatory diagrams for explaining an example of the frequency hopping pattern in the radio system 10 to be controlled according to the present embodiment. In the example illustrated in FIG. 28, the radio system 10 to be controlled performs frequency hopping in the frequency bands utilized by other radio systems 10, so that part of the frequency band which is not utilized by the radio systems 10 can be partially utilized. In the example illustrated in FIG. 29, the radio system 10 to be controlled performs frequency hopping in the frequency bands utilized by other radio systems 10, so that all of the frequency band which is not utilized by the radio systems 10 can be utilized. Note that the control unit 320 may decide to perform frequency hopping in a band other than the frequency band which overlaps with the frequency bands utilized by other radio systems 10 which are likely to interfere or may decide not to perform frequency hopping in an overlapped region.

While the frequency bands of the radio systems 10 which are likely to interfere have been described above, the control unit 320 can decide other information relating to the frequency hopping according to the network information of the radio systems 10 with which the radio system 10 to be controlled is likely to interfere.

For example, the control unit 320 may decide a time slot in which the radio system 10 to be controlled performs frequency hopping according to a time slot in which the radio systems 10 which are likely to interfere are operated. Specifically, the control unit 320 may decide a time slot in which frequency hopping is performed so that frequency hopping is performed in a time slot which overlaps with a time slot in which the radio systems 10 which are likely to interfere are operated or time slots before and after the time slot. By this means, it is possible to reduce interference with other radio systems 10. Further, the radio system 10 to be controlled can utilize more radio resources.

For example, the control unit 320 may decide a location where the radio system 10 to be controlled performs frequency hopping according to locations where the radio systems 10 which are likely to interfere are operated. Specifically, the control unit 320 may decide a location where frequency hopping is performed so that frequency hopping is performed at a location which overlaps with the locations where the radio systems 10 which are likely to interfere are operated or locations near the locations. By this means, it is possible to reduce interference with other radio systems 10. Further, the radio system 10 to be controlled can utilize more radio resources.

The control unit 320 decides a hopping pattern of frequency hopping performed by the radio system 10 to be controlled. For example, the control unit 320 may decide a pattern of frequency hopping performed by the radio system 10 to be controlled according to patterns of frequency hopping performed by other radio systems 10 which are likely to interfere. Specifically, the control unit 320 may decide a hopping pattern different from hopping patterns of frequency hopping performed by other radio systems 10 which are likely to interfere as a hopping pattern of frequency hopping performed by the radio system 10 to be controlled. In this case, it is possible to reduce a possibility of overlapping and collision of frequency hopping patterns, so that it is possible to further reduce interference. Note that, in order to easily decide different patterns, the number of frequency hopping patterns is preferably limited to a finite number.

In the Case where Radio System Utilizes a Plurality of Frequency Bands

The radio system 10 can utilize a plurality of frequency bands. For example, in the cellular system, a plurality of frequency bands are utilized by a carrier aggregation technology. In the case where a plurality of frequency bands are utilized, there is a possibility that one of the plurality of frequency bands utilized by the radio system 10 may overlap with frequency bands utilized by other radio systems 10. In this case, the control unit 320 may decide to apply frequency hopping in a frequency band which is the same as the frequency bands utilized by other radio systems 10. By this means, it is possible to reduce interference with other radio systems 10 in a portion where the frequency bands overlap and avoid unnecessary frequency hopping in a portion where the frequency bands do not overlap. Such a case will be specifically described below with reference to FIG. 30.

Figure 30:
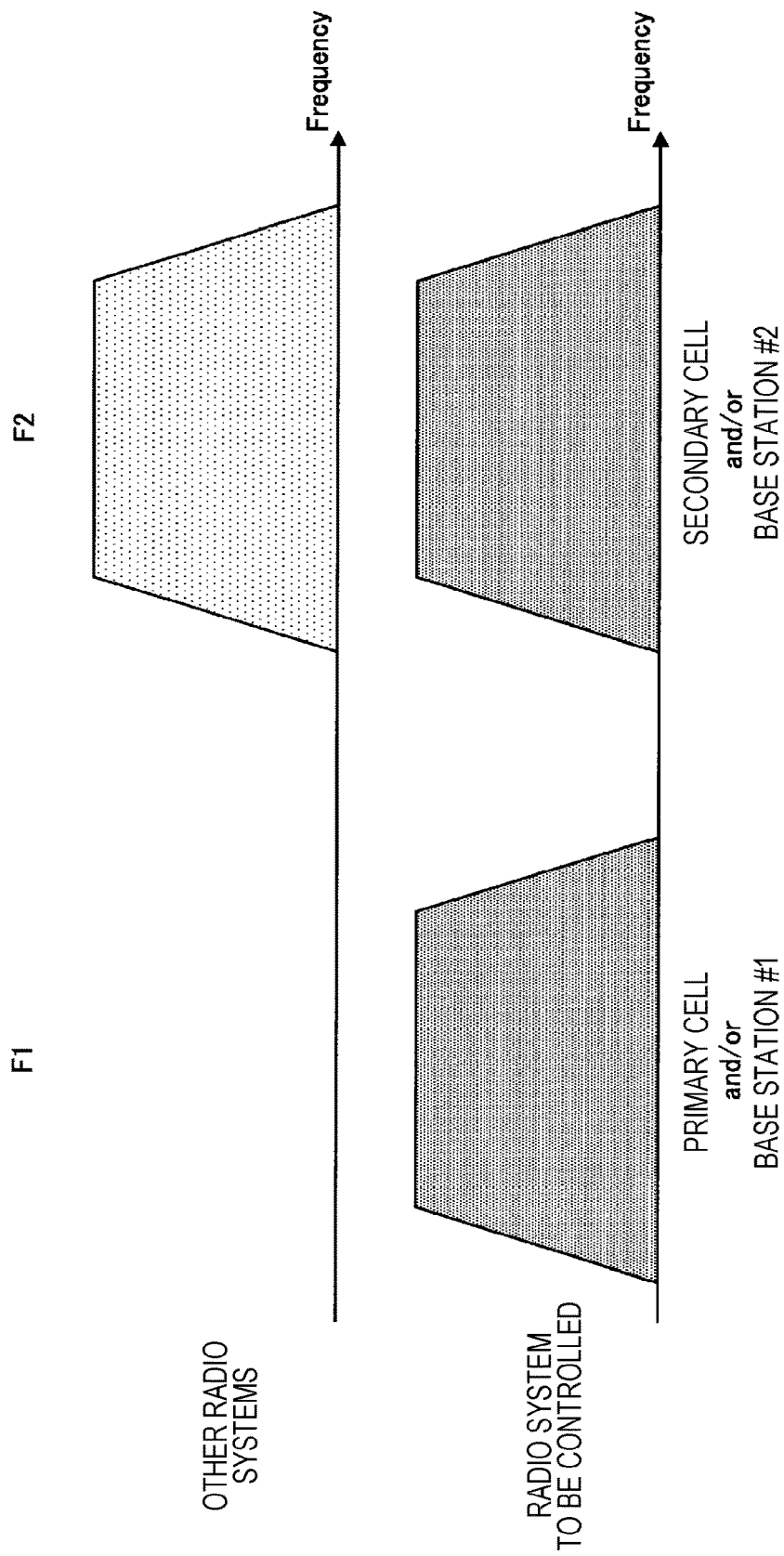
FIG. 30 is an explanatory diagram for explaining an example where use frequency bands of two radio systems partially overlap with each other.

FIG. 30 is an explanatory diagram for explaining an example where use frequency bands of two radio systems 10 partially overlap. In FIG. 30, an upper part indicates a frequency band utilized by the other radio system 10 which is not to be controlled, and a lower part indicates a frequency band utilized by the radio system 10 to be controlled. As illustrated in FIG. 30, the radio system 10 to be controlled utilizes two frequency bands F1 and F2. The frequency band F1 is utilized by a primary cell and/or a base station #1, and the frequency band F2 is utilized by a secondary cell and/or a base station #2. As illustrated in FIG. 30, the frequency band F2 utilized by the secondary cell and/or the base station #2 overlaps with the use frequency band F1 of the other radio system 10. Therefore, the control unit 320 makes decision such that the secondary cell and/or the base station #2 performs frequency hopping and the primary cell and/or the base station #1 does not perform frequency hopping. By this means, frequency hopping is performed in the frequency band F2, and interference with the other radio system 10 is reduced. Further, unnecessary frequency hopping processing in the frequency band F1 is avoided.

Note that the radio system 10 to be controlled may notify each communication node of the frequency hopping setting information concerning a portion where the frequency bands overlap using a portion where the frequency bands do not overlap. For example, in the example illustrated in FIG. 30, the radio system 10 to be controlled notifies each communication node of the frequency hopping setting information concerning the frequency band F2 using the frequency band F1. In this event, for example, a control channel or a broadcast channel can be used in the frequency band F1. Such a case will be specifically described below with reference to FIG. 31.

Figure 31:
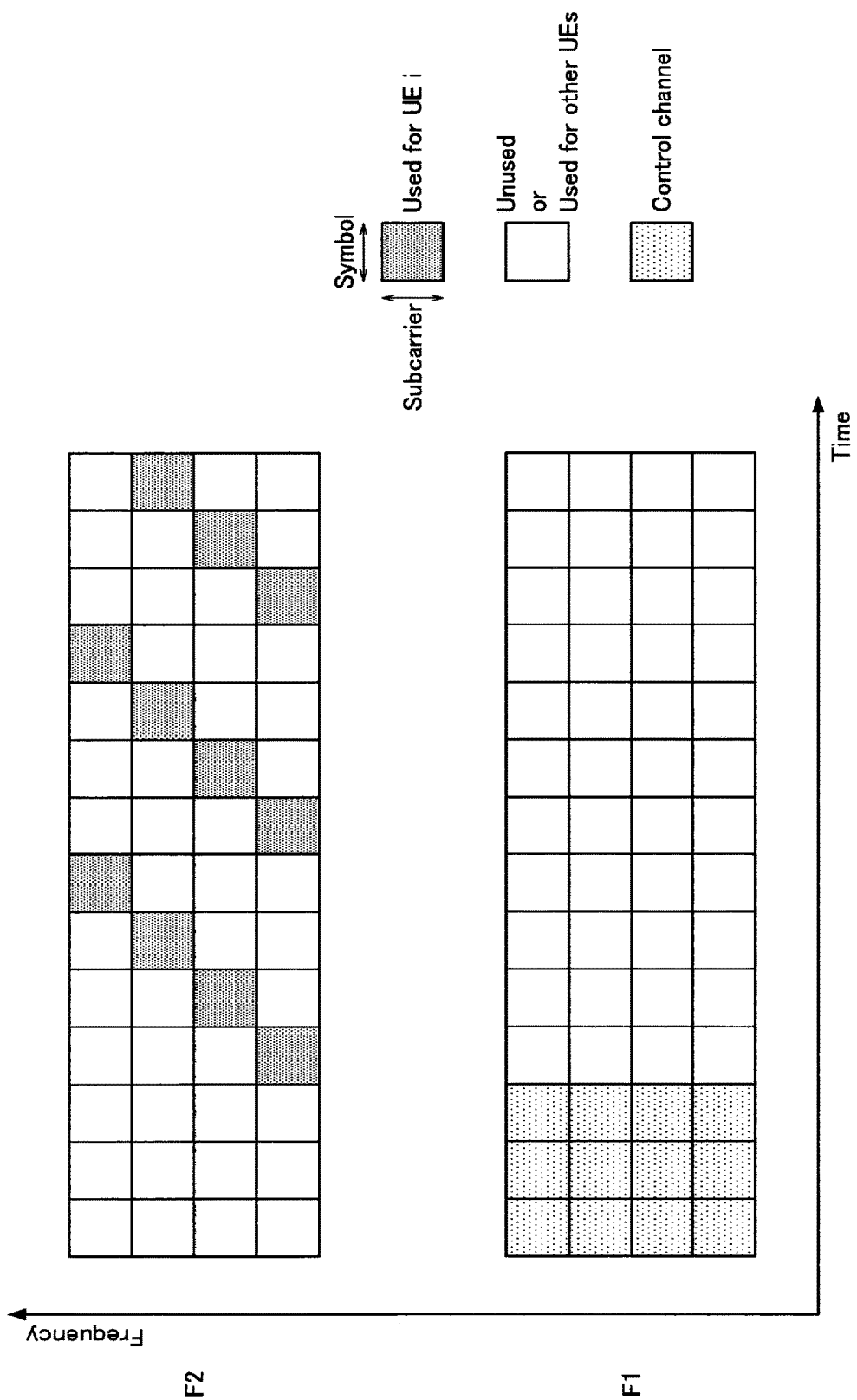
FIG. 31 is an explanatory diagram for explaining an example where use frequency bands of two radio systems partially overlap with each other.

FIG. 31 is an explanatory diagram for explaining an example where use frequency bands of two radio systems 10 partially overlap. FIG. 31 illustrates notification of the frequency hopping setting information at the radio system 10 to be controlled and an example of a radio resource utilized for transmitting data by performing frequency hopping in the example illustrated in FIG. 30. The frequency bands F1 and F2 in the drawing are the same as those used in FIG. 30. As illustrated in FIG. 31, the radio system 10 to be controlled performs notification of the frequency hopping setting information concerning the frequency band F2 using a control channel (and a DCI) of the frequency band F1. Further, as illustrated in FIG. 31, the radio system 10 to be controlled performs frequency hopping in the frequency band F2 based on the frequency hopping setting information notified using the control channel (and the DCI) of the frequency band F1.

(Frequency Hopping Setting Information Generation Function)

The control unit 320 decides a frequency hopping pattern utilized by the radio system 10 to be controlled and generates frequency hopping setting information indicating the decided frequency hopping pattern. An example of the frequency hopping setting information is indicated in the following table.

TABLE 7

Frequency hopping setting information

Information indicating frequency hopping ON/OFF
Information indicating frequency hopping pattern
Information indicating frequency band in which
frequency hopping is performed
Information indicating time slot in which frequency hopping is performed
Information indicating location where frequency hopping is performed Information Indicating Frequency Hopping ON/OFF Information indicating frequency hopping ON/OFF is information indicating whether or not the radio system 10 to be controlled performs frequency hopping, and information indicating the operation mode decided by the above-described operation mode decision function. For example, the information indicates ON in the case of the frequency hopping mode and indicates OFF in the case of the normal mode.

Information Indicating Frequency Hopping Pattern

Information indicating the frequency hopping pattern is information indicating a frequency hopping pattern performed by the radio system 10 to be controlled. There are various possible methods for indicating the frequency hopping pattern. As an example, the control unit 320 decides a pattern using parameters relating to one or more categories defining the frequency hopping pattern and performs notification of the parameters as the information indicating the frequency hopping pattern. The control unit 320 can simplify processing for deciding the pattern and performing notification by employing the parameters as the information indicating the frequency hopping pattern. The information indicating the frequency hopping pattern may be an index indicating any of candidates for the frequency hopping patterns limited to a finite number. In this case, it is possible to further simplify processing for deciding the pattern and performing notification.

It is preferable to employ parameters relating to different categories. As an example, the control unit 320 can employ parameters relating to four categories indicated in the following table.

TABLE 8

Parameters defining frequency hopping pattern

Frequency direction of frequency hopping
Time direction of frequency hopping
Initial offset of frequency hopping
Frequency traveling direction of frequency hopping Parameters of the "frequency direction of frequency hopping" are parameters which define hopping in a frequency direction and can be in various units such as a subcarrier unit, a resource block unit, a component carrier unit, or the like. Parameters of the "time direction of frequency hopping" are parameters which define hopping in a time direction and can be in various units such as a symbol unit, a slot unit, a subframe unit, or the like. Parameters of the "initial offset of frequency hopping" are parameters which define an initial state of a frequency direction or a time direction and can be in various units such as a subcarrier unit, a resource block unit, a component carrier unit, or the like. Note that the unit of the "frequency direction of frequency hopping" is preferably the same as the unit of the "offset of frequency hopping". Parameters of the "frequency traveling direction of frequency hopping" are parameters which define a direction of hopping in a frequency direction and can be a positive direction (hopping from a low frequency band to a high frequency band) or a negative direction (hopping from a high frequency band to a low frequency band).

The control unit 320 can decide the frequency hopping pattern by selecting the above-described four parameters from a finite number of candidates. Because the number of possible values of the parameters is finite, the number of frequency hopping patterns which can be utilized becomes finite. Candidates for this finite number are preferably defined in advance at the radio system 10 to be controlled. Of course, the candidates are not limited to the candidates of the finite number, and the control unit 320 may decide an arbitrary value. An example of candidates relating to each parameter is indicated in the following table.

TABLE 9

| Parameter | Value |
|---|---|
| Frequency direction of frequency hopping (subcarrier unit, resource block unit, component carrier unit, or the like) | 1 |
| | 2 |
| | 4 |
| Time direction of frequency hopping (symbol unit, slot unit, subframe unit, or the like) | 1 |
| | 2 |
| | 4 |
| Initial offset of frequency hopping (subcarrier unit, resource block unit, component carrier unit, or the like) | 0 |
| | 1 |
| | 2 |
| | 3 |
| Frequency traveling direction of frequency hopping | 0 (Positive direction) |
| | 1 (Negative direction) |

Further, an example of the frequency hopping pattern using four parameters is indicated in the following table.

TABLE 10

| Pattern No. | Frequency direction | Time direction | Initial offset | Frequency traveling direction |
|---|---|---|---|---|
| 1 | 1 subcarrier | 1 symbol | 0 subcarrier | 0 |
| 2 | 2 subcarriers | 1 symbol | 0 subcarrier | 0 |

TABLE 10-continued

| Pattern No. | Frequency direction | Time direction | Initial offset | Frequency traveling direction |
|---|---|---|---|---|
| 3 | 4 subcarriers | 1 symbol | 0 subcarrier | 0 |
| 4 | 4 subcarriers | 2 symbols | 0 subcarrier | 0 |
| 5 | 4 subcarriers | 4 symbols | 0 subcarrier | 0 |
| 6 | 4 subcarriers | 1 symbol | 1 subcarrier | 0 |
| 7 | 4 subcarriers | 1 symbol | 2 subcarriers | 0 |
| 8 | 4 subcarriers | 1 symbol | 3 subcarriers | 0 |
| 9 | 4 subcarriers | 4 symbols | 11 subcarriers | 1 |
| 10 | 1 resource block | 1 slot | 0 resource block | 0 |
| 11 | 1 resource block | 2 slots | 2 resource blocks | 1 |
| 12 | 1 component carrier | 1 symbol | 0 component carrier | 0 |
| 13 | 1 component carrier | 1 slot | 1 component carrier | 1 |

"Pattern No." is information indicating an index of the frequency hopping pattern. Here, FIG. 4 is a frequency hopping pattern using No. 7, FIG. 5 is a frequency hopping pattern using No. 9, and FIG. 6 is a frequency hopping pattern using No. 10.

The frequency hopping pattern can be also obtained using a calculation equation by utilizing information of each category. For example, in the case where an index of a subcarrier prior to application of hopping in a symbol t is $k_b(t)$, a unit of hopping in a frequency direction is $K_{hop}$, a unit in a time direction is $T_{hop}$, a frequency direction offset is $T_{off}$, and the number of subcarriers of the whole system is $K_{total}$, a subcarrier index $k_a(t)$ after application of hopping in the symbol t can be expressed with the following equation.

[Math. 3]

$$k_a(t) = \left\{ k_b(t) + \mathrm{floor}\left(\frac{t}{T_{hop}}\right) k_{hop} + k_{off} \right\} \bmod K_{total} \qquad \text{Equation 3}$$

Here, information of the subcarrier index $k_b(t)$ prior to application of hopping is preferably assigned separately through scheduling. For example, in an LTE base system, the information is preferably assigned to each user (user terminal) using a control channel (PDCCH), or the like.

As another example, a case where frequency hopping is performed in resource block unit will be described. A case is assumed where two slots are normally assigned for each user in a time direction. The transmitting station 200 calculates an index of a resource block in a frequency direction actually utilized for transmission in the assigned first slot using the following equations.

[Math. 4]

$$n_{PRB}^{S1} \qquad \text{Equation 4}$$

[Math. 5]

$$n_{PRB}^{S1} = \tilde{n}_{PRB}^{S1} + \tilde{N}_{RB}^{HO}/2 \qquad \text{Equation 5}$$

Here,

[Math. 6]

$$\tilde{N}_{RB}^{HO} = \begin{cases} N_{RB}^{HO}, & N_{RB}^{HO} = \text{an even number} \\ H_{RB}^{HO}+1, & N_{RB}^{HO} = \text{an odd number} \end{cases} \qquad \text{Equation 6}$$

Note that

[Math. 7]

$$N_{RB}^{HO} \qquad \text{Equation 7}$$

is an initial offset of frequency hopping. Further,

[Math. 8]

$$\tilde{n}_{PRB}^{S1} \qquad \text{Equation 8}$$

is an index of a resource block temporarily assigned before a frequency hopping position is determined. Here,

[Math. 9]

$$N_{RB}^{HO}, \tilde{n}_{PRB}^{S1} \qquad \text{Equation 9}$$

are both notified as the frequency hopping setting information.

On the other hand, the transmitting station 200 calculates an index of a resource block in a frequency direction actually utilized for transmission in the assigned second slot using the following equations.

[Math. 10]

$$n_{PRB} \qquad \text{Equation 10}$$

[Math. 11]

$$n_{PRB} = \tilde{n}_{PRB} + \tilde{N}_{RB}^{HO}/2 \qquad \text{Equation 11}$$

where information relating to the frequency hopping position

[Math. 12]

$$\tilde{n}_{PRB} \qquad \text{Equation 12}$$

is designated as the frequency hopping setting information, and, for example, designated based on a table indicated below as an example, which is defined within the communication system 1.

TABLE 11

| The number of resource blocks $N_{RB}$ in system | Pattern index | Information relating to frequency hopping position $\tilde{n}_{PRB}$ |
|---|---|---|
| 49 or less | 0 | $\{\mathrm{floor}(N_{RB}^{SCH}/2) + \tilde{n}_{PRB}^{S1}\} \bmod N_{PRB}^{SCH}$ |
|  | 1 | Separately designated |
| 50 or more | 0 | $\{\mathrm{floor}(N_{RB}^{SCH}/4) + \tilde{n}_{PRB}^{S1}\} \bmod N_{PRB}^{SCH}$ |
|  | 1 | $\{-\mathrm{floor}(N_{RB}^{SCH}/4) + \tilde{n}_{PRB}^{S1}\} \bmod N_{PRB}^{SCH}$ |
|  | 2 | $\{\mathrm{floor}(N_{RB}^{SCH}/2) + \tilde{n}_{PRB}^{S1}\} \bmod N_{PRB}^{SCH}$ |
|  | 3 | Separately designated |

Note that in the above table, it is assumed that

[Math. 13]

$$N_{RB}^{SCH} = N_{RB} - \tilde{N}_{RB}^{HO} - (N_{RB} \bmod 2) \qquad \text{Equation 13}$$

Further, in the same table, in the case where a pattern corresponding to "separately designated" is indicated, information relating to the frequency hopping positions in the assigned first slot and second slot is obtained using the following equations.

[Math. 14]

$$\tilde{n}_{PRB}(n_s) \qquad \text{Equation 14}$$

-continued

[Math. 15]

$$\tilde{n}_{PRB}(n_s) = [\tilde{n}_{VRB} + f_{hop}(i)N_{RB}^{sb} +$$
$$\{(N_{RB}^{sb} - 1) - 2(\tilde{n}_{VRB} \bmod N_{RB}^{sb})\}f_m(i)] \bmod(N_{RB}^{sb}N_{sb})$$
Equation 15

$$i = \begin{cases} \text{floor } (n_s/2), & \text{inter-subframe hopping} \\ n_s, & \text{intra and inter-subframe hopping} \end{cases}$$

$$n_{PRB} = \begin{cases} \tilde{n}_{PRB}(n_s), & N_{sb} = 1 \\ \tilde{n}_{PRB}(n_s) + \text{ceil } (N_{RB}^{HO}/2), & N_{sb} > 1 \end{cases}$$

$$\tilde{n}_{VRB} = \begin{cases} n_{VRB}, & N_{sb} = 1 \\ n_{VRB}(n_s) + \text{ceil } (N_{RB}^{HO}/2), & N_{sb} > 1 \end{cases}$$

$$N_{RB}^{sb} = \begin{cases} N_{RB}, & N_{sb} = 1 \\ \text{floor}\left\{\dfrac{(N_{RB} - N_{RB}^{HO} - N_{RB}^{HO} \bmod 2)}{N_{sb}}\right\}, & N_{sb} > 1 \end{cases}$$

$$f_{hop}(i) =$$

$$\begin{cases} 0, & N_{sb} = 1 \\ \left\{f_{hop}(i-1) + \sum_{k=10i+1}^{10i+9} c(k)2^{k-(10i+1)}\right\} \bmod N_{sb}, & N_{sb} = 2 \\ \left\{f_{hop}(i-1) + \left(\sum_{k=10i+1}^{10i+9} c(k)2^{k-(10i+1)}\right) \bmod(N_{sb}-1) + 1\right\} \bmod N_{sb}, & N_{sb} > 2 \end{cases}$$

$$f_m(i) =$$

$$\begin{cases} i \bmod 2, & N_{sb} = 1 \text{ and intra} \\ & \text{and inter-subframe hopping} \\ \text{CURRENT\_TX\_NB} \bmod 2, & N_{sb} = 1 \text{ and} \\ & \text{inter-subframe hopping} \\ c(10i), & N_{sb} > 1 \end{cases}$$

Note that $n_s$ is a slot index. The slot index here does not mean the first slot or the second slot assigned to the user, but means, for example, a slot index within a radio frame. Further, $N_{sb}$ is the number of subbands. The subband here means a lump in the case where a certain number of resource blocks are made a lump. Further, $c(i)$ is a pseudo random sequence. Further, $n_{VRB}$ is an index of a resource block temporarily assigned before the frequency hopping position is determined. Further, CURRENT_TX_NB is a transmission number of a transport block to be transmitted. Here, $N_{sb}$, $c(i)$, $n_{VRB}$ and CURRENT_TX_NB are all notified as the frequency hopping setting information.

Information Indicating Frequency Band, Time Slot and Location where Frequency Hopping is Performed The information indicating the frequency band, the time slot and the location where frequency hopping is performed is information for limiting the frequency band, the time and the location where the radio system 10 to be controlled performs frequency hopping. As described above, the control unit 320 can decide these information so that frequency hopping is performed only in a frequency band, a time slot and a location where there is a possibility of interference. By this means, the radio system 10 to be controlled can utilize more radio resources while reducing interference with other radio systems 10.

2-4. DB

Figure 32:
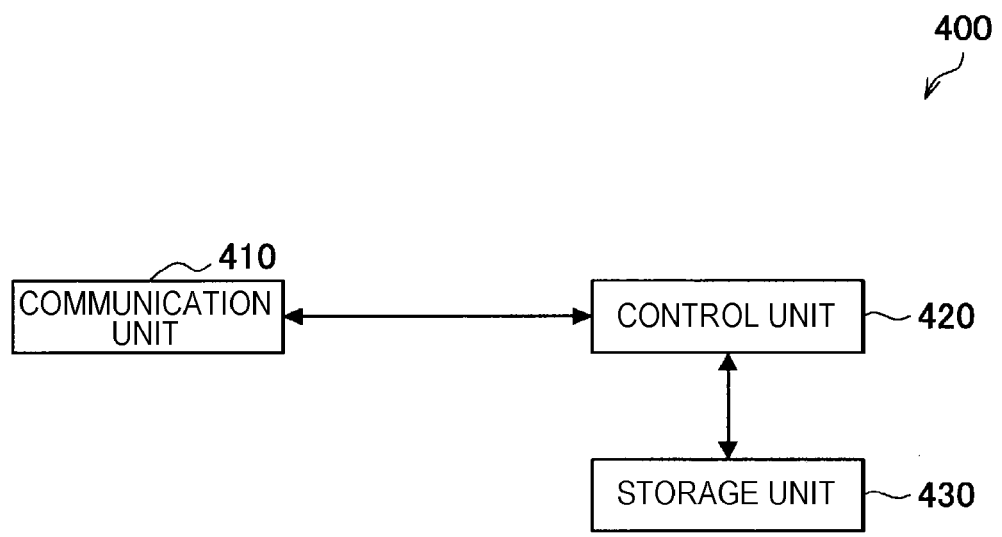
FIG. 32 is a block diagram illustrating an example of a logical configuration of a DB according to the present embodiment.

FIG. 32 is a block diagram illustrating an example of a logical configuration of the DB 400 according to the present embodiment. As illustrated in FIG. 32, the DB 400 according to the present embodiment includes a communication unit 410, a control unit 420 and a storage unit 430.

2-4-1. Communication Unit

The communication unit 410 is a communication interface which mediates communication between the DB 400 and other apparatuses. The communication unit 410 transmits/receives data with other apparatuses in a wired or wireless manner.

For example, the communication unit 410 performs communication with the communication control device 300. For example, the communication unit 410 receives a request for the network information from the communication control device 300. Further, the communication unit 410 transmits the DB registration information to the communication control device 300. The communication unit 410 may utilize the same frequency as the use frequency band of each radio system 10 to transmit the DB registration information or may utilize a different frequency band. In addition, the communication unit 410 receives information indicating a frequency pattern from the communication control device 300.

2-4-2. Control Unit

The control unit 420, which functions as an arithmetic processing apparatus and a control apparatus, controls the whole operation within the DB 400 according to various kinds of programs. The control unit 420 is implemented with an electronic circuit such as, for example, a CPU and a microprocessor. Note that the control unit 420 may include a ROM which stores a program, an operation parameter, or the like, to be used and a RAM which temporarily stores a parameter, or the like, which changes as appropriate.

The control unit 420 returns the DB registration information stored in the storage unit 430 in response to a request for the network information received from the communication control device 300 by the communication unit 410. Further, the control unit 420 controls the DB 400 to record the network information of each radio system 10 received from outside by the communication unit 410 as the DB registration information. For example, the control unit 420 records/updates the information indicating the frequency pattern received from the communication control device 300 by the communication unit 410 as the DB registration information.

Note that the control unit 420 can have a function as the control unit 320 of the communication control device 300.

2-4-3. Storage Unit

The storage unit 430 is a unit which records and reproduces data in and from a predetermined recording medium. The storage unit 430 is implemented as, for example a hard disc drive (HDD). Of course, as the recording medium, there are various possible types of recording media such as a solid memory such as a flash memory, a memory card into which a solid memory is incorporated, an optical disc, a magnetooptical disc, and a hologram memory. It is only necessary to configure the storage unit 430 so as to be able to execute recording and reproduction according to the employed recording medium.

The storage unit 430 stores the network information of each radio system 10 as the DB registration information.

2-5. Sensor Apparatus

Figure 33:
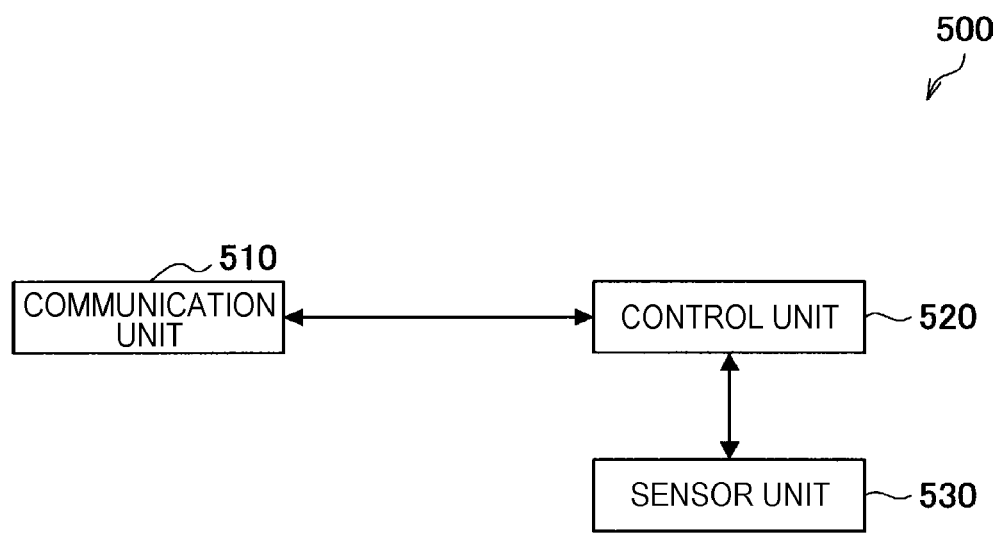
FIG. 33 is a block diagram illustrating an example of a logical configuration of a sensor apparatus according to the present embodiment.

FIG. 33 is a block diagram illustrating an example of a logical configuration of the sensor apparatus 500 according to the present embodiment. As illustrated in FIG. 33, the sensor apparatus 500 according to the present embodiment includes a communication unit 510, a control unit 520 and a sensor unit 530.

[2-5-1. Communication Unit]

The communication unit 510 is an interface which mediates communication between the sensor apparatus 500 and other apparatuses. The communication unit 510 transmits/receives data with other apparatuses in a wired or wireless manner.

For example, the communication unit 510 performs communication with the communication control device 300. For example, the communication unit 510 receives a request for the network information from the communication control device 300. Further, the communication unit 510 transmits the sensing information to the communication control device 300. Note that the communication unit 510 may transmit the sensing information to the DB 400 and transmit the sensing information to the communication control device 300 via the DB 400. The communication unit 410 may utilize the same frequency band as the use frequency band of each radio system 10 or may utilize a different frequency band to transmit the sensing information.

[2-5-2. Control Unit]

The control unit 520, which functions as an arithmetic processing apparatus and a control apparatus, controls the whole operation within the sensor apparatus 500 according to various kinds of programs. The control unit 420 is implemented with an electronic circuit such as, for example, a CPU and a microprocessor. Note that the control unit 520 may include a ROM which stores a program, an operation parameter, or the like, to be used and a RAM which temporarily stores a parameter, or the like, which changes as appropriate.

For example, the control unit 520 controls the communication unit 510 to transmit the sensing information acquired by the sensor unit 530 to the communication control device 300 in response to a request for the network information from the communication control device 300.

The control unit 520 may control the sensor unit 530 to periodically acquire the sensing information or may control the sensor unit 530 to acquire the sensing information by being triggered by reception of a request from the server 300. The control unit 520 controls the communication unit 510 to transmit the acquired sensing information to the communication control device 300 periodically or in response to the request. The sensor apparatus 500 may have a storage unit for accumulating the acquired sensing information and transmit the accumulated sensing information to the communication control device 300.

Note that the control unit 520 can have a function as the control unit 320 of the communication control device 300.

2-5-3. Sensor Unit

The sensor unit 530 has a function of acquiring the sensing information. For example, the sensor unit 530 acquires the sensing information by measuring a received radio wave level for each frequency band. Note that the sensor unit 530 may acquire the sensing information for other radio systems 10 as well as the sensing information of the radio system 10 to be controlled. Further, the sensor unit 530 may sense a frequency band wider than the frequency band utilized by the radio system 10 to be controlled by the communication control device 300 based on control by the control unit 520. In this case, the communication control device 300 can determine that there exists a radio system 10 which changes a use frequency band over time as in the radar system. Further, the sensor unit 530 may divide the frequency band into a plurality of bands and sense the bands. In this case, the communication control device 300 can perform processing of determining whether or not the radio system 10 changes the use frequency band over time more easily.

A configuration example of each component included in the communication system 1 according to the present embodiment has been described above. Subsequently, operation processing of the communication system 1 according to the present embodiment will be described with reference to FIG. 34 to FIG. 54.

3. Operation Processing 3-1. Radio System Control Processing

First, the whole picture of the operation processing of the communication system 1 according to the present embodiment will be described with reference to FIG. 34 and FIG. 35. The operation processing of the communication system 1 can take various forms according to which communication node functions as the communication control device, the transmitting station or the receiving station. AN example of the operation processing will be described below.

Processing Example 1

Figure 34:
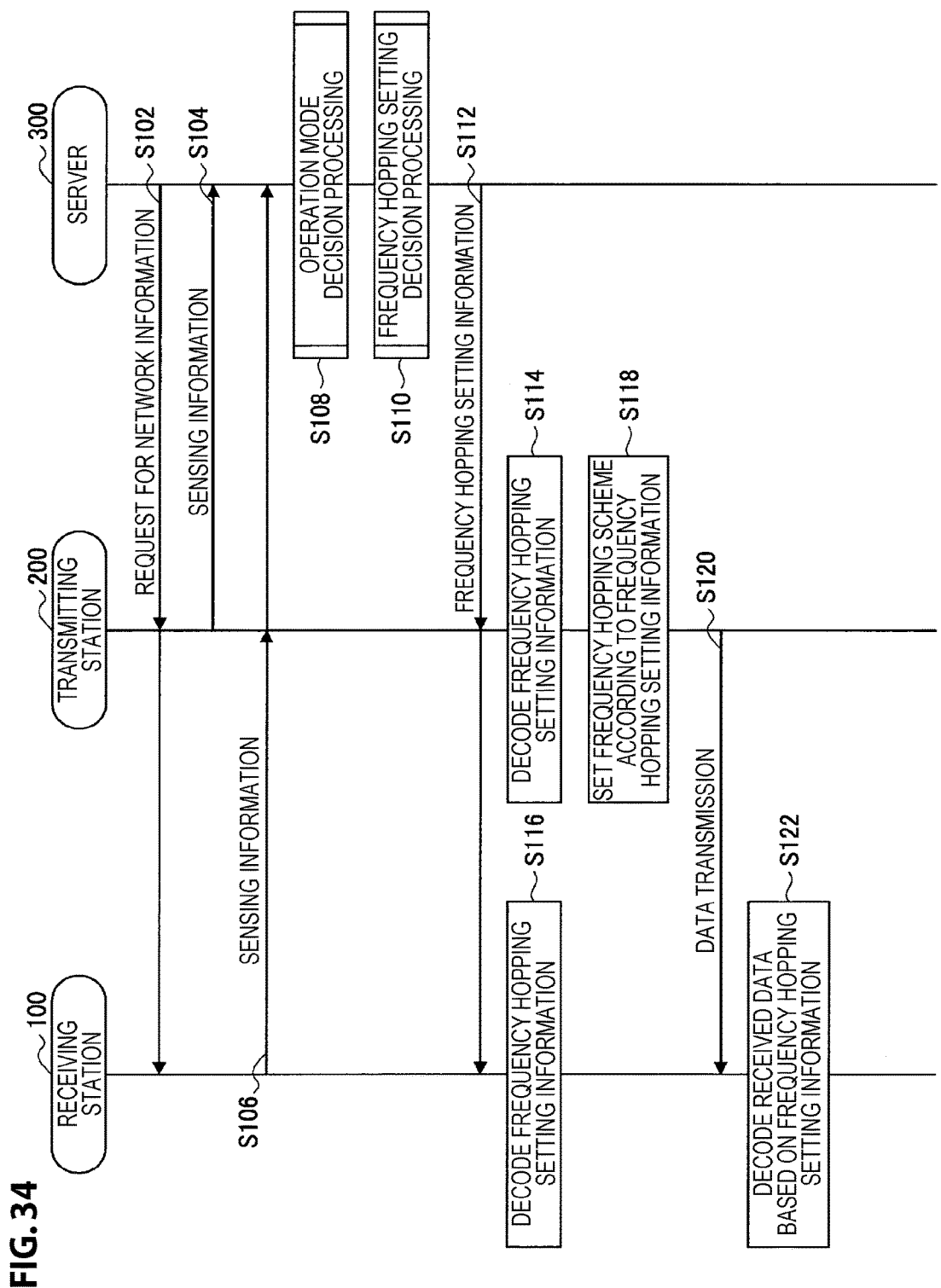
FIG. 34 is a sequence diagram illustrating an example of flow of radio system control processing executed in the communication system according to the present embodiment.

FIG. 34 is a sequence diagram illustrating an example of flow of radio system control processing executed in the communication system 1 according to the present embodiment. As illustrated in FIG. 34, this sequence involves the receiving station 100, the transmitting station 200 and the server 300. In this operation processing example, the server 300 functions as the communication control device. Further, it is assumed that the receiving station 100 and the transmitting station 200 are included in the radio system 10 to be controlled.

As illustrated in FIG. 34, first, in step S102, the server 300 transmits a request for the network information. The server 300, for example, transmits the request to the transmitting station 200, and the transmitting station 200 relays the received request to the receiving station 100.

Then, in step S104, the transmitting station 200 returns the sensing information to the server 300. The transmitting station 200 may periodically acquire the sensing information or may acquire the sensing information by being triggered by reception of the request from the server 300.

In a similar manner, in step S106, the receiving station 100 returns the sensing information to the server 300. In the example illustrated in FIG. 34, the receiving station 100 transmits the sensing information to the transmitting station 200, and the transmitting station 200 relays the received sensing information to the server 300.

Then, in step S108, the server 300 performs operation mode decision processing based on the received sensing information. The server 300 decides the frequency hopping mode or the normal mode as the operation mode of the radio system 10 to be controlled through the operation mode decision processing. Because the processing here will be described later in "3-2. Operation mode decision processing", detailed description will be omitted here. An example of operation processing in the case where the server 300 decides the frequency hopping mode as the operation mode of the radio system 10 to be controlled will be described below.

In step S110, the server 300 performs frequency hopping setting decision processing. The server 300 decides a frequency hopping pattern to be utilized by the radio system 10 to be controlled through the frequency hopping setting decision processing and generates frequency hopping setting information. Because the processing here will be described later in "3-7. Frequency hopping setting decision processing", detailed description will be omitted here.

Then, in step S112, the server 300 transmits the generated frequency hopping setting information. In the example illustrated in FIG. 34, the server 300 transmits the frequency hopping setting information to the transmitting station 200, and the transmitting station 200 relays the received frequency hopping setting information to the receiving station 100.

Then, in step S114, the transmitting station 200 decodes the received frequency hopping setting information.

In a similar manner, in step S116, the receiving station 100 decodes the received frequency hopping setting information.

Then, in step S118, the transmitting station 200 sets a frequency hopping scheme according to the decoded frequency hopping setting information. For example, the transmitting station 200 performs setting such that frequency hopping is performed by utilizing a radio resource according to a rule indicated in the frequency hopping setting information.

Then, in step S120, the transmitting station 200 transmits data while performing frequency hopping using the set frequency hopping scheme. For example, the transmitting station 200 transmits data while performing frequency hopping using the indicated frequency hopping pattern in a frequency band, time slot and location indicated in the frequency hopping setting information.

Then, in step S122, the receiving station 100 decodes data based on the decoded frequency hopping setting information. For example, the receiving station 100 performs decoding processing to acquire data assuming that the transmitting station 200 transmits data while performing frequency hopping using the frequency hopping setting information received in step S112.

An example of the flow of the radio system control processing has been described above.

Processing Example 2

Figure 35:
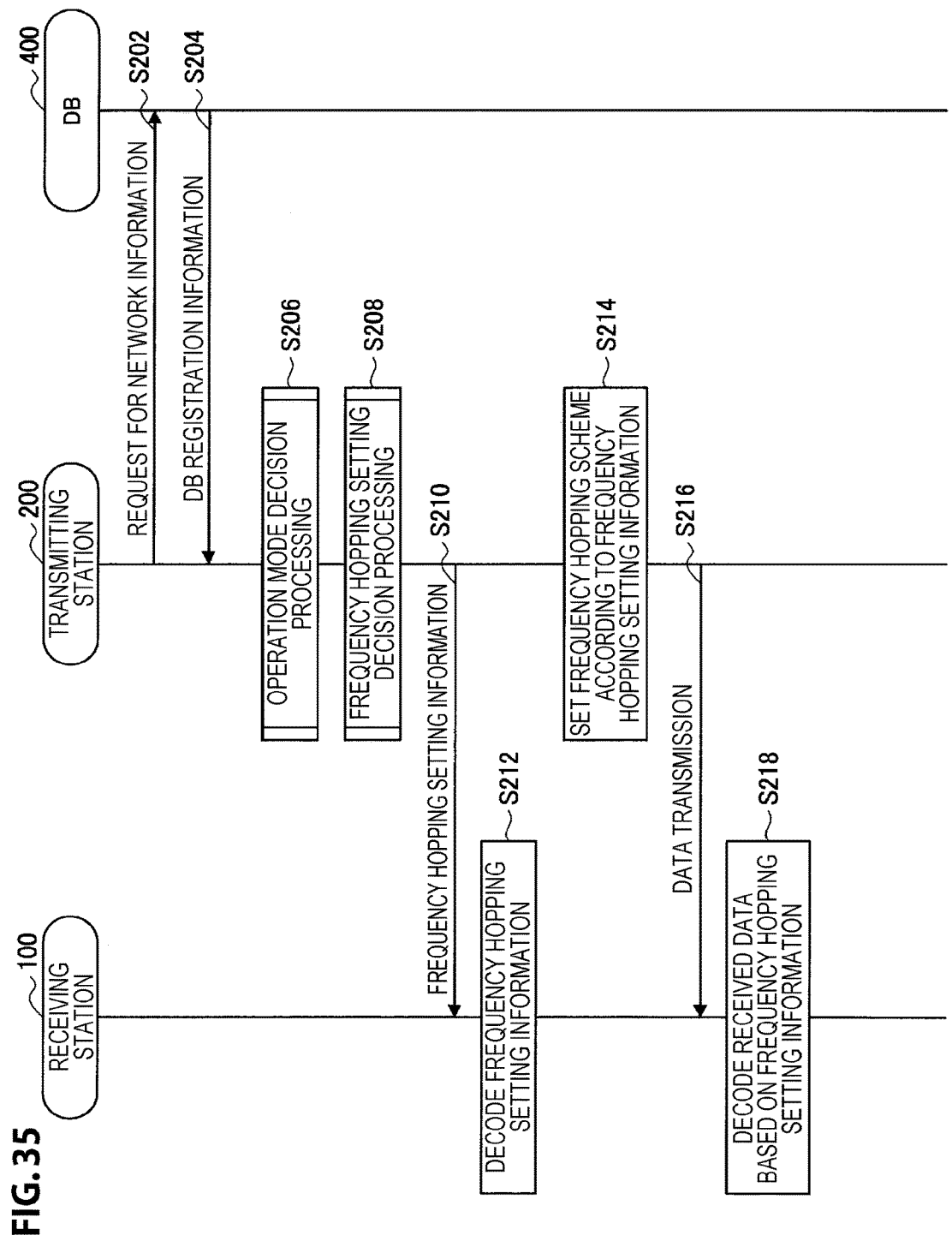
FIG. 35 is a sequence diagram illustrating an example of flow of radio system control processing executed in the communication system according to the present embodiment.

FIG. 35 is a sequence diagram illustrating an example of flow of the radio system control processing executed in the communication system 1 according to the present embodiment. As illustrated in FIG. 35, this sequence involves the receiving station 100, the transmitting station 200 and the DB 400. In this operation processing example, the transmitting station 200 functions as the communication control device. Further, it is assumed that the receiving station 100 and the transmitting station 200 are included in the radio system 10 to be controlled.

As illustrated in FIG. 35, first, in step S202, the transmitting station 200 transmits a request for the network information to the DB 400.

Then, in step S204, the transmitting station 200 acquires DB registration information from the DB 400.

Then, in step S206, the transmitting station 200 performs operation mode decision processing based on the acquired DB registration information. The transmitting station 200 decides the frequency hopping mode or the normal mode as the operation mode of the radio system 10 to be controlled, that is, the radio system 10 to which the transmitting station 200 itself belongs through the operation mode decision processing. An example of operation processing in the case where the transmitting station 200 decides the frequency hopping mode as the operation mode of the radio system 10 to be controlled will be described below.

In step S208, the transmitting station 200 performs frequency hopping setting decision processing. The transmitting station 200 decides a frequency hopping pattern utilized by the radio system 10 to be controlled through the frequency hopping setting decision processing and generates frequency hopping setting information.

Then, in step S210, the transmitting station 200 transmits the generated frequency hopping setting information to the receiving station 100.

Then, in step S212, the receiving station 100 decodes the received frequency hopping setting information.

Then, in step S214, the transmitting station 200 sets a frequency hopping scheme according to the generated frequency hopping setting information.

Then, in step S216, the transmitting station 200 transmits data while performing frequency hopping using the set frequency hopping scheme.

Then, in step S218, the receiving station 100 decodes data based on the decoded frequency hopping setting information.

An example of flow of the radio system control processing has been described above.

3-2. Operation Mode Decision Processing

Subsequently, operation mode decision processing by the communication control device 300 according to the present embodiment will be described with reference to FIG. 36 to FIG. 42. This processing can take various forms. An example of the processing will be described below.

Processing Example 1

Figure 36:
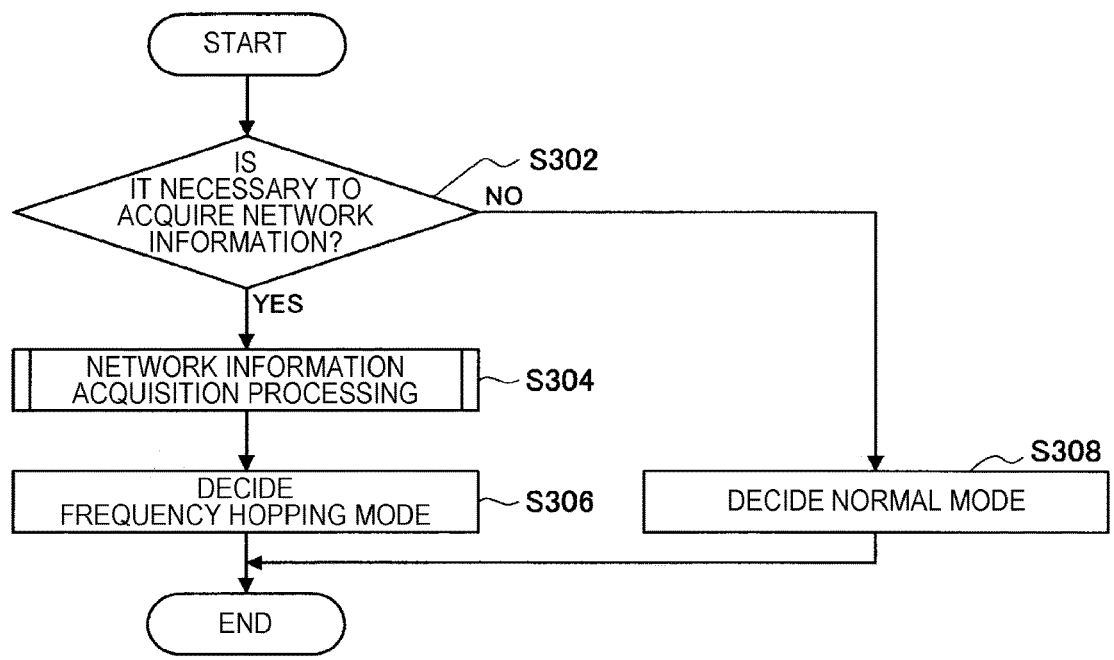
FIG. 36 is a flowchart illustrating an example of flow of operation mode decision processing executed in the communication control device according to the present embodiment.

FIG. 36 is a flowchart illustrating an example of flow of the operation mode decision processing executed in the communication control device 300 according to the present embodiment.

As illustrated in FIG. 36, first, in step S302, the control unit 320 determines whether or not it is necessary to acquire the network information. For example, the control unit 320 determines whether or not it is necessary to acquire the network information based on radio wave regulations such as the U.S. Federal SAS and Europe LSA, of the country where the radio system 10 is used.

In the case where it is determined that it is necessary to acquire the network information (S302/Yes), in step S304, the control unit 320 performs network information acquisition processing. Because the processing here will be described later in "3-3. Network information acquisition processing", detailed description will be omitted here. The control unit 320 acquires the network information through the network information acquisition processing.

Then, in step S306, the control unit 320 decides the frequency hopping mode as the operation mode of the radio system 10 to be controlled.

On the other hand, when it is determined that it is not necessary to acquire the network information (S302/No), in step S308, the control unit 320 decides the normal mode as the operation mode of the radio system 10 to be controlled.

An example of the flow of the operation mode decision processing has been described above.

Processing Example 2

Figure 37:
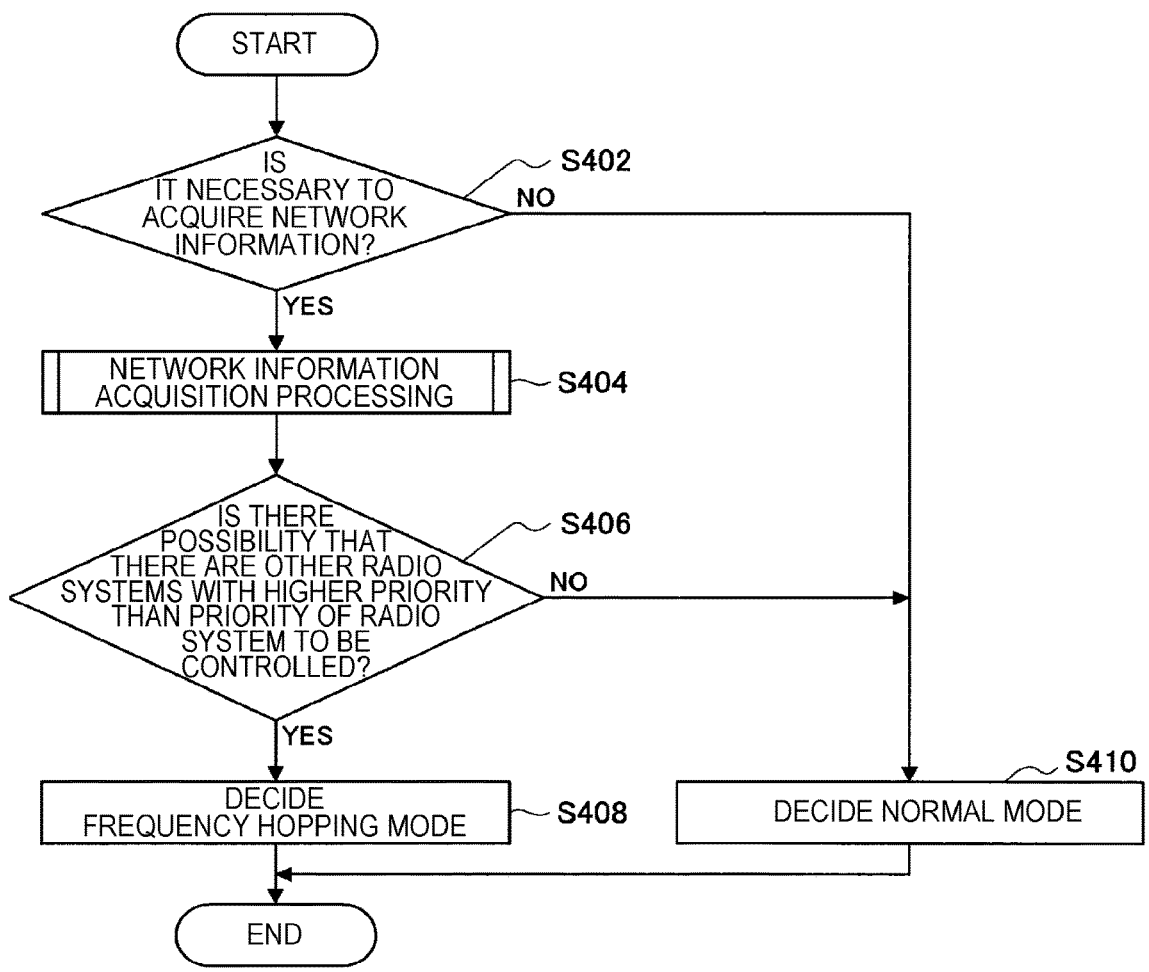
FIG. 37 is a flowchart illustrating an example of flow of operation mode decision processing executed in the communication control device according to the present embodiment.

FIG. 37 is a flowchart illustrating an example of the flow of the operation mode decision processing executed in the communication control device 300 according to the present embodiment.

As illustrated in FIG. 37, first, in step S402, the control unit 320 determines whether or not it is necessary to acquire the network information.

When it is determined that it is necessary to acquire the network information (S402/Yes), in step S404, the control unit 320 performs the network information acquisition processing.

Then, in step S406, the control unit 320 determines whether or not there is a possibility of presence of other radio systems 10 with higher priority than that of the radio system 10 to be controlled. For example, the control unit 320 determines a possibility of presence of other radio systems 10 with higher priority from the acquired network information.

In the case where it is determined that there is a possibility of presence of other radio systems 10 with higher priority than that of the radio system 10 to be controlled (S406/Yes), in step S408, the control unit 320 decides the frequency hopping mode as the operation mode of the radio system 10 to be controlled.

On the other hand, in the case where it is determined that it is not necessary to acquire the network information (S402/No) or in the case where it is determined that there is no possibility of presence of other radio systems 10 with higher priority than that of the radio system 10 to be controlled (S406/No), in step S410, the control unit 320 decides the normal mode as the operation mode of the radio system 10 to be controlled.

An example of the flow of the operation mode decision processing has been described above.

Processing Example 3

Figure 38:
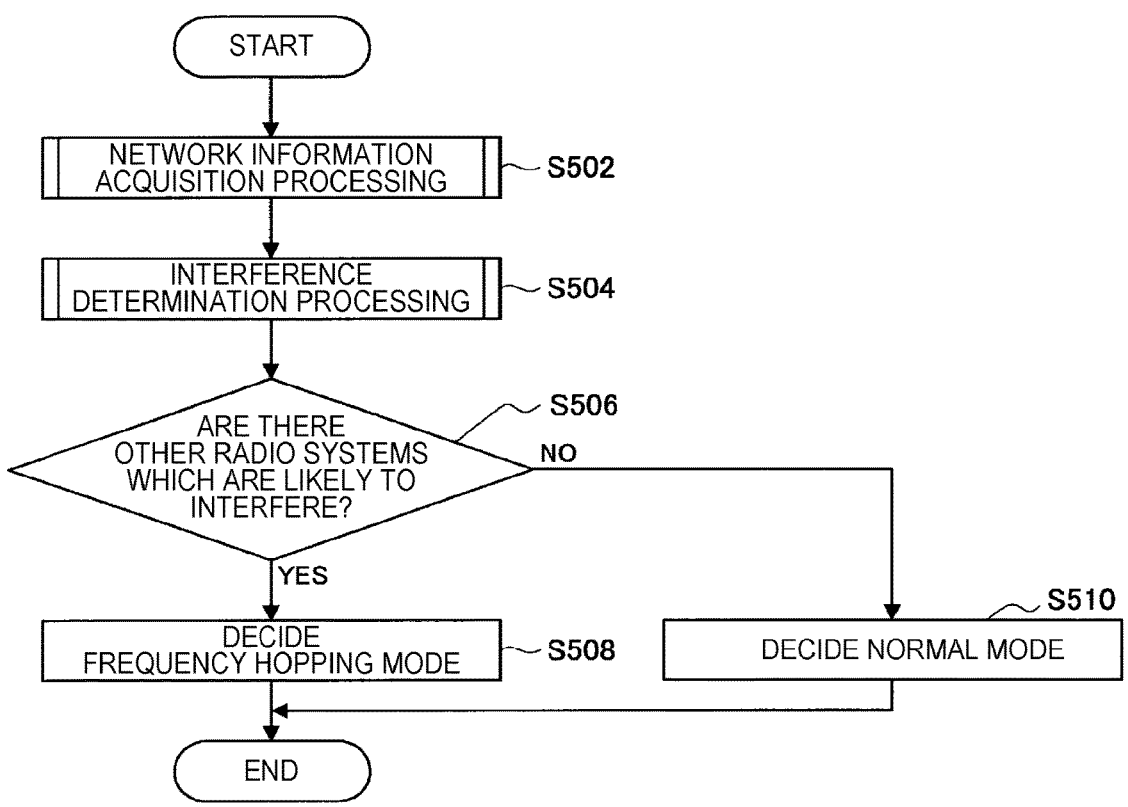
FIG. 38 is a flowchart illustrating an example of flow of operation mode decision processing executed in the communication control device according to the present embodiment.

FIG. 38 is a flowchart illustrating an example of the flow of the operation mode decision processing executed in the communication control device 300 according to the present embodiment.

As illustrated in FIG. 38, first, in step S502, the control unit 320 performs the network information acquisition processing.

Then, in step S504, the control unit 320 performs interference determination processing. The control unit 320 determines whether or not there are other radio systems 10 with which the radio system 10 to be controlled is likely to interfere through the interference determination processing. Because the processing here will be described later in "3-4. Interference determination processing", detailed description will be omitted here.

In the case where it is determined that there are other radio systems 10 which are likely to interfere (S506/Yes), in step S508, the control unit 320 decides the frequency hopping mode as the operation mode of the radio system 10 to be controlled.

On the other hand, in the case where it is determined that there is no other radio system 10 which is likely to interfere (S506/No), in step S510, the control unit 320 decides the normal mode as the operation mode of the radio system 10 to be controlled.

An example of the flow of the operation mode decision processing has been described above.

Processing Example 4

Figure 39:
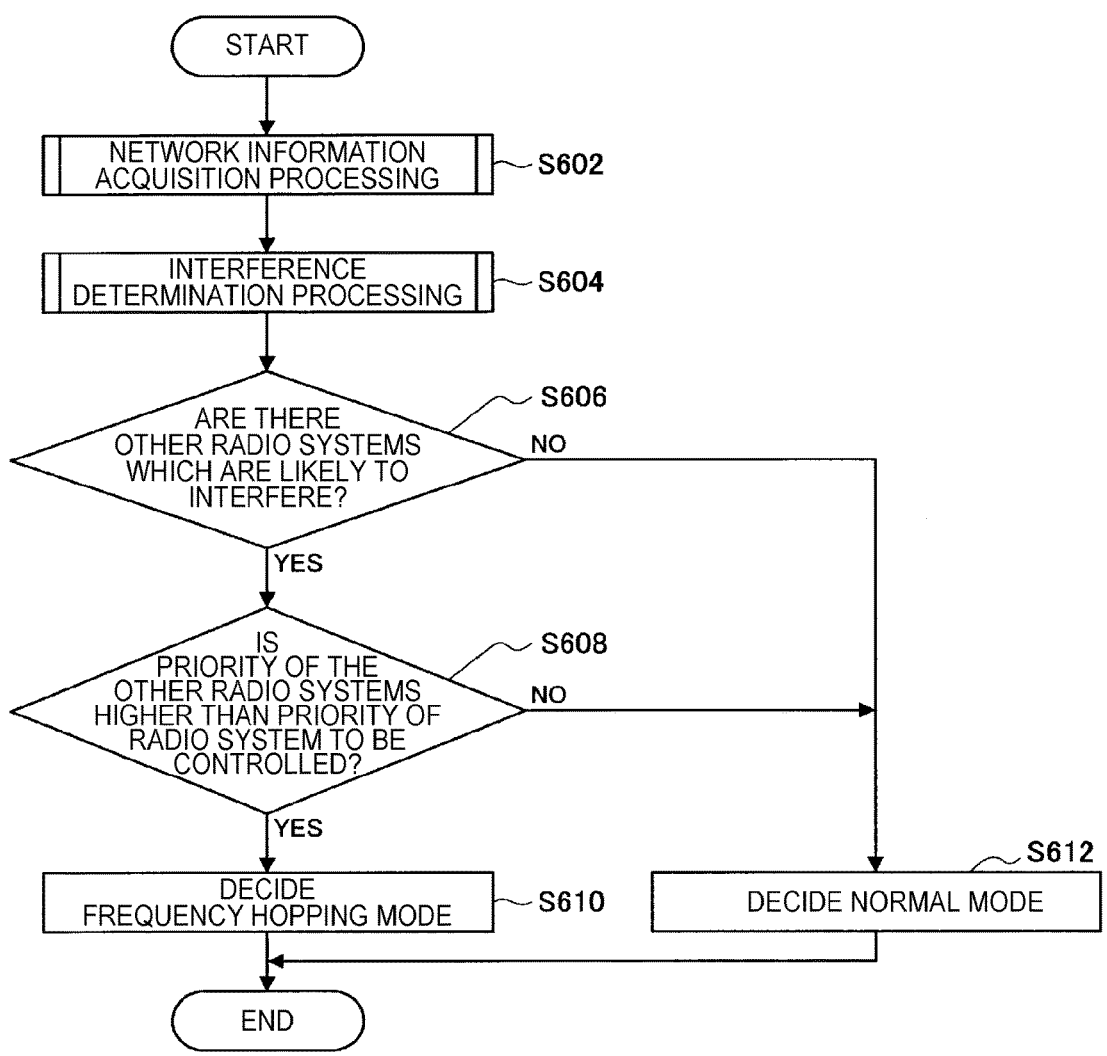
FIG. 39 is a flowchart illustrating an example of flow of operation mode decision processing executed in the communication control device according to the present embodiment.

FIG. 39 is a flowchart illustrating an example of flow of the operation mode decision processing executed in the communication control device 300 according to the present embodiment.

As illustrated in FIG. 39, first, in step S602, the control unit 320 performs the network information acquisition processing.

Then, in step S604, the control unit 320 performs interference determination processing.

In the case where it is determined that there are other radio systems 10 which are likely to interfere (S606/Yes), in step S608, the control unit 320 determines whether or not there is a possibility of presence of other radio systems 10 with higher priority than that of the radio system 10 to be controlled.

In the case where it is determined that there is a possibility of presence of other radio systems 10 with higher priority than that of the radio system 10 to be controlled (S608/Yes), in step S610, the control unit 320 decides the frequency hopping mode as the operation mode of the radio system 10 to be controlled.

On the other hand, in the case where it is determined that there is no other radio system 10 which is likely to interfere (S606/No) or in the case where it is determined that there is no possibility of presence of other radio systems 10 with higher priority than that of the radio system 10 to be controlled (S608/No), in step S612, the control unit 320 decides the normal mode as the operation mode of the radio system 10 to be controlled.

An example of the flow of the operation mode decision processing has been described above.

Processing Example 5

Figure 40:
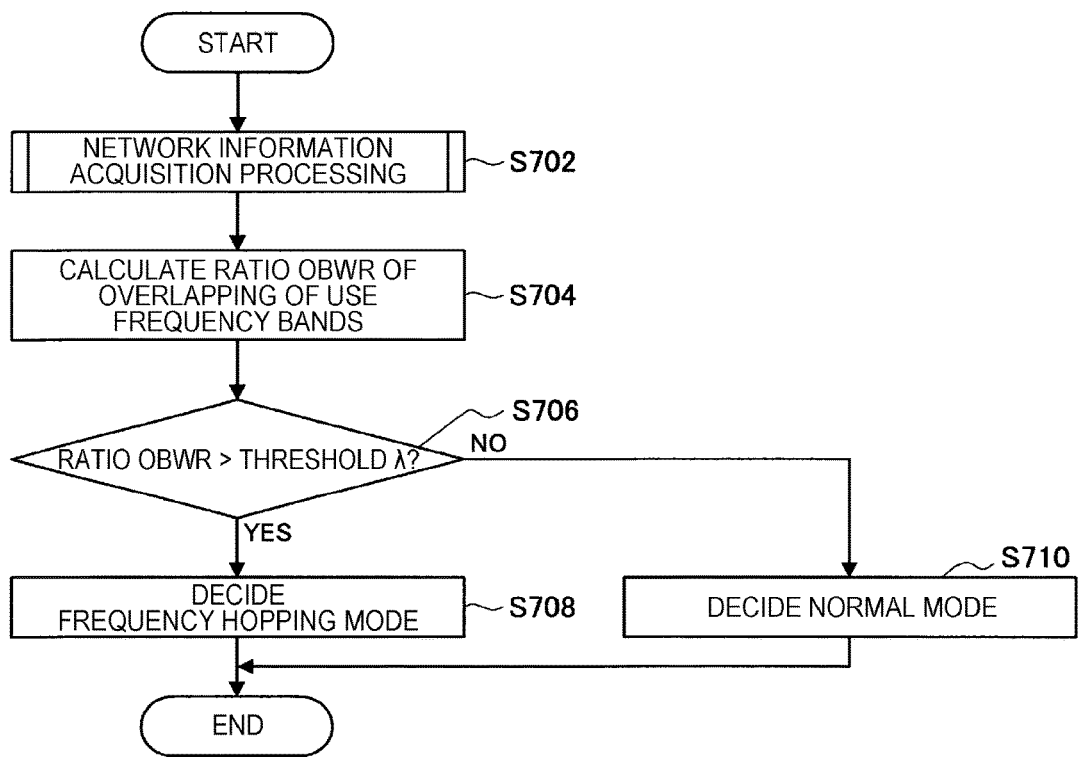
FIG. 40 is a flowchart illustrating an example of flow of operation mode decision processing executed in the communication control device according to the present embodiment.

FIG. 40 is a flowchart illustrating an example of flow of the operation mode decision processing executed in the communication control device 300 according to the present embodiment.

As illustrated in FIG. 40, first, in step S702, the control unit 320 performs network information acquisition processing.

Then, in step S704, the control unit 320 calculates a ratio OBWR of overlapping of the use frequency bands. Because the processing here will be described later, detailed description will be omitted here.

Then, in step S706, the control unit 320 determines whether or not the ratio OBWR is greater than a threshold $\lambda$.

In the case where it is determined that the ratio OBWR is greater than the threshold $\lambda$ (S706/Yes), in step S708, the control unit 320 decides the frequency hopping mode as the operation mode of the radio system 10 to be controlled.

In the case where the ratio OBWR is equal to or less than the threshold $\lambda$ (S706/No), in step S710, the control unit 320 decides the normal mode as the operation mode of the radio system 10 to be controlled.

An example of the flow of the operation mode decision processing has been described above. Here, an example of specific flow of ratio OBWR calculation processing in step S704 will be described with reference to FIG. 41.

Figure 41:
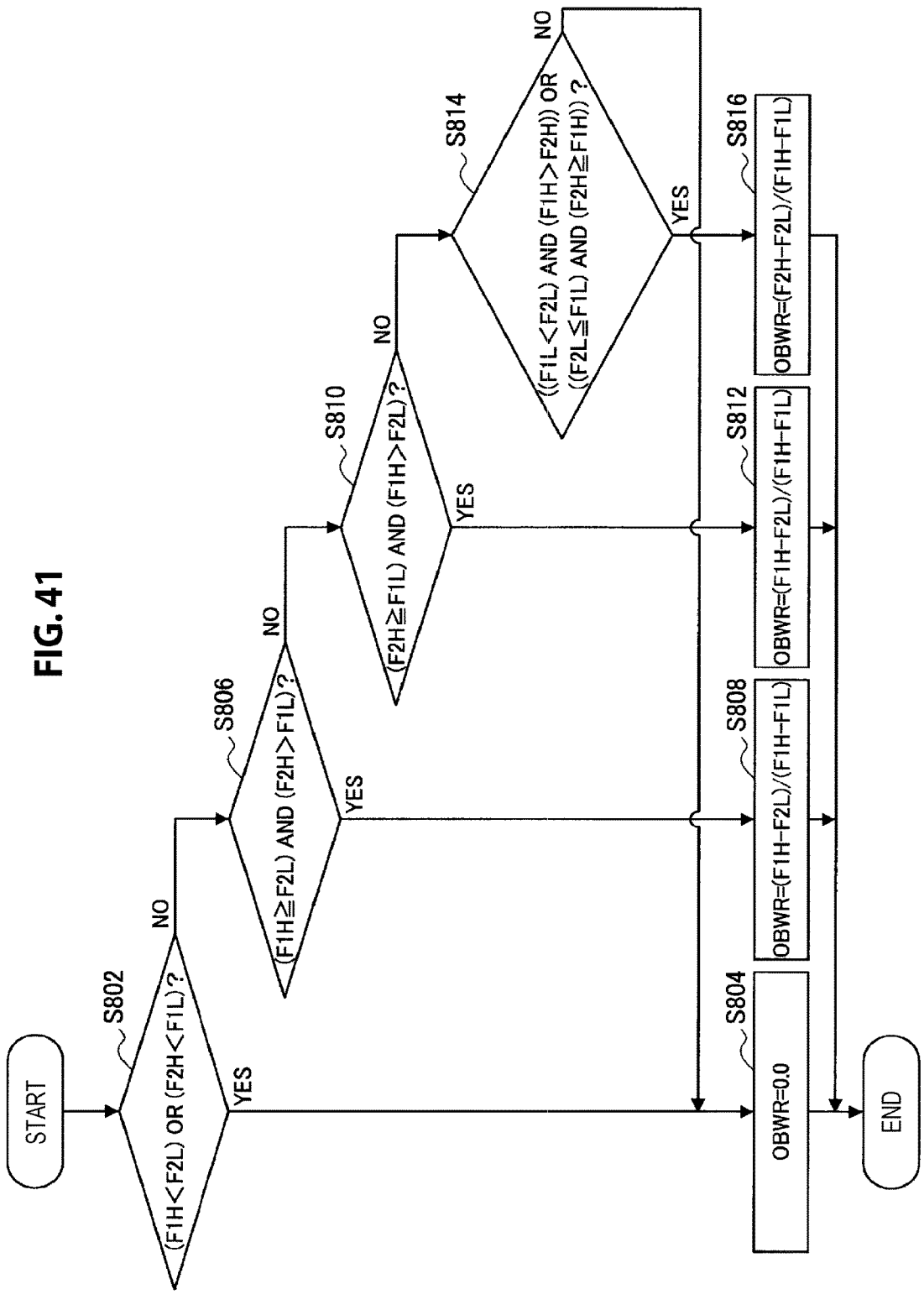
FIG. 41 is a flowchart illustrating an example of flow of processing of calculating a ratio of overlapping of use frequency bands executed in the communication control device according to the present embodiment.

FIG. 41 is a flowchart illustrating an example of flow of calculation processing of a ratio of overlapping of the use frequency bands executed in the communication control device 300 according to the present embodiment. Note that, in this flowchart, the ratio OBWR calculation processing will be described using symbols F1H, F1L, F2H and F2L used in FIG. 24 to FIG. 27.

As illustrated in FIG. 41, first, in step S802, the control unit 320 determines whether or not conditions of (F1H<F2L) or (F2H<F1L) are satisfied. In the case where it is determined that the conditions are satisfied (S802/Yes), in step S804, the control unit 320 calculates OBWR=0.0. On the other hand, in the case where it is determined that the conditions are not satisfied (S802/No), the processing proceeds to step S806.

In step S806, the control unit 320 determines whether or not conditions of (F1H≥F2L) and (F2H>F1L) are satisfied. In the case where it is determined that the conditions are satisfied (S806/Yes), in step S808, the control unit 320 calculates OBWR=(F1H−F2L)/(F1H−F1L). On the other hand, in the case where it is determined that the conditions are not satisfied (S806/No), the processing proceeds to step S810.

In step S810, the control unit 320 determines whether or not conditions of (F2H≥F1L) and (F1H>F2L) are satisfied. In the case where it is determined that the conditions are satisfied (S810/Yes), in step S812, the control unit 320 calculates OBWR=(F1H−F2L)/(F1H−F1L). On the other hand, in the case where it is determined that the conditions are not satisfied (S810/No), the processing proceeds to step S814.

In step S814, the control unit 320 determines whether or not conditions of (F1L<F2L) and (F1H>F2H) or conditions of (F2L≤F1L) and (F2H≥F1H) are satisfied. In the case where it is determined that the conditions are satisfied (S814/Yes), in step S816, the control unit 320 calculates OBWR=(F2H−F2L)/(F1H−F1L). On the other hand, in the case where it is determined that the conditions are not satisfied (S810/No), the processing proceeds to step S804. Note that because it is difficult to assume that the conditions are not satisfied, the control unit 320 may omit determination processing in step S814, and the processing may proceed to step S816.

The example of the ratio OBWR calculation processing has been described above.

Processing Example 6

Figure 42:
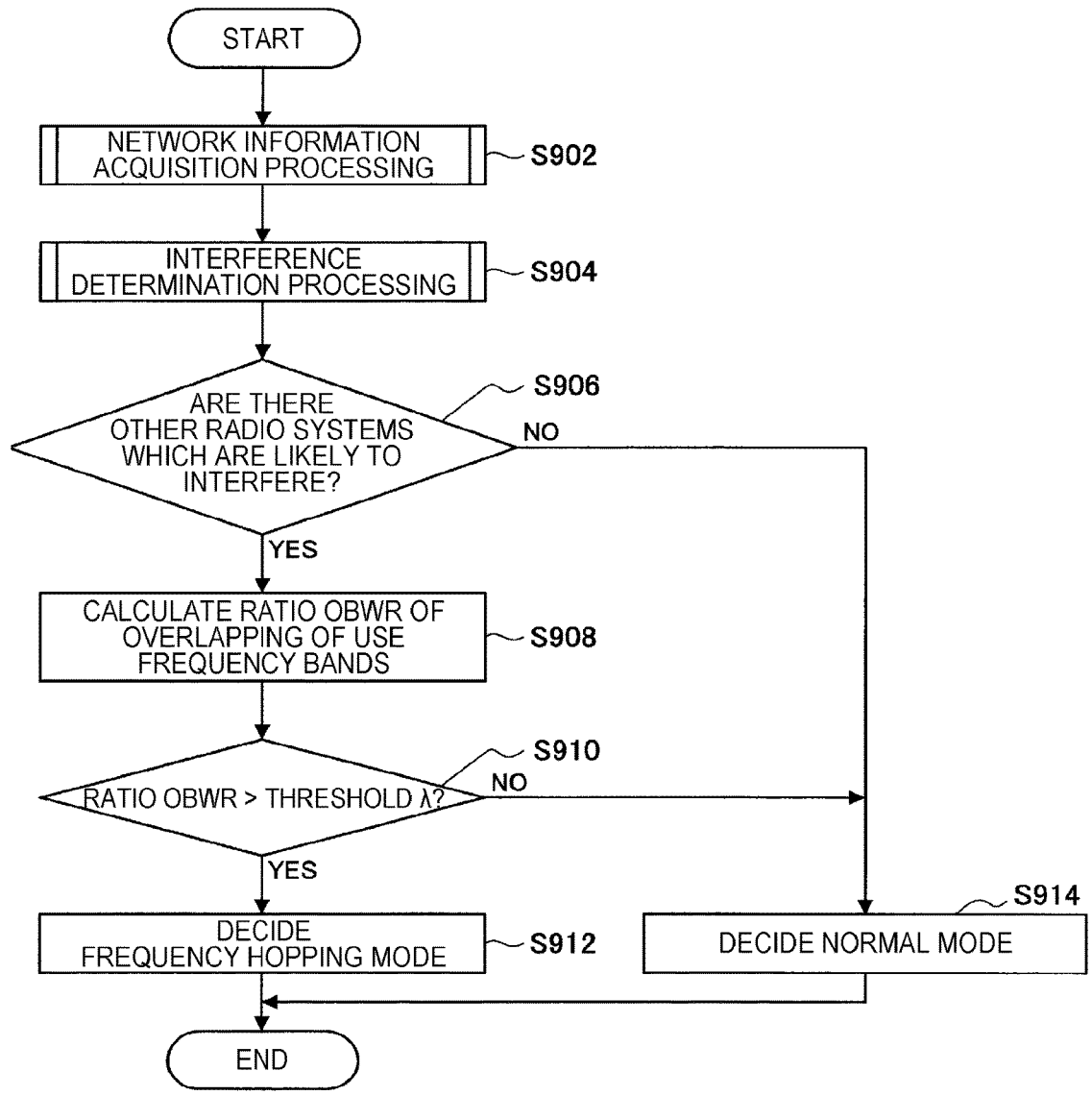
FIG. 42 is a flowchart illustrating an example of flow of operation mode decision processing executed in the communication control device according to the present embodiment.

FIG. 42 is a flowchart illustrating an example of flow of the operation mode decision processing executed in the communication control device 300 according to the present embodiment.

As illustrated in FIG. 42, first, in step S902, the control unit 320 performs network information acquisition processing.

Then, in step S904, the control unit 320 performs interference determination processing.

In the case where it is determined that there are other ratio systems 10 which are likely to interfere (S906/Yes), in step S908, the control unit 320 calculates a ratio OBWR of overlapping of the use frequency bands.

Then, in step S910, the control unit 320 determines whether or not the ratio OBWR is greater than the threshold λ.

In the case where it is determined that the ratio OBWR is greater than the threshold λ (S910/Yes), in step S912, the control unit 320 decides the frequency hopping mode as the operation mode of the radio system 10 to be controlled.

In the case where it is determined that the ratio OBWR is equal to or less than the threshold λ (S910/No), or in the case where it is determined that there is no other radio system 10 which is likely to interfere (S906/No), in step S914, the control unit 320 decides the normal mode as the operation mode of the radio system 10 to be controlled.

An example of the flow of the operation mode decision processing has been described above.

3-3. Network Information Acquisition Processing

Subsequently, network information acquisition processing by the communication control device 300 according to the present embodiment will be described with reference to FIG. 43. This processing can take various forms. For example, the communication control device 300 may acquire the network information at a timing at which it is necessary to acquire the network information, or at a timing at which the network information is used for the operation mode decision processing, the interference determination processing, or the like. Other than above, the communication control device 300 may periodically acquire the network information. An example in the case where the network information is periodically acquired will be described below.

Figure 43:
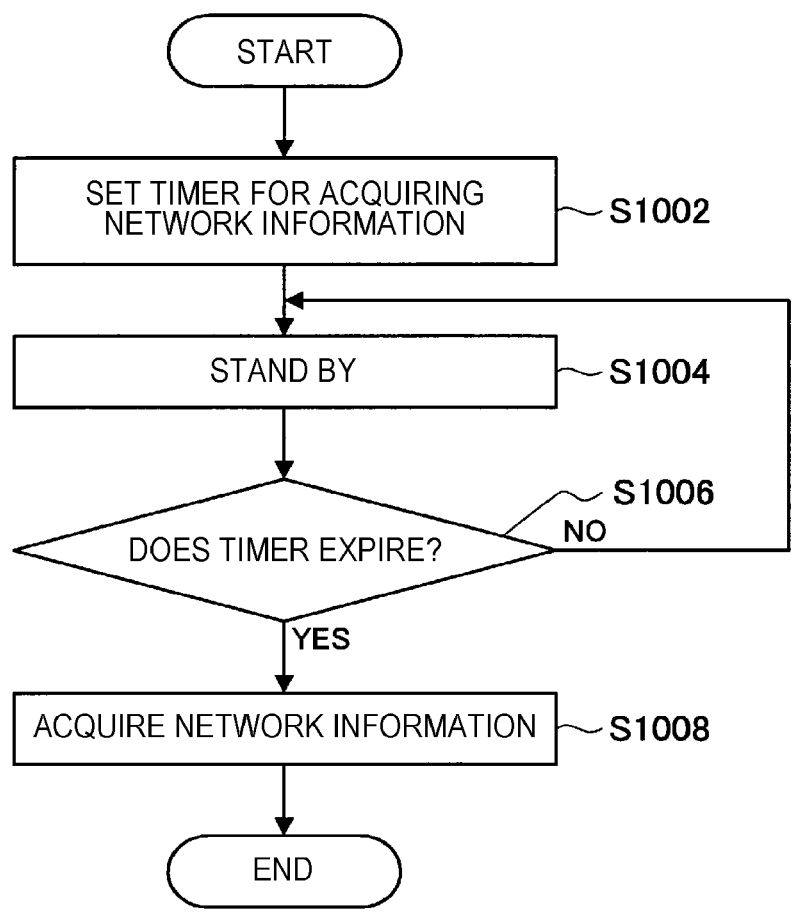
FIG. 43 is a flowchart illustrating an example of flow of network information acquisition processing executed at the communication control device according to the present embodiment.

FIG. 43 is a flowchart illustrating an example of flow of the network information acquisition processing executed in the communication control device 300 according to the present embodiment.

As illustrated in FIG. 43, first, in step S1002, the control unit 320 sets a timer for acquiring the network information.

Then, in step S1002, the control unit 320 stands by until the set timer expires (S1006/No).

In the case where the timer expires (S1006/Yes), the control unit 320 acquires the network information. For example, the control unit 320 transmits a request for the network information via the communication unit 310. Then, the control unit 320 acquires at least one of the DB registration information returned from the DB 400 and the sensing information returned from the sensor apparatus 500.

An example of the flow of the network information acquisition processing has been described above.

3-4. Interference Determination Processing

Subsequently, the interference determination processing by the communication control device 300 according to the present embodiment will be described with reference to FIG. 44. This processing can take various forms. An example of the processing will be described below.

Figure 44:
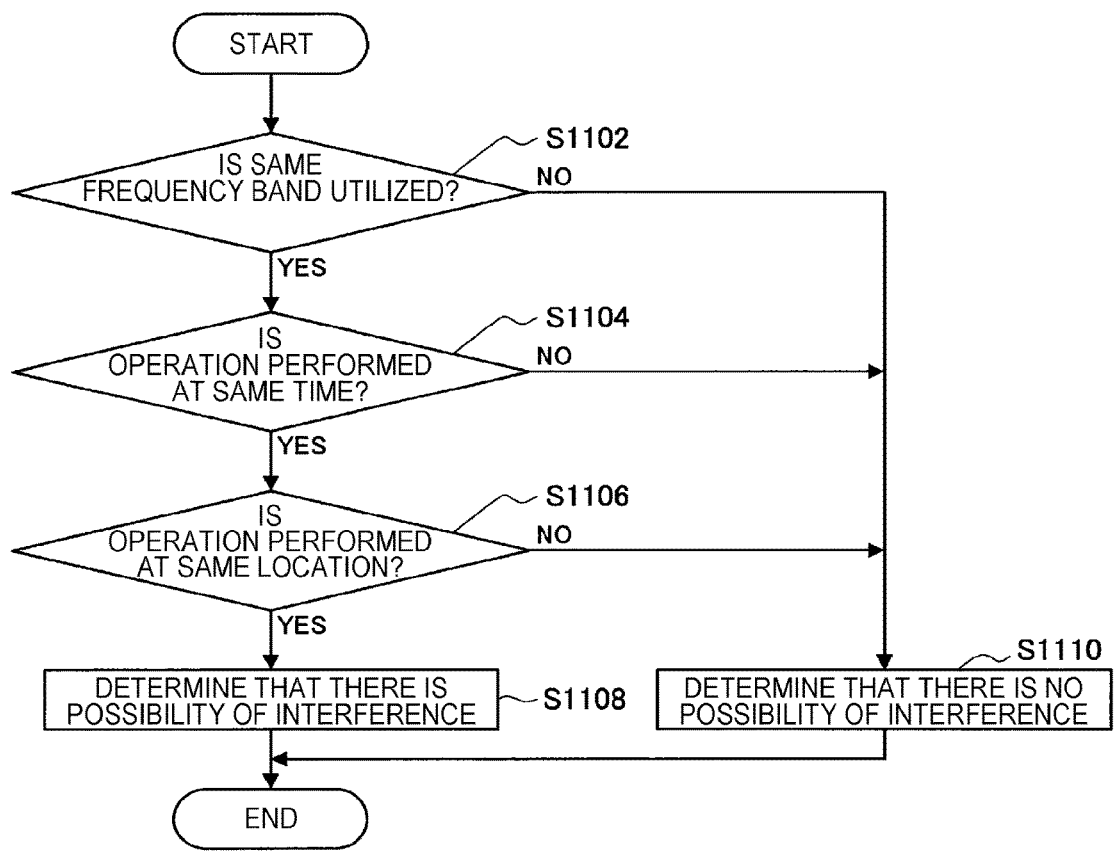
FIG. 44 is a flowchart illustrating an example of flow of interference determination processing executed at the communication control device according to the present embodiment.

FIG. 44 is a flowchart illustrating an example of the interference determination processing executed in the communication control device 300 according to the present embodiment.

As illustrated in FIG. 44, first, in step S1102, the control unit 320 determines whether or not the radio system 10 to be subjected to interference determination processing utilizes the same frequency band as the use frequency band of the radio system 10 to be controlled. This determination is performed, for example, with reference to the DB registration information. Note that the control unit 320 may determine that the radio systems utilize the same frequency band in the case where the use frequency bands partially overlap as in the examples illustrated in FIG. 24 to FIG. 27 even if the use frequency bands are not completely the same. Further, the control unit 320 may determine that the radio systems utilize the same frequency band in the case where a difference between the use frequency bands falls within a predetermined range even if the use frequency bands do not overlap.

In the case where it is determined that the radio systems utilize the same frequency bands (S1102/Yes), in step S1104, the control unit 320 determines whether or not the radio system 10 to be subjected to interference determination processing operates at the same time as the use frequency band of the radio system 10 to be controlled. This determination is performed, for example, with reference to the DB registration information. Note that the control unit 320 may determine that the radio systems operate at the same time in the case where the operating time partially overlaps even if the operating time is not completely the same. Further, the control unit 320 may determine that the radio systems operate at the same time in the case where a difference in the time falls within a predetermined range even if the time does not overlap.

In the case where it is determined that the radio systems operate at the same time (S1104/Yes), in step S1106, the control unit 320 determines whether or not the radio system 10 to be subjected to interference determination processing operates at the same location as the use frequency band of the radio system 10 to be controlled. This determination is performed, for example, with reference to the DB registration information. Note that the control unit 320 may determine that the radio systems operate at the same location in the case where the locations partially overlap even if the operating locations are not completely the same. Further, the control unit 320 may determine that the radio systems operate at the same location in the case where a difference in the operating locations falls within a predetermined range even if the operating locations do not overlap.

In the case where it is determined that the radio systems operate at the same location (S1106/Yes), in step S1108, the control unit 320 determines that there is a possibility that the radio system 10 to be controlled may interfere with the radio system 10 to be subjected to interference determination processing.

On the other hand, in the case where it is determined that the radio systems operate at different locations (S1106/No), in step S1110, the control unit 320 determines that there is no possibility that the radio system 10 to be controlled interferes with the radio system 10 to be subjected to interference determination processing. Further, in the case where it is determined that the radio systems utilize different frequency bands (S1102/No) or in the case where it is determined that the radio systems operate at different time (S1104/Yes), the control unit 320 determines that there is no possibility of interference in a similar manner.

An example of the flow of the interference determination processing has been described above.

While, in this example, an example where determination is performed based on the DB registration information has been described, determination can be also performed in a similar manner based on the sensing information. In the case where determination is based on the sensing information, in the processing in step S1102, the control unit 320 determines whether or not the use frequency bands are the same based on the sensing information. Because the processing here will be described later in "3-5. Overlapping determination processing of use frequency bands", detailed description will be omitted here. Note that, in the case where the receiving station 100 or the transmitting station 200 to be controlled functions as the sensor apparatus 500, determination as to the location and the time may be omitted.

3-5. Overlapping Determination Processing of Use Frequency Bands

Subsequently, overlapping determination processing of use frequency bands based on the sensing information by the communication control device 300 according to the present embodiment will be described with reference to FIG. 45 to FIG. 47. This processing can take various forms. An example of the processing will be described below.

Processing Example 1

Figure 45:
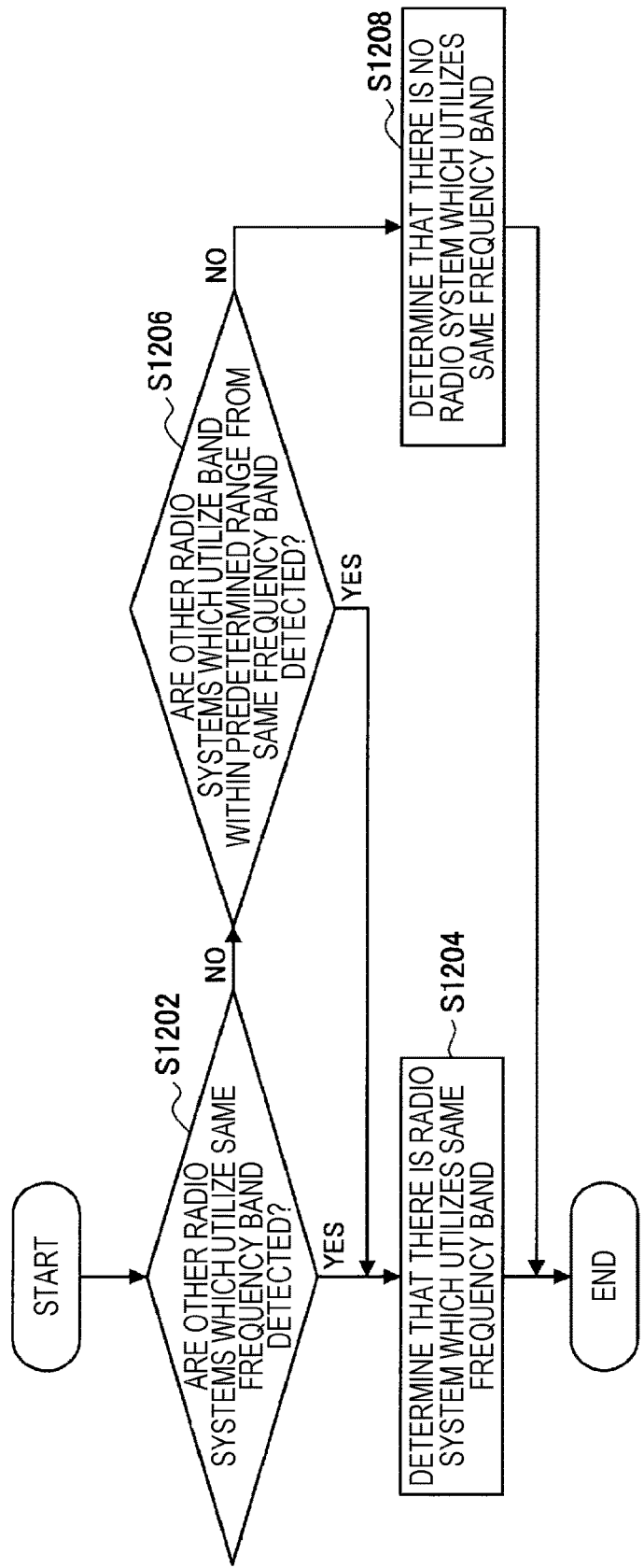
FIG. 45 is a flowchart illustrating an example of flow of overlapping determination processing of use frequency bands executed at the communication control device according to the present embodiment.

FIG. 45 is a flowchart illustrating an example of flow of the overlapping determination processing of use frequency bands executed in the communication control device 300 according to the present embodiment.

As illustrated in FIG. 45, first, in step S1202, the control unit 320 determines whether or not other radio systems 10 which utilize the same frequency band as the use frequency band of the radio system 10 to be controlled are detected.

In the case where it is determined that other radio systems 10 which utilize the same frequency band are detected (S1202/Yes), in step S1204, the control unit 320 determines that there is a radio system 10 which utilizes the same frequency band.

On the other hand, in the case where it is determined that other radio systems 10 which utilize the same frequency band are not detected (S1202/No), in step S1206, the control unit 320 determines whether or not other radio systems 10 which utilize bands within a predetermined range from the same frequency band as the use frequency band of the radio system 10 to be controlled are detected.

In the case where it is determined that other radio systems 10 which utilize bands within a predetermined range from the same frequency band is detected (S1206/Yes), in step S1204, the control unit 320 determines that there is a radio system 10 which utilizes the same frequency band.

On the other hand, in the case where it is determined that other radio systems 10 which utilize bands within a predetermined range from the same frequency band are not detected (S1206/No), in step S1208, the control unit 320 determines that there is no radio system 10 which utilizes the same frequency band.

An example of the flow of the overlapping determination processing of use frequency bands based on the sensing information has been described above.

Processing Example 2

Figure 46:
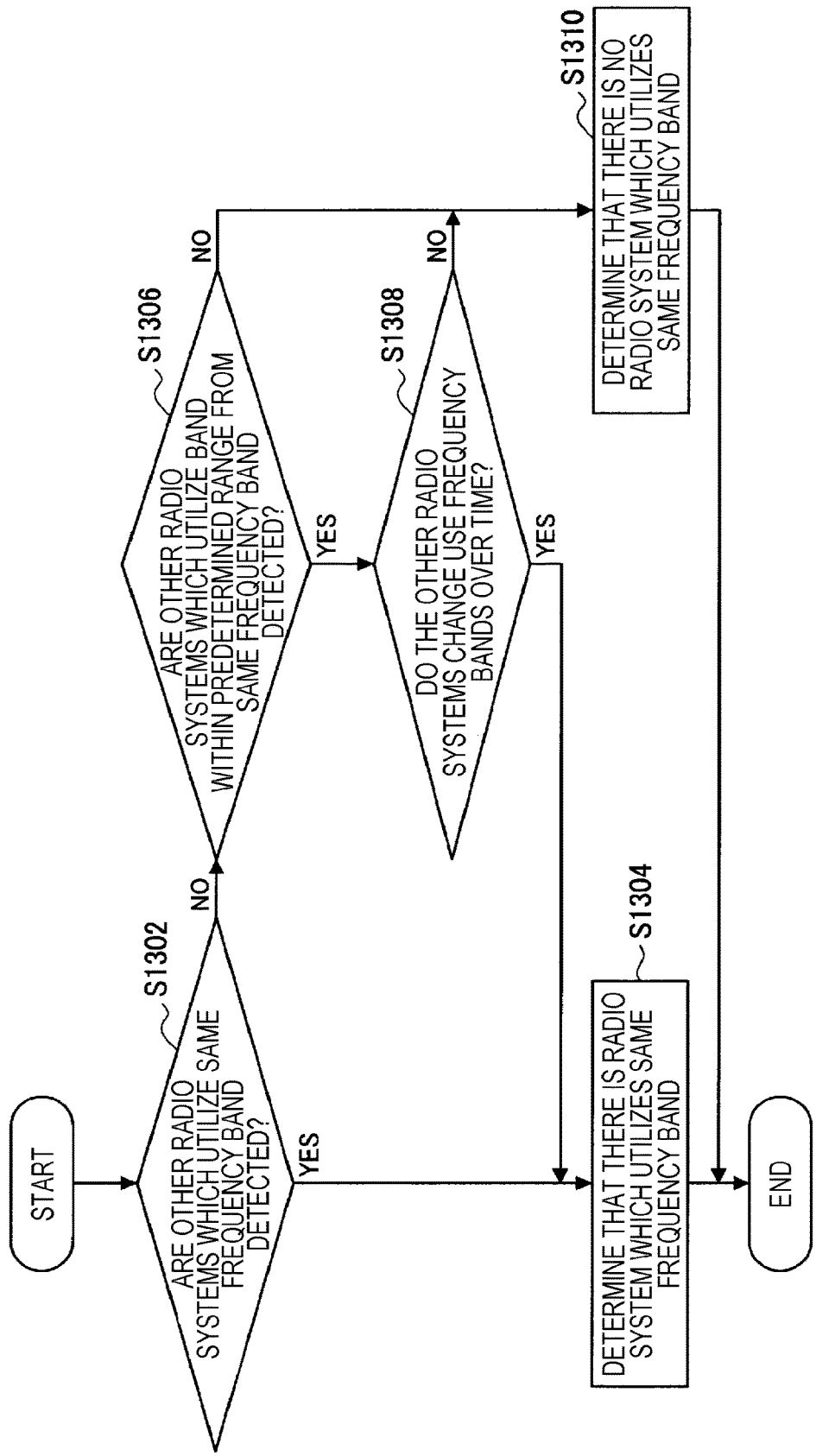
FIG. 46 is a flowchart illustrating an example of flow of overlapping determination processing of use frequency bands executed at the communication control device according to the present embodiment.

FIG. 46 is a flowchart illustrating an example of the flow of the overlapping determination processing of use frequency bands executed in the communication control device 300 according to the present embodiment.

As illustrated in FIG. 46, because the processing from step S1302 to step S1306 is as described with reference to FIG. 45, description will not be provided again.

In step S1306, in the case where it is determined that other radio systems 10 which utilize bands within a predetermined range from the same frequency band are detected (S1306/Yes), in step S1308, the control unit 320 determines whether or not the other radio systems 10 change the use frequency bands over time. Because the processing here will be described later in "3-6. Temporal change determination processing of use frequency band", detailed description will be omitted here.

In the case where it is determined that other radio systems 10 which utilize bands within a predetermined range from the same frequency band change the use frequency bands over time (S1308/Yes), in step S1304, the control unit 320 determines that there is a radio system 10 which utilizes the same frequency band.

On the other hand, in the case where it is determined that other radio systems 10 which utilize bands within a predetermined range from the same frequency band do not change the use frequency bands over time (S1308/No), in step S1310, the control unit 320 determines that there is no radio system 10 which utilizes the same frequency band.

An example of the flow of the overlapping determination processing of use frequency bands based on the sensing information has been described above.

Processing Example 3

Figure 47:
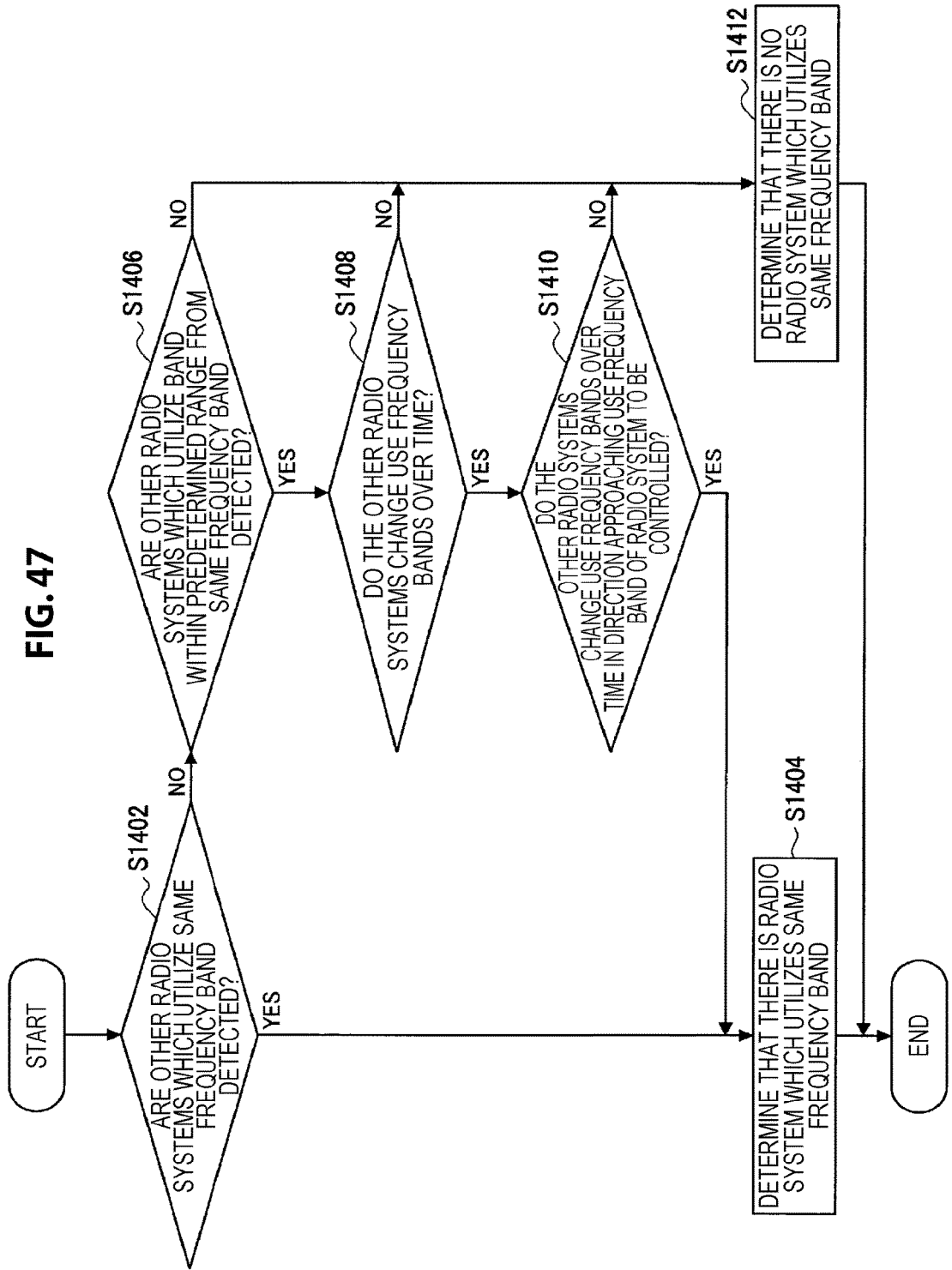
FIG. 47 is a flowchart illustrating an example of flow of overlapping determination processing of use frequency bands executed at the communication control device according to the present embodiment.

FIG. 47 is a flowchart illustrating an example of flow of the overlapping determination processing of use frequency bands executed in the communication control device 300 according to the present embodiment.

As illustrated in FIG. 47, because the processing from step S1402 to S1408 is as described with reference to FIG. 46, description will not be provided again.

In the case where it is determined in step S1408 that other radio systems 10 which utilize bands within a predetermined range from the same frequency band change the use frequency bands over time (S1408/Yes), in step S1410, the control unit 320 determines whether or not the other radio systems 10 change the use frequency bands over time in a direction approaching the use frequency band of the radio system to be controlled.

In the case where it is determined that other radio systems 10 which utilize bands within a predetermined range from the same frequency band changes the use frequency band over time in a direction approaching the use frequency band of the radio system to be controlled (S1410/Yes), in step S1404, the control unit 320 determines that there is a radio system 10 which utilizes the same frequency band.

On the other hand, in the case where it is determined that other radio systems 10 which utilize bands within a predetermined range from the same frequency band change the use frequency band over time in a direction away from the use frequency band of the radio system to be controlled (S1410/No), in step S1412, the control unit 320 determines that there is no radio system 10 which utilizes the same frequency band.

An example of the flow of the overlapping determination processing of use frequency bands based on the sensing information has been described above.

3-6. Temporal Change Determination Processing of Use Frequency Band

Subsequently, temporal change determination processing of use frequency band based on the sensing information by the communication control device 300 according to the present embodiment will be described with reference to FIG. 48 and FIG. 49. This processing can take various forms. An example of the processing will be described below.

Processing Example 1

Figure 48:
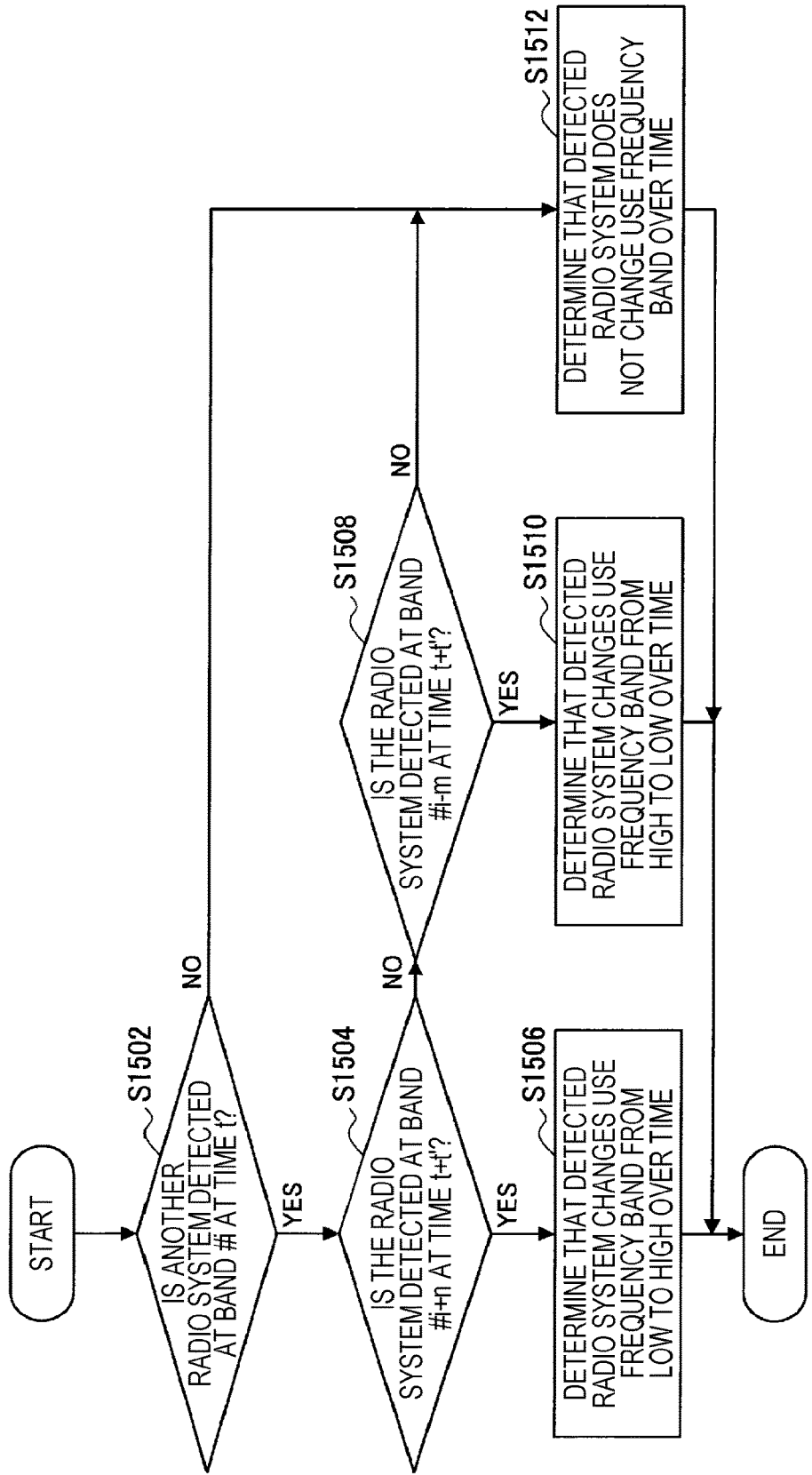
FIG. 48 is a flowchart illustrating an example of flow of temporal change determination processing of a use frequency band executed at the communication control device according to the present embodiment.

FIG. 48 is a flowchart illustrating an example of flow of the temporal change determination processing of the use frequency band executed at the communication control device 300 according to the present embodiment. Note that determination processing in the case where a bandwidth is discretely sensed described above with reference to FIG. 23 will be described using this flowchart. Symbols #−N to #N indicate indexes of the bandwidths.

As illustrated in FIG. 48, first, in step S1502, the control unit 320 determines whether or not other radio systems 10 are detected at a bandwidth #i at time t.

In the case where other radio systems 10 are detected at the bandwidth #i at time t (S1502/Yes), in step S1504, the control unit 320 determines whether or not the radio system is detected at the bandwidth #i+n at time t+t'. Note that in the case where other radio systems 10 are not detected at the bandwidth #i at time t (S1502/No), the processing proceeds to subsequent step S1512.

In the cased where the radio system is detected at the bandwidth #i+n at time t+t' (S1504/Yes), in step S1506, the control unit 320 determines that the detected radio system changes the use frequency band over time from low to high.

On the other hand, in the case where the radio system is not detected at the bandwidth #i+n at time t+t' (S1504/No), in step S1508, the control unit 320 determines whether or not the radio system is detected at the bandwidth #i−m at time t+t'.

In the case where the radio system is detected at the bandwidth #i−m at time t+t' (S1508/Yes), in step S1510, the control unit 320 determines that the detected radio system changes the use frequency band over time from high to low.

In the case where the radio system is not detected at the bandwidth #i−m at time t+t' (S1508/No), in step S1512, the control unit 320 determines that the detected radio system does not change the use frequency band over time.

An example of the flow of the temporal change determination processing of the use frequency band based on the sensing information has been described above.

Processing Example 2

Figure 49:
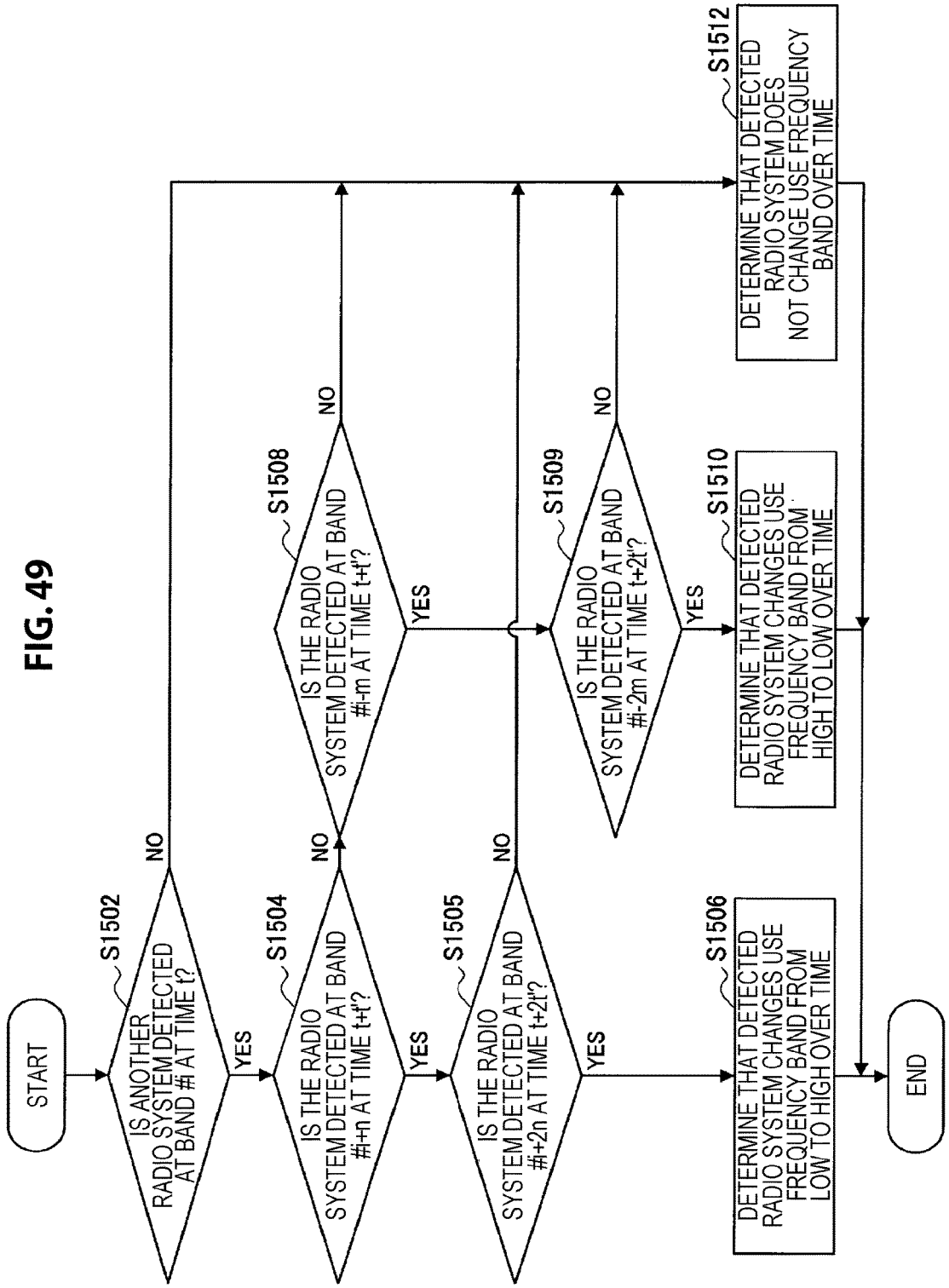
FIG. 49 is a flowchart illustrating an example of flow of temporal change determination processing of a use frequency band executed at the communication control device according to the present embodiment.

FIG. 49 is a flowchart illustrating an example of flow of the temporal change determination processing of the use frequency band executed at the communication control device 300 according to the present embodiment. Note that determination processing in the case where a bandwidth is discretely sensed described above with reference to FIG. 23 will be described using this flowchart. Symbols #−N to #N indicate indexes of bandwidths.

As illustrated in FIG. 49, because the processing in steps S1502, S1504, S1506, S1508, S1510 and S1512 is as described above with reference to FIG. 48, description will not be provided again. In this processing example, steps S1505 and S1509 are added to the processing example described with reference to FIG. 48.

In the case where the radio system is detected at the bandwidth #i+n at time t+t' (S1504/Yes), in step S1505, the control unit 320 determines whether or not the radio system is detected at a bandwidth #i+2n at time t+2t'. In the case where the radio system is detected at the bandwidth #i+2n at time t+2t' (S1505/Yes), the processing proceeds to step S1506. Further, in the case where the radio system is not detected at the bandwidth #i+2n at time t+2t' (S1505/No), the processing proceeds to step S1512.

In the case where the radio system is detected at the bandwidth #i−m at time t+t' (S1508/Yes), in step S1509, the control unit 320 determines whether or not the radio system is detected at a bandwidth #i−2m at time t+2t'. In the case where the radio system is detected at the bandwidth #i−2m at time t+2t' (S1509/Yes), the processing proceeds to step S1510. Further, in the case where the radio system is not detected at the bandwidth #i−2m at time t+2t' (S1509/No), the processing proceeds to step S1512.

An example of the flow of the temporal change determination processing of the use frequency band based on the sensing information has been described above.

As described in this processing example, the control unit 320 can confirm a changing state of the frequency band a plurality of times. Further, the control unit 320 can repeat such temporal change determination processing. By this means, the control unit 320 can determine whether or not the radio system 10 changes the use frequency band over time with high accuracy. Note that, while, in FIG. 49, the changing state of the frequency band is confirmed at equal intervals, that is, time t, t+t', t+2t', the changing state may be confirmed at different intervals. In a similar manner, while, in FIG. 49, the changing state of the frequency band is confirmed at equal intervals, that is, bands #1, #i+n, #i+2n, the changing state may be confirmed at different intervals.

3-7. Frequency Hopping Setting Decision Processing

Subsequently, frequency hopping setting information decision processing by the communication control device 300 according to the present embodiment will be described with reference to FIG. 50 to FIG. 52. This processing can take various forms. An example of the processing will be described below.

Processing Example 1

Figure 50:
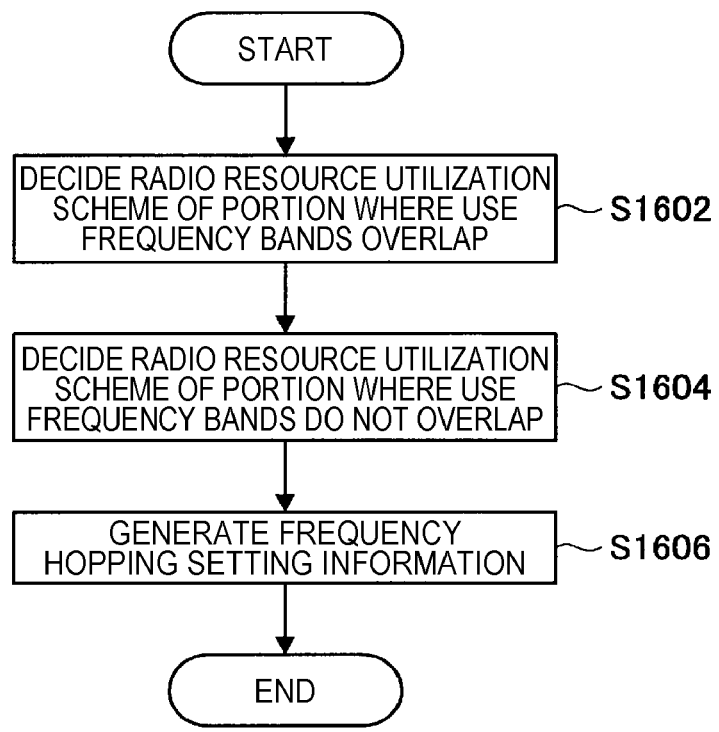
FIG. 50 is a flowchart illustrating an example of flow of frequency hopping setting information decision processing executed at the communication control device according to the present embodiment.

FIG. 50 is a flowchart illustrating an example of flow of the frequency hopping setting information decision processing executed at the communication control device 300 according to the present embodiment.

As illustrated in FIG. 50, first, in step S1602, the control unit 320 decides a radio resource utilization scheme at a portion where the use frequency band of the radio system 10 to be controlled overlaps with the use frequency bands of other radio systems 10. For example, the control unit 320 performs decision such that the radios system 10 to be controlled performs frequency hopping at the portion where the use frequency bands overlap and decides a hopping pattern. Note that, in the case where there is no overlapped portion, the control unit 320 omits this processing.

Subsequently, in step S1604, the control unit 320 decides a radio resource utilization scheme at a portion where the use frequency band of the radio system 10 to be controlled does not overlap with the use frequency bands of other radio systems 10. For example, the control unit 320 decides a range of the frequency band utilized by the radio system 10 to be controlled without frequency hopping being performed, among the portion where the use frequency bands do not overlap. The control unit 320 may perform decision such that frequency hopping is performed also in the portion where the use frequency bands do not overlap. Note that, in the case where there is no portion where the use frequency bands do not overlap, the control unit 320 omits this processing.

Then, in step S1606, the control unit 320 generates frequency hopping setting information. The frequency hopping setting information includes information indicating the frequency band in which frequency hopping is performed, the frequency hopping pattern and the frequency band utilized without frequency hopping being performed, decided in the above-described steps S1602 to S1606. Note that the control unit 320 may decide a time slot, a location, or the like, in which the radio system 10 to be controlled performs frequency hopping according to information of the radio system 10 which is likely to interfere, and the frequency hopping setting information may include information indicating these time slots, the location, or the like.

An example of the flow of the frequency hopping setting information decision processing has been described above.

Processing Example 2

Figure 51:
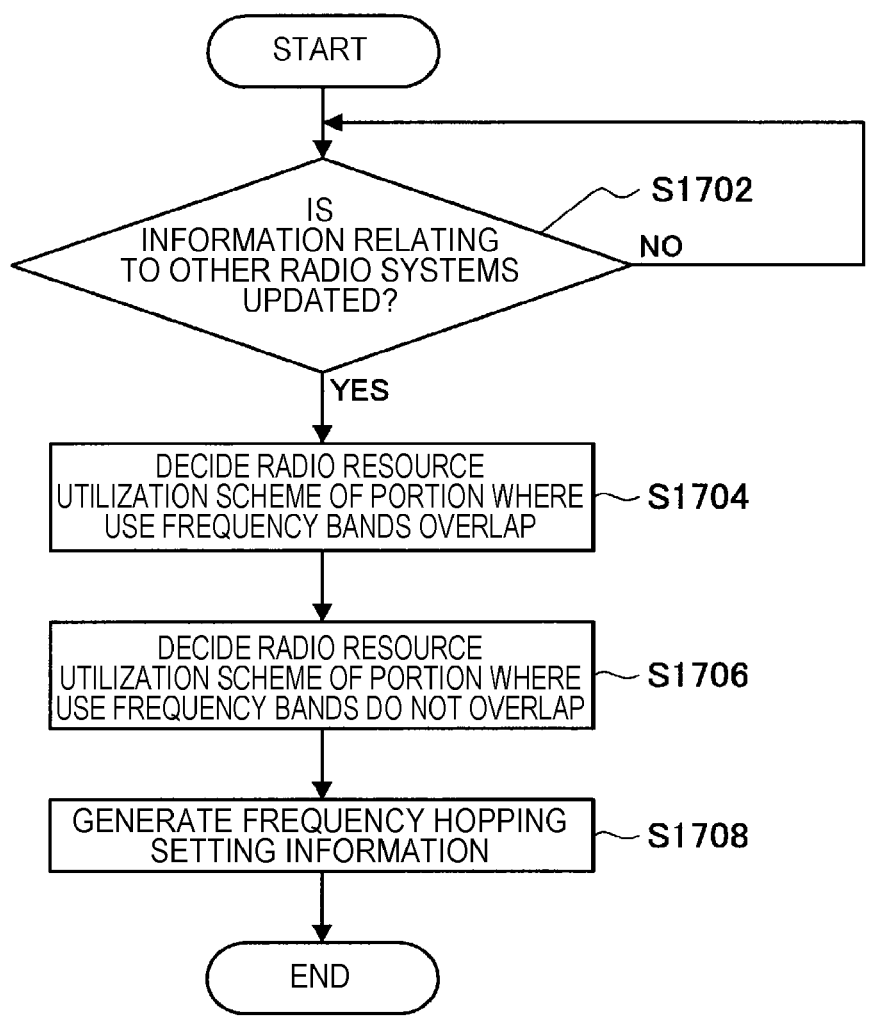
FIG. 51 is a flowchart illustrating an example of flow of frequency hopping setting information decision processing executed at the communication control device according to the present embodiment.

FIG. 51 is a flowchart illustrating an example of flow of the frequency hopping setting information decision processing executed at the communication control device 300 according to the present embodiment.

As illustrated in FIG. 51, first, in step S1702, the control unit 320 determines whether or not information relating to other radio systems is updated. For example, the control unit 320 inquires about whether or not the information is updated to the DB 400 via the communication unit 310.

In the case where it is determined that the information is not updated (S1702/No), the processing returns to step S1702.

On the other hand, in the case where it is determined that the information is updated (S1702/Yes), the processing proceeds to step S1704. Because the processing from steps S1704 to S1708 is the same as the processing from steps S1602 to S1606 described above with reference to FIG. 50, description will not be provided again.

In this manner, the frequency hopping setting information decision processing may be regularly executed. Other than above, the frequency hopping setting information decision processing may be triggered by an arbitrary event other than updating of the information. For example, the frequency hopping setting information determination processing may be executed by being triggered by determination that there are other radio systems 10 from the network information.

An example of the flow of the frequency hopping setting information decision processing has been described above.

In the frequency hopping setting information decision processing in the above-described steps S1602 (FIG. 50) and S1704 (FIG. 51), upon decision of the frequency hopping pattern, information of frequency hopping patterns utilized by other radio systems 10 can be taken into account. The frequency hopping pattern decision processing in such a case will be described below with reference to FIG. 52.

Figure 52:
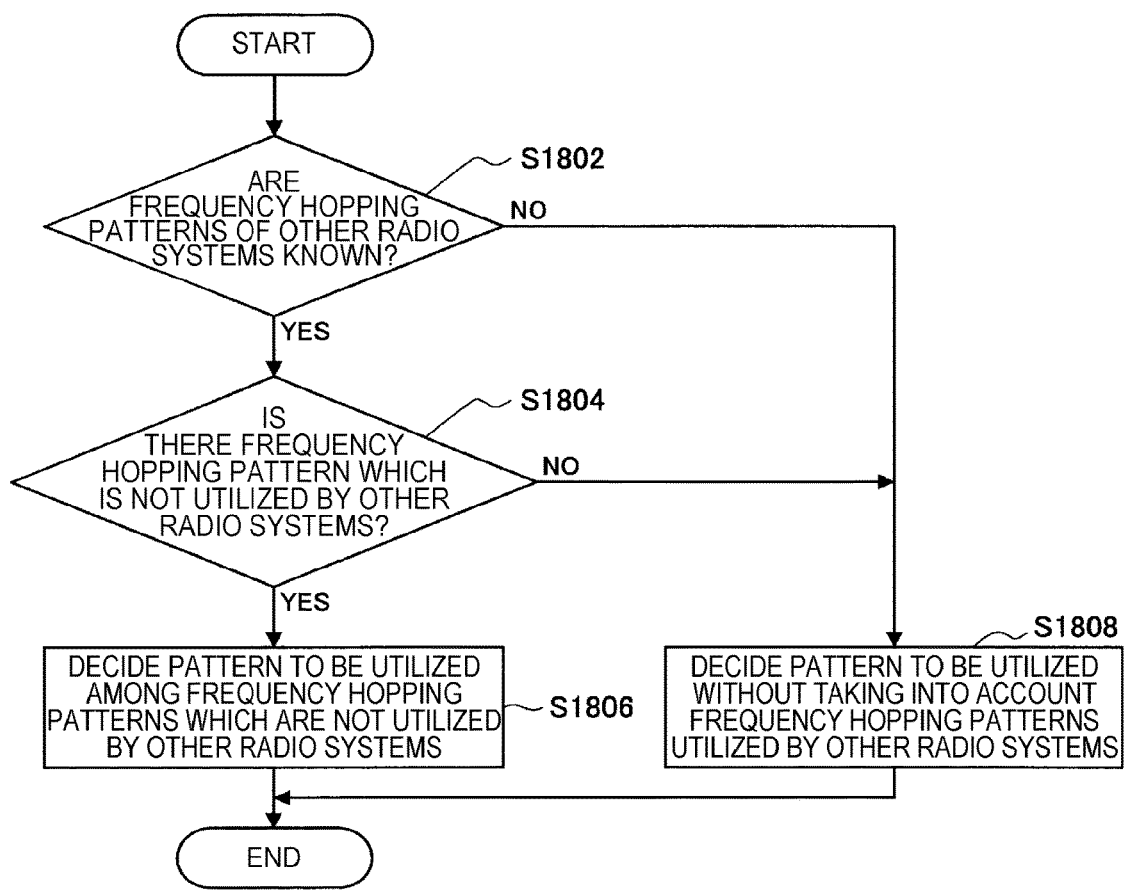
FIG. 52 is a flowchart illustrating an example of flow of frequency hopping pattern decision processing executed at the communication control device according to the present embodiment.

FIG. 52 is a flowchart illustrating an example of flow of frequency hopping pattern decision processing executed at the communication control device 300 according to the present embodiment.

As illustrated in FIG. 52, first, in step S1802, the control unit 320 determines whether or not frequency hopping patterns of other radio systems 10 are known. For example, the control unit 320 determines whether or not the frequency hopping patterns of other radio systems 10 are known with reference to the acquired network information.

In the case where the frequency hopping patterns are known (S1802/Yes), in step S1804, the control unit 320 determines whether or not there is a frequency hopping pattern which is not utilized by other radio systems 10.

In the case where there is a frequency hopping pattern which is not utilized (S1804/Yes), in step S1806, the control unit 320 decides a pattern to be utilized among frequency hopping patterns which are not utilized by other radio systems 10.

On the other hand, in the case where it is determined that the frequency hopping patterns of other radio systems 10 are not known (S1802/No), or in the case where although the frequency hopping patterns are known, there is no frequency hopping pattern which is not utilized (S1804/No), in step S1808, the control unit 320 decides a pattern to be utilized without taking into account the frequency hopping patterns utilized by other radio systems 10.

An example of the flow of the frequency hopping pattern decision processing has been described above.

3-8. DB Registration Information Registration Processing

Subsequently, registration processing of the DB registration information to be registered in the DB 400 according to the present embodiment will be described with reference to FIG. 53 and FIG. 54. First, registration processing of information indicating the frequency hopping pattern in the DB 400 will be described with reference to FIG. 53. This processing can take various forms. An example of the forms of the processing will be described below.

Figure 53:
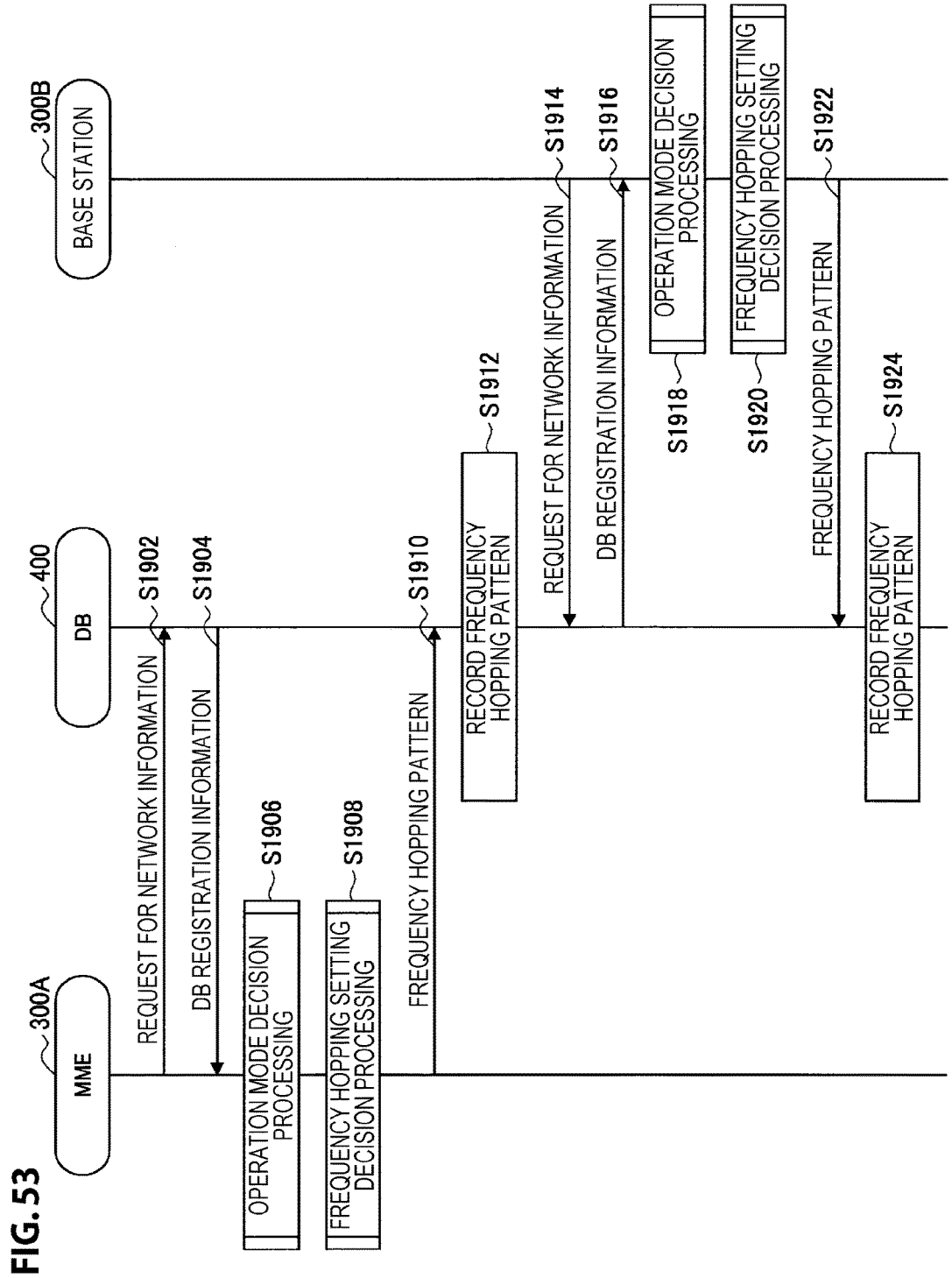
FIG. 53 is a sequence diagram illustrating an example of flow of DB registration information registration processing executed at the communication system according to the present embodiment.

FIG. 53 is a sequence diagram illustrating an example of flow of the DB registration information registration processing executed in the communication system 1 according to the present embodiment. As illustrated in FIG. 53, this sequence involves an MME 300A, the DB 400 and the base station 300B. The MME 300A and the base station 300B belong to different radio systems 10 and function as the communication control device 300 which is to control the radio systems 10 to which the MME 300A and the base station 300B respectively belong.

In steps S1902 to S1908, the MME 300A performs the processing similar to the processing from steps S202 to S208 described above with reference to FIG. 35.

After step S1908, in step S1910, the MME 300A transmits information indicating the frequency hopping pattern decided in step S1908 to the DB 400.

Then, in step S1912, the DB 400 registers the received information indicating the frequency hopping pattern. In this event, the DB 400 stores the received information indicating the frequency hopping pattern as the DB registration information of the radio system 10 to which the MME 300A which is a transmission source, belongs.

Subsequently, in steps S1914 to S1920, the base station 300B performs the processing similar to the processing from steps S202 to S208 described above with reference to FIG. 35. Here, the DB registration information received by the base station 300B in step S1916 includes the information indicating the frequency hopping pattern utilized by the radio system 10 to which the MME 300A belongs. Therefore, in the frequency hopping setting decision processing in step S1920, the base station 300B decides a frequency hopping pattern to be utilized among patterns other than the frequency hopping pattern utilized by the radio system 10 to which the MME 300A belongs.

Then, in step S1922, the base station 300B transmits information indicating the frequency hopping pattern decided in step S1920 to the DB 400.

Then, in step S1924, the DB 400 registers the received information indicating the frequency hopping pattern.

An example of the flow of the DB registration information registration processing has been described above.

The information indicating the frequency hopping pattern transmitted in the above-described steps S1910 and S1922 (FIG. 53) can change according to whether or not each radio system 10 performs frequency hopping. An example of processing of transmitting information indicating the frequency hopping pattern will be described below with reference to FIG. 54.

Figure 54:
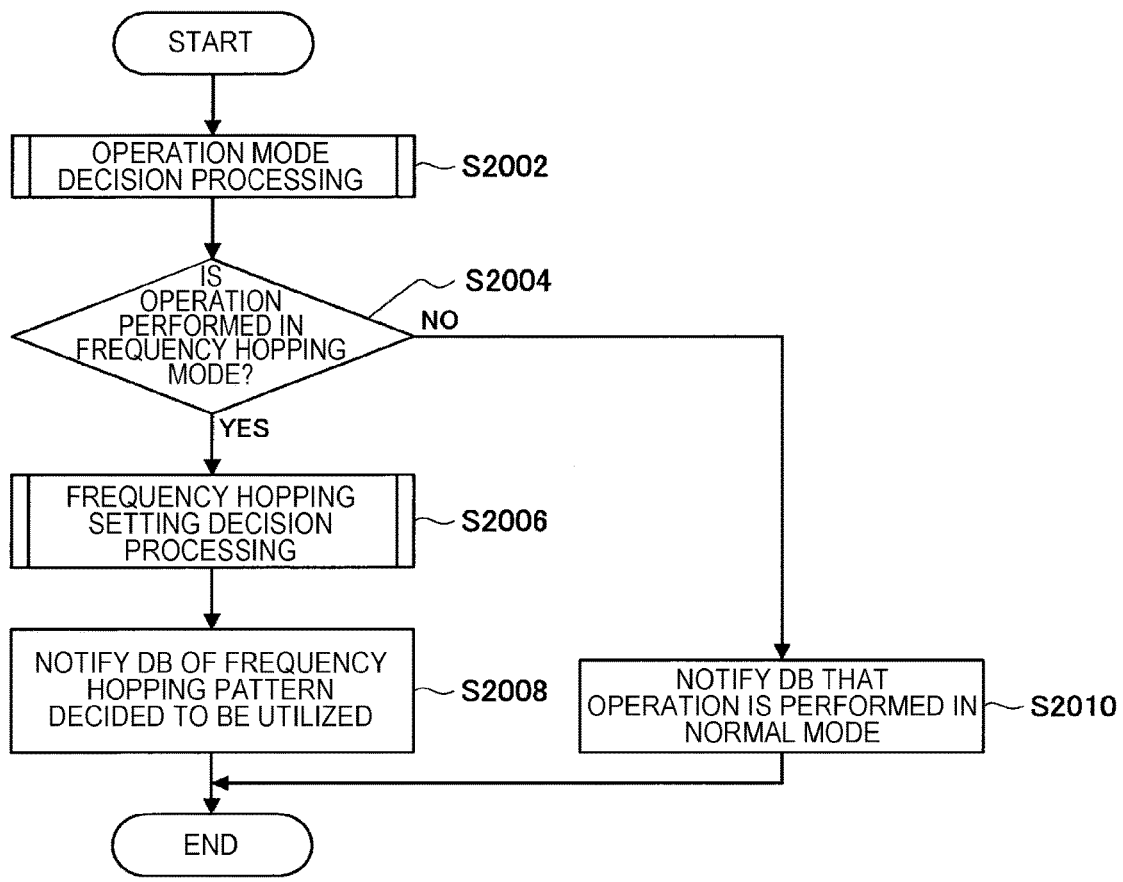
FIG. 54 is a flowchart illustrating an example of flow of processing of transmitting information indicating a frequency hopping pattern executed at the communication control device according to the present embodiment.

FIG. 54 is a flowchart illustrating an example of flow of the processing of transmitting information indicating the frequency hopping pattern executed at the communication control device 300 according to the present embodiment.

As illustrated in FIG. 54, first, in step S2002, the control unit 320 performs the operation mode decision processing.

Then, in step S2004, the control unit 320 determines whether or not operation is performed in the frequency hopping mode.

In the case where it is determined that operation is performed in the frequency hopping mode (S2004/Yes), in step S2006, the control unit 320 performs the frequency hopping setting decision processing.

Then, in step S2008, the communication unit 310 notifies the DB 400 of the information indicating the frequency hopping pattern decided to be utilized by the control unit 320 in step S2006.

On the other hand, in the case where it is determined that operation is not performed in the frequency hopping mode (S2004/No), in step S2010, the communication unit 310 notifies the DB 400 that operation is performed in the normal mode. Note that, in the case where the DB 400 is not notified of information indicating the frequency hopping pattern, and in the case where it is regarded that frequency hopping is not performed in the radio system 10, this step may be omitted.

An example of the processing of transmitting information indicating the frequency hopping pattern has been described above.

3-9. Transmission Setting Switching Processing

Subsequently, transmission setting switching processing by the transmitting station 200 according to the present embodiment will be described with reference to FIG. 55.

Figure 55:
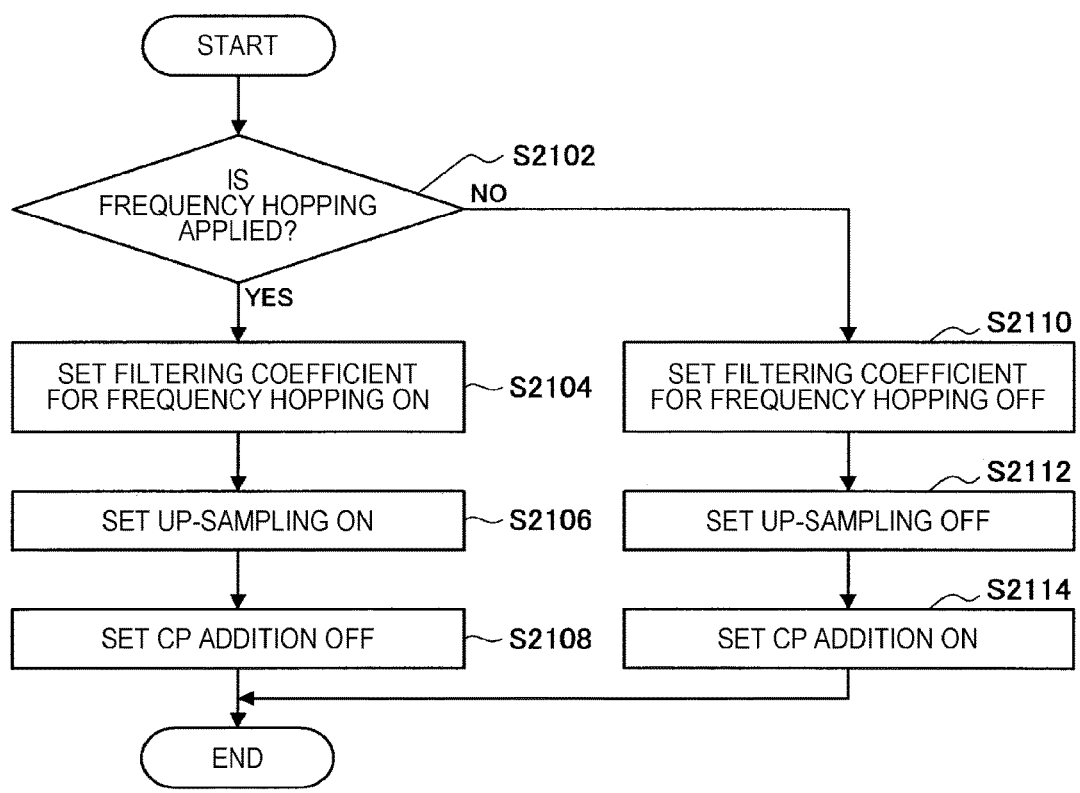
FIG. 55 is a flowchart illustrating an example of flow of transmission setting switching processing executed at a transmitting station according to the present embodiment.

FIG. 55 is a flowchart illustrating an example of flow of the transmission setting switching processing executed at the transmitting station 200 according to the present embodiment.

As illustrated in FIG. 55, first, in step S2102, the control unit 220 of the transmitting station 200 determines whether or not to apply frequency hopping. For example, the control unit 220 performs this determination with reference to the frequency hopping setting information notified from the communication control device 300.

In the case where it is determined to apply frequency hopping (S2102/Yes), the control unit 220 sets a filtering coefficient for frequency hopping ON (step S2104), sets up-sampling ON (step S2106) and sets CP addition OFF (step S2108).

On the other hand, in the case where it is determined not to apply frequency hopping (S2102/No), the control unit 220 sets a filtering coefficient for frequency hopping OFF (step S2110), sets up-sampling OFF (step S2112), and sets CP addition ON (step S2114). Note that the filtering coefficient for frequency hopping OFF may be a filtering coefficient for normal OFDM, for example, expressed in the above-described equation 2.

Note that, while, in this flow, the control unit 220 sets frequency hopping ON/OFF as determination criteria for ON/OFF of filtering and CP addition, the present technology is not limited to this example. For example, the control unit 220 may determine ON/OFF of filtering and CP addition according to, for example, whether or not there are other radio systems 10, described above as a determination criterion for ON/OFF of frequency hopping.

4. Application Examples

The technology of the present disclosure is applicable to various products. For example, the communication control device 300 may be realized as any type of server such as a tower server, a rack server, and a blade server. The communication control device 300 may be a control module (such as an integrated circuit module including a single die, and a card or a blade that is inserted into a slot of a blade server) mounted on a server.

For example, a receiving station 100 or a transmitting station 200 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the receiving station 100 or the transmitting station 200 may be realized as any other types of base stations such as a NodeB and a base transceiver station (BTS). The receiving station 100 or the transmitting station 200 may include a main body (that is also referred to as a base station device) configured to control radio communication, and one or more remote radio heads (RRH) disposed in a different place from the main body. Additionally, various types of terminals to be discussed later may also operate as the receiving station 100 or the transmitting station 200 by temporarily or semi-permanently executing a base station function.

For example, the receiving station 100 or the transmitting station 200 may be realized as a mobile terminal such as a smartphone, a tablet personal computer (PC), a notebook PC, a portable game terminal, a portable/dongle type mobile router, and a digital camera, or an in-vehicle terminal such as a car navigation device. The receiving station 100 or the transmitting station 200 may also be realized as a terminal (that is also referred to as a machine type communication (MTC) terminal) that performs machine-to-machine (M2M) communication. Furthermore, the receiving station 100 or the transmitting station 200 may be a wireless communication module (such as an integrated circuit module including a single die) mounted on each of the terminals.

4.1. Application Example Regarding Server

Figure 56:
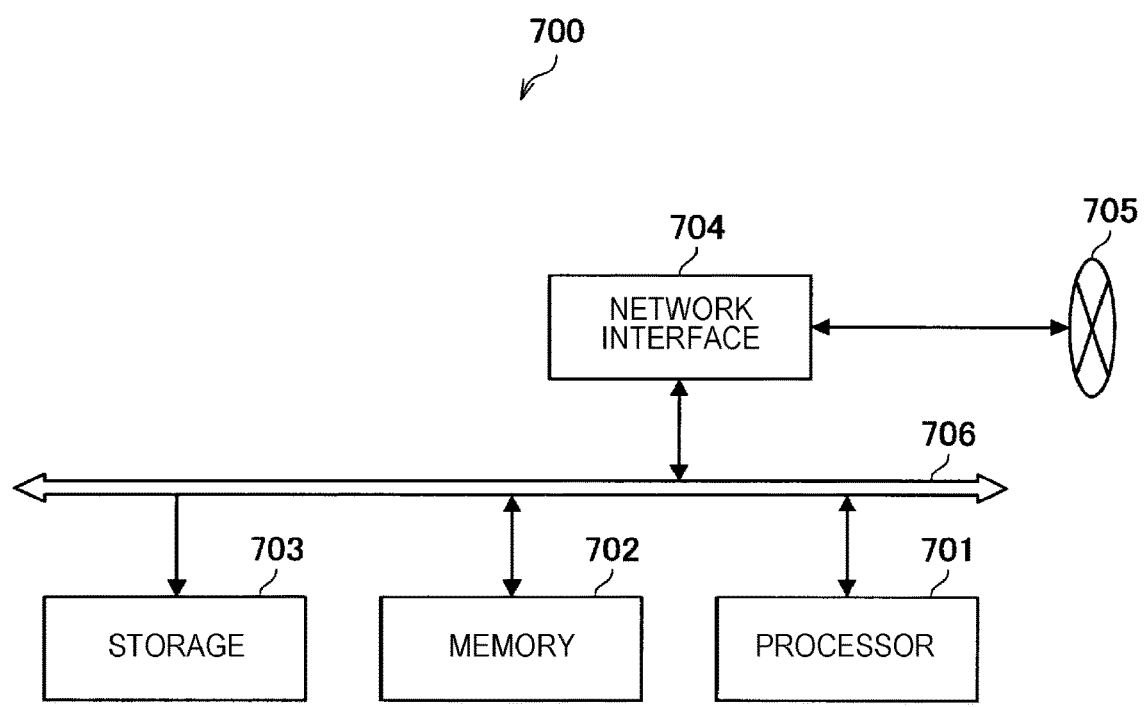
FIG. 56 is a block diagram illustrating an example of a schematic configuration of a server.

FIG. 56 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other.

The bus 706 may include two or more buses (such as a high speed bus and a low speed bus) each of which has different speed.

In the server 700 illustrated in FIG. 56, the communication unit 310 and the control unit 320 described using FIG. 18 may be implemented at the processor 701. For example, the server 700 can reduce interference with other radio systems 10 by the radio system 10 to be controlled by performing control such that frequency hopping is performed at the radio system 10 to be controlled.

4.2. Application Examples Regarding Base Stations

First Application Example

Figure 57:
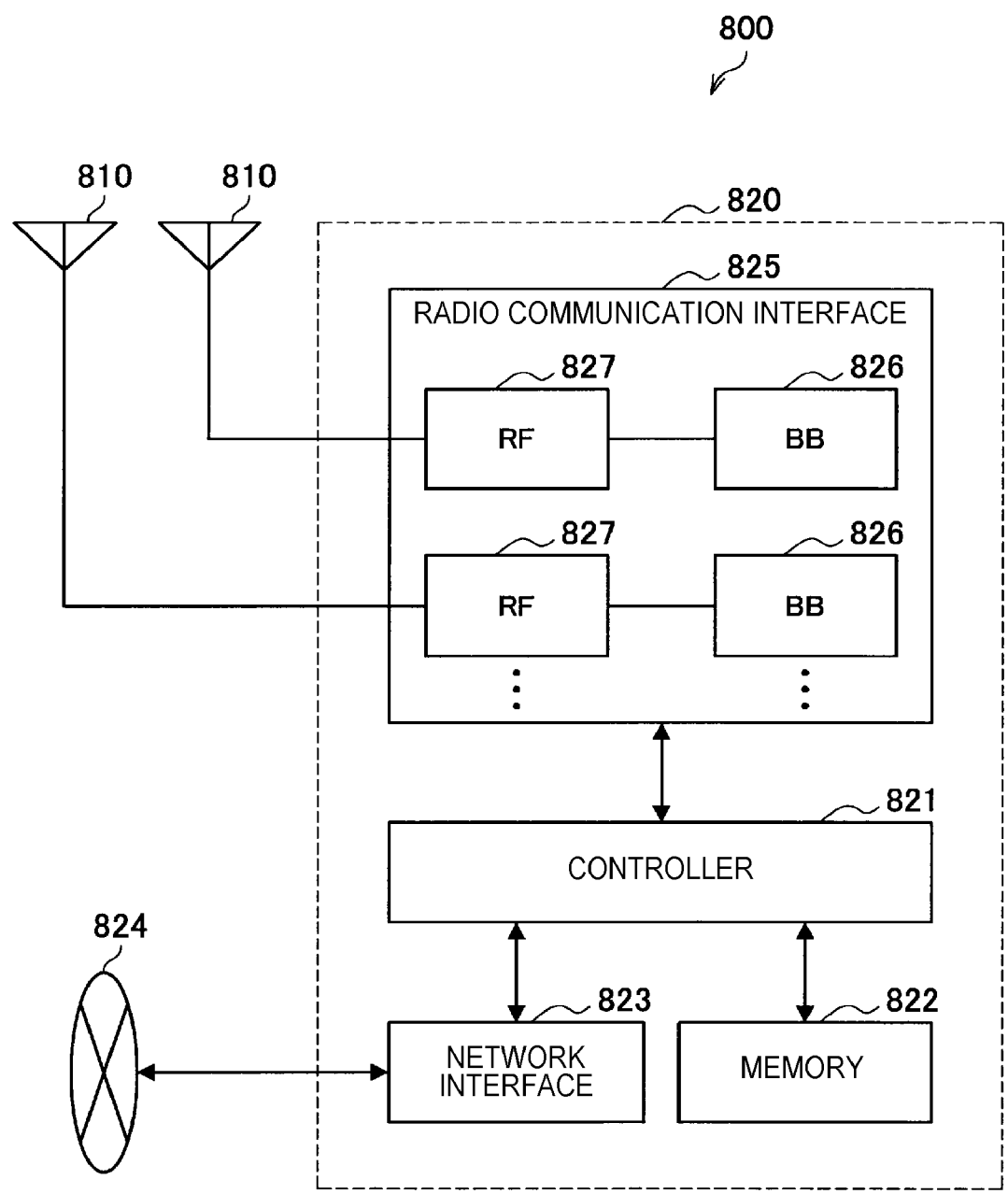
FIG. 57 is a block diagram illustrating a first example of a schematic configuration of an eNB.

FIG. 57 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 57. For example, the multiple antennas 810 may be compatible with multiple frequency bands used by the eNB 800. Although FIG. 57 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 57. For example, the multiple BB processors 826 may be compatible with multiple frequency bands used by the eNB 800. The radio communication interface 825 may include the multiple RF circuits 827, as illustrated in FIG. 57. For example, the multiple RF circuits 827 may be compatible with multiple antenna elements. Although FIG. 57 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 58:
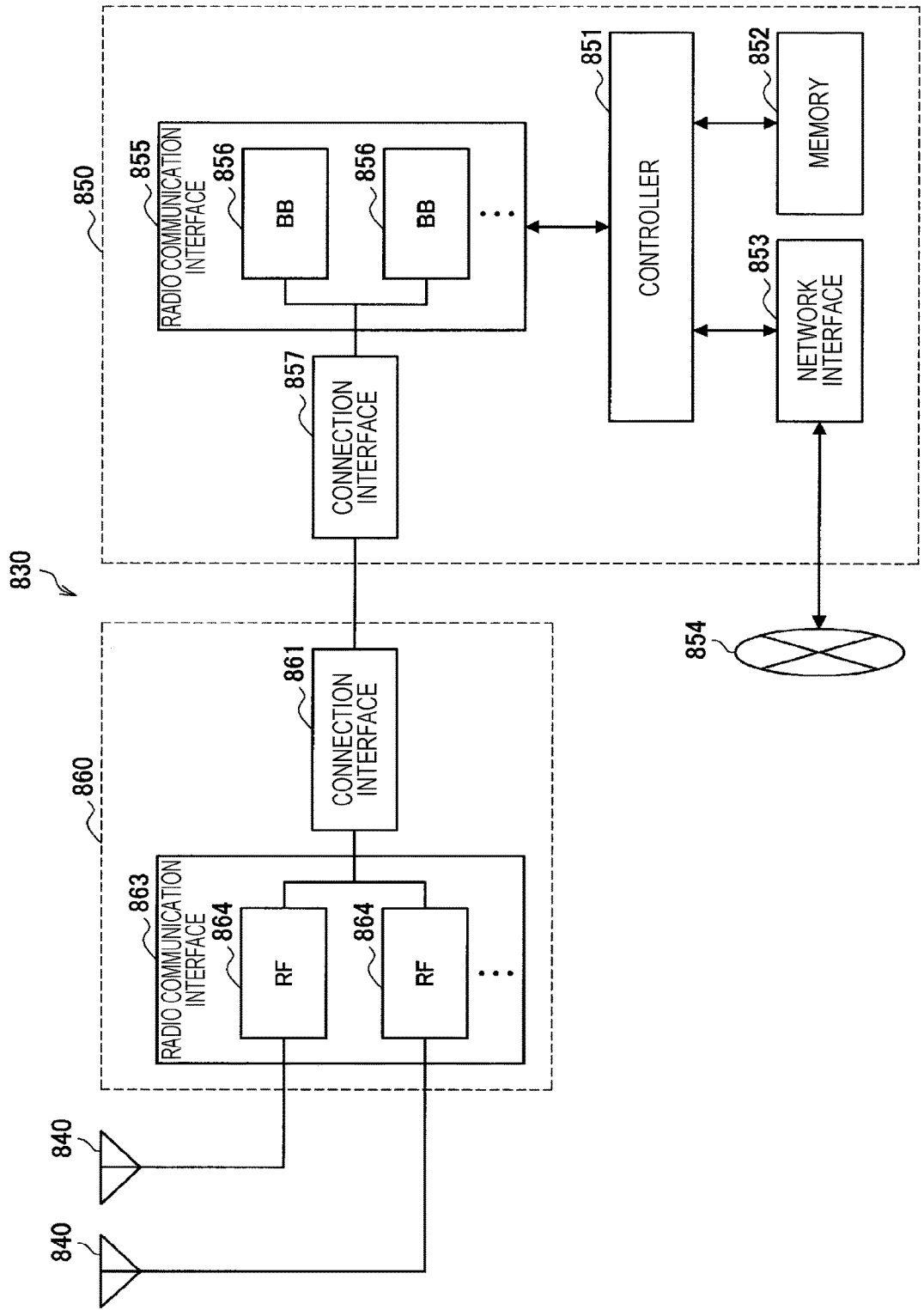
FIG. 58 is a block diagram illustrating a second example of the schematic configuration of the eNB.

FIG. 58 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 58. For example, the multiple antennas 840 may be compatible with multiple frequency bands used by the eNB 830. Although FIG. 58 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 57.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 57, except the BB processor 856 is connected to the RF circuit 864 of the RRH 860 via the connection interface 857. The radio communication interface 855 may include the multiple BB processors 856, as illustrated in FIG. 58. For example, the multiple BB processors 856 may be compatible with multiple frequency bands used by the eNB 830. Although FIG. 58 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 58. For example, the multiple RF circuits 864 may support multiple antenna elements. Although FIG. 58 illustrates the example in which the radio communication interface 863 includes the multiple RF circuits 864, the radio communication interface 863 may also include a single RF circuit 864.

In the eNB 800 and the eNB 830 illustrated in FIG. 57 and FIG. 58, the communication unit 210 and the control unit 220 described using FIG. 3 may be implemented at the radio communication interface 825 and the radio communication interface 855 and/or the radio communication interface 863. Further, at least part of these functions may be implemented at the controller 821 and the controller 851. For example, the eNB 800 and the eNB 830 can reduce interference with other radio systems 10 by transmitting data to the user terminal (receiving station 100) while performing frequency hopping based on an instruction from the communication control device 300.

Further, in the eNB 800 and the eNB 830 illustrated in FIG. 57 and FIG. 58, the communication unit 110 and the control unit 120 described using FIG. 2 may be implemented at the radio communication interface 825 and the radio communication interface 855 and/or the radio communication interface 863. Further, at least part of these functions may be implemented at the controller 821 and the controller 851. For example, the eNB 800 and the eNB 830 can receive data transmitted by the user terminal (transmitting station 200) while frequency hopping is performed so as to reduce interference with other radio systems 10 by receiving the data based on an instruction from the communication control device 300.

4.3. Application Examples Regarding Terminal Devices

First Application Example

Figure 59:
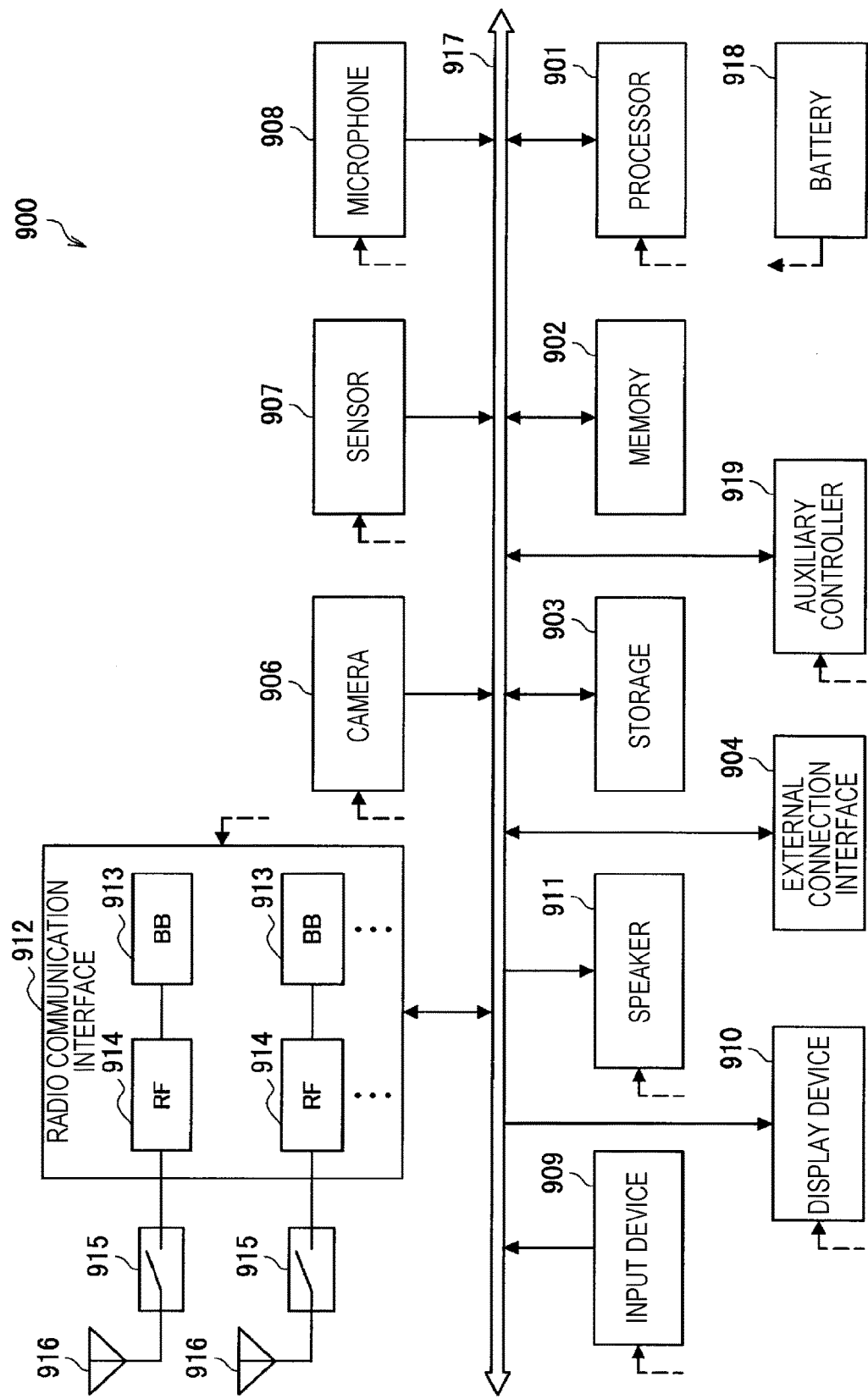
FIG. 59 is a block diagram illustrating an example of a schematic configuration of a smartphone.

FIG. 59 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 59. Although FIG. 59 illustrates the example in which the radio communication interface 913 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 59. Although FIG. 59 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 59 via feeder lines, which are partially shown as dashed lines in the figure. The auxiliary controller 919 operates a minimum necessary function of the smartphone 900, for example, in a sleep mode.

In the smartphone 900 illustrated in FIG. 59, the communication unit 110 and the control unit 120 described using FIG. 2 may be implemented at the radio communication interface 912. Further, at least part of these functions may be implemented at the processor 901 or the auxiliary controller 919. For example, the smartphone 900 can receive data transmitted by the base station (transmitting station 200) while frequency hopping is performed so as to reduce interference with other radio systems 10 by receiving the data based on an instruction from the communication control device 300.

Further, in the smartphone 900 illustrated in FIG. 59, the communication unit 210 and the control unit 220 described using FIG. 3 may be implemented at the radio communication interface 912. Further, at least part of these functions may be implemented at the processor 901 or the auxiliary controller 919. For example, the smartphone 900 can reduce interference with other radio systems 10 by transmitting data to the base station (receiving station 100) while performing frequency hopping based on an instruction from the communication control device 300.

Second Application Example

Figure 60:
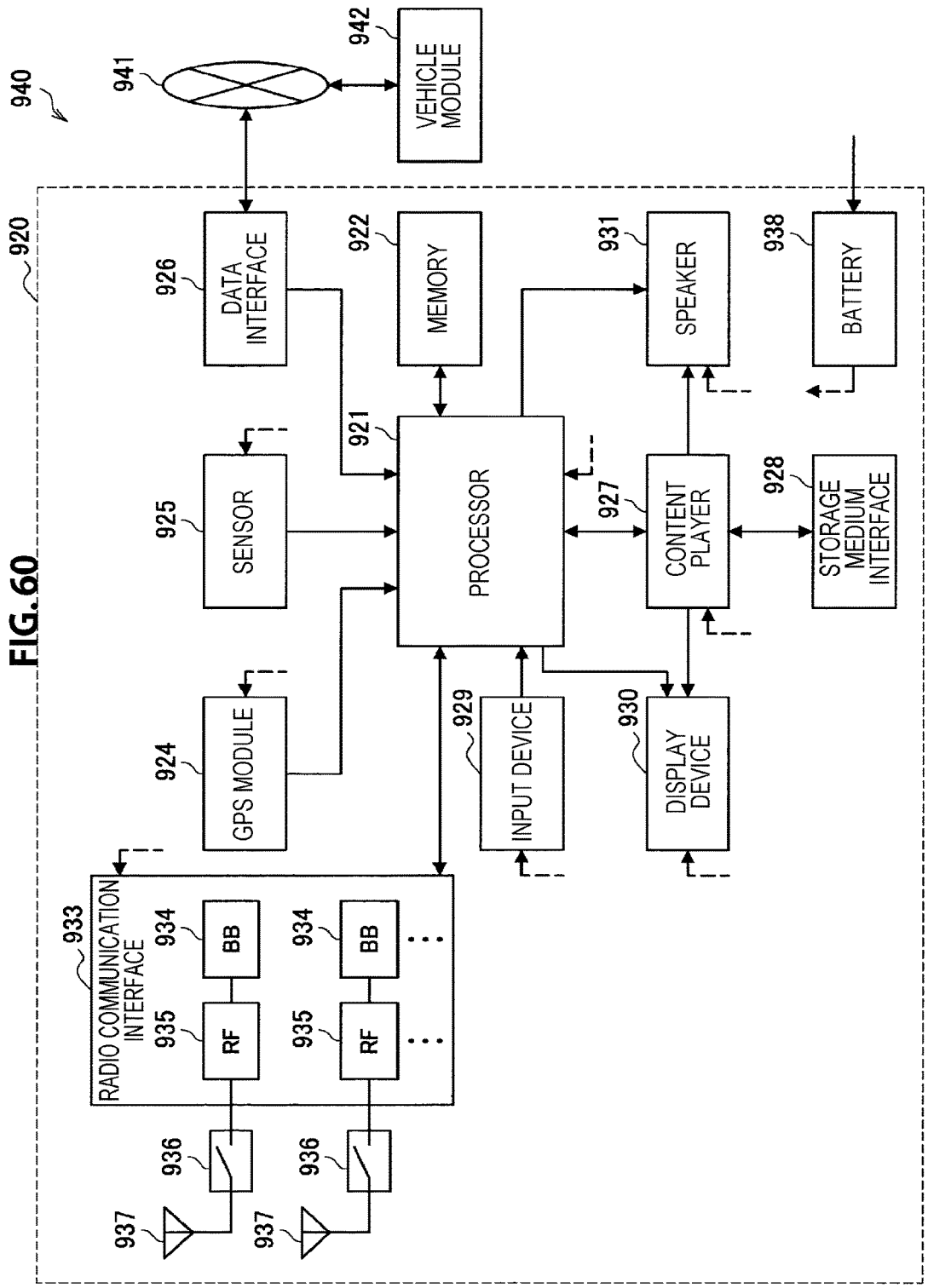
FIG. 60 is a block diagram illustrating an example of a schematic configuration of a car navigation device.

FIG. 60 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 60. Although FIG. 60 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 60. Although FIG. 60 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 60 via feeder lines that are partially shown as dashed lines in the figure. The battery 938 accumulates power supplied form the vehicle.

In the car navigation device 920 illustrated in FIG. 60, the communication unit 110 and the control unit 120 described using FIG. 2 may be implemented at the radio communication interface 933. Further, at least part of these functions may be implemented at the processor 921. For example, the car navigation device 920 can receive data transmitted by the base station (transmitting station 200) while frequency hopping is performed so as to reduce interference with other radio systems by receiving the data based on an instruction from the communication control device 300.

Further, in the car navigation device 920 illustrated in FIG. 60, the communication unit 210 and the control unit 220 described using FIG. 3 may be implemented at the radio communication interface 933. Further, at least part of these functions may be implemented at the processor 921. For example, the car navigation device 920 can reduce interference with other radio systems 10 by transmitting the data to the base station (receiving station 100) while performing frequency hopping based on an instruction from the communication control device 300.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

5. Conclusion

One embodiment of the present disclosure has been described in detail above with reference to FIG. 1 to FIG. 60. As described above, the communication control device 300 according to the present embodiment communicates with an apparatus belonging to the radio system 10 to be controlled and controls whether or not the transmitting station 200 belonging to the radio system 10 to be controlled performs frequency hopping based on the network information of other radio systems 10. For example, the communication control device 300 can reduce interference with other radio systems 10 by the radio system 10 to be controlled by deciding that frequency hopping is performed. Further, the communication control device 300 can maintain communication speed of the radio system 10 to be controlled by deciding that frequency hopping is not performed.

Further, the communication control device 300 according to the present embodiment controls whether or not the radio system 10 to be controlled performs frequency hopping based on priority of each radio system 10. By this means, in the present embodiment, it is possible to reduce interference with a radio system having higher priority, and it is possible to improve communication quality of the radio system 10 to be controlled.

Further, the communication control device 300 according to the present embodiment controls the radio system 10 to be controlled so that frequency hopping is performed in a frequency band overlapping with the use frequency bands of other radio systems 10. By this means, it is possible to reduce interference with other radio systems 10 by the radio system 10 to be controlled. Further, the radio system 10 to be controlled can utilize more radio resources while receiving interference from other radio systems 10.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A communication control device including:
a communication unit configured to communicate with an apparatus belonging to a first radio network; and
a control unit configured to control whether or not a radio communication apparatus belonging to the first radio network performs frequency hopping based on information of a second radio network different from the first radio network.

(2)
The communication control device according to (1),
wherein the control unit controls whether or not frequency hopping is performed based on priority of the second radio network.

(3)
The communication control device according to (1) or (2),
wherein the control unit decides that frequency hopping is performed in a frequency band overlapping with a frequency band utilized by the second radio network.

(4)
The communication control device according to any one of (1) to (3),
wherein the control unit decides a hopping pattern of frequency hopping performed by the radio communication apparatus belonging to the first radio network.

(5)
The communication control device according to (4),
wherein the control unit decides a hopping pattern different from a hopping pattern of frequency hopping performed by the second radio network.

(6)
The communication control device according to (4) or (5),
wherein hopping in a frequency direction is defined in the hopping pattern in a unit of at least any of a subcarrier unit, a resource block unit and a component carrier unit.

(7)
The communication control device according to any one of (4) to (6),
wherein hopping in a time direction is defined in the hopping pattern in a unit of at least any of a symbol unit, a slot unit and a subframe unit.

(8)
The communication control device according to any one of (1) to (7),
wherein the control unit controls whether or not frequency hopping is performed based on whether or not there is a possibility that the first radio network interferes with the second radio network.

(9)
The communication control device according to (8),
wherein the control unit determines that there is a possibility of interference in the case where there is a possibility that a frequency band utilized by the first radio network at least partially overlaps with a frequency band utilized by the second radio network.

(10)
The communication control device according to (9),
wherein the control unit determines whether or not the second radio network changes the use frequency band over time based on information of the second radio network.

(11)
The communication control device according to (10),
wherein the control unit determines that there is a possibility of overlapping in the case where the second radio network changes the use frequency band over time.

(12)
The communication control device according to (11),
wherein the control unit determines that there is a possibility of overlapping in the case where a direction in which the second radio network changes the use frequency band over time is a direction approaching the frequency band utilized by the first radio network.

(13)
The communication control device according to (11) or (12),
wherein the control unit determines that there is no possibility of overlapping in the case where a direction in which the second radio network changes the use frequency band over time is a direction away from the frequency band utilized by the first radio network.

(14)
The communication control device according to any one of (9) to (13),
wherein the control unit determines that there is a possibility of interference in the case where an operating location of the first radio network at least partially overlaps with an operating location of the second radio network.

(15)
The communication control device according to any one of (9) to (14),
wherein the control unit determines that there is a possibility of interference in the case where an operating time slot of the first radio network at least partially overlaps with an operating time slot of the second radio network.

(16)

The communication control device according to any one of (1) to (15), wherein the control unit controls whether or not frequency hopping is performed based on a ratio of overlapping between a frequency band utilized by the first radio network and a frequency band utilized by the second radio network.

(17)

The communication control device according to any one of (1) to (16), wherein the control unit decides that frequency hopping is performed in the case where it is required under law to acquire information of the second radio network.

(18)

The communication control device according to any one of (1) to (17), wherein the communication unit acquires information of the second radio network from a storage apparatus.

(19)

The communication control device according to any one of (1) to (18), wherein the communication unit acquires information of the second radio network from a sensor apparatus.

(20)

The communication control device according to any one of (1) to (19), wherein information of the second radio network includes information indicating priority of the second radio network.

(21)

The communication control device according to any one of (1) to (20), wherein information of the second radio network includes information relating to a frequency band utilized by the second radio network.

(22)

The communication control device according to any one of (1) to (21), wherein information of the second radio network includes information relating to a location where the second radio network is operated.

(23)

The communication control device according to any one of (1) to (22), wherein information of the second radio network includes information relating to a time slot in which the second radio network is operated.

(24)

The communication control device according to any one of (1) to (23), wherein the control unit controls the radio communication apparatus belonging to the first radio network to transmit data while performing frequency hopping.

(25)

The communication control device according to (24), wherein the control unit performs control so that information relating to frequency hopping performed by the radio communication apparatus belonging to the first radio network is transmitted to other radio communication apparatuses belonging to the first radio network.

(26)

The communication control device according to (25), wherein the information relating to the frequency hopping is broadcasted by the radio communication apparatus belonging to the first radio network.

(27)

The communication control device according to (25), wherein the information relating to the frequency hopping is unicasted by the radio communication apparatus belonging to the first radio network.

(28)

The communication control device according to (25), wherein the information relating to the frequency hopping is transmitted by the radio communication apparatus belonging to the first radio network using a control channel for each communication link.

(29)

The communication control device according to any one of (1) to (23), wherein the control unit controls other radio communication apparatuses belonging to the first radio network to receive data transmitted by the radio communication apparatus belonging to the first radio network while frequency hopping is performed, based on information relating to the frequency hopping.

(30)

The communication control device according to any one of (1) to (23), wherein the control unit controls a storage apparatus to store information of the second radio network.

(31)

The communication control device according to any one of (1) to (23), wherein the control unit controls a sensor apparatus configured to sense information of the second radio network to sense a frequency band wider than a frequency band utilized by the first radio network.

(32)

The communication control device according to (31), wherein the control unit controls the sensor apparatus to divide the frequency band into a plurality of bands and sense the bands.

(33)

A communication control method including:

communicating with an apparatus belonging to a first radio network; and controlling whether or not a radio communication apparatus belonging to the first radio network performs frequency hopping based on information of a second radio network different from the first radio network.

(34)

A program causing a computer to function as:

a communication unit configured to communicate with an apparatus belonging to a first radio network; and a control unit configured to control whether or not a radio communication apparatus belonging to the first radio network performs frequency hopping based on information of a second radio network different from the first radio network.

REFERENCE SIGNS LIST 1 communication system
10 radio system
100 receiving station
110 communication unit
120 control unit
200 transmitting station
210 communication unit
220 control unit
300 communication control device
310 communication unit 320 control unit
400 DB
410 communication unit
420 control unit
430 storage unit
500 sensor apparatus
510 communication unit
520 control unit
530 sensor unit
600 core network
700 communication network

The invention claimed is:

1. A communication control device comprising:
a communication unit implemented by circuitry and configured to communicate with a radio communication apparatus belonging to a first radio network; and
a control unit implemented by circuitry and configured to control whether the radio communication apparatus belonging to the first radio network performs a radio communication by frequency hopping or performs the radio communication without frequency hopping based on information of a second radio network different from the first radio network, the information of the second radio network including information relating to a frequency band utilized by the second radio network, a time slot in which the second radio network is operated, a priority ranking of the second radio network; and a location where the second radio network is operated, and the control unit controls the radio communication apparatus belonging to the first radio network to transmit data while performing the radio communication by frequency hopping.

2. The communication control device according to claim 1,
wherein the control unit decides that frequency hopping is performed in a frequency band overlapping with a frequency band utilized by the second radio network.

3. The communication control device according to claim 1,
wherein the control unit decides a hopping pattern of frequency hopping performed by the radio communication apparatus belonging to the first radio network.

4. The communication control device according to claim 3,
wherein the control unit decides a hopping pattern different from a hopping pattern of frequency hopping performed by the second radio network.

5. The communication control device according to claim 3,
wherein hopping in a frequency direction is defined in the hopping pattern in a unit of at least any of a subcarrier unit, a resource block unit and a component carrier unit.

6. The communication control device according to claim 3,
wherein hopping in a time direction is defined in the hopping pattern in a unit of at least any of a symbol unit, a slot unit and a subframe unit.

7. The communication control device according to claim 1,
wherein the control unit controls whether or not frequency hopping is performed based on whether or not there is a possibility that the first radio network interferes with the second radio network.

8. The communication control device according to claim 7,
wherein the control unit determines that there is a possibility of interference in the case where there is a possibility that a frequency band utilized by the first radio network at least partially overlaps with a frequency band utilized by the second radio network.

9. The communication control device according to claim 8,
wherein the control unit determines whether or not the second radio network changes the use frequency band over time based on information of the second radio network.

10. The communication control device according to claim 9,
wherein the control unit determines that there is a possibility of overlapping in the case where the second radio network changes the use frequency band over time.

11. The communication control device according to claim 10,
wherein the control unit determines that there is a possibility of overlapping in the case where a direction in which the second radio network changes the use frequency band over time is a direction approaching the frequency band utilized by the first radio network.

12. The communication control device according to claim 10,
wherein the control unit determines that there is no possibility of overlapping in the case where a direction in which the second radio network changes the use frequency band over time is a direction away from the frequency band utilized by the first radio network.

13. The communication control device according to claim 8,
wherein the control unit determines that there is a possibility of interference in the case where an operating location of the first radio network at least partially overlaps with an operating location of the second radio network.

14. The communication control device according to claim 8,
wherein the control unit determines that there is a possibility of interference in the case where an operating time slot of the first radio network at least partially overlaps with an operating time slot of the second radio network.

15. The communication control device according to claim 1,
wherein the control unit controls whether or not frequency hopping is performed based on a ratio of overlapping between a frequency band utilized by the first radio network and a frequency band utilized by the second radio network.

16. The communication control device according to claim 1,
wherein the control unit decides that frequency hopping is performed in the case where it is required under law to acquire information of the second radio network.

17. The communication control device according to claim 1,
wherein the communication unit acquires information of the second radio network from a storage apparatus.

18. The communication control device according to claim 1,
wherein the communication unit acquires information of the second radio network from a sensor apparatus.

19. The communication control device according to claim 1,
wherein the control unit controls other radio communication apparatuses belonging to the first radio network to receive data transmitted by the radio communication apparatus belonging to the first radio network while frequency hopping is performed, based on information relating to the frequency hopping.

20. The communication control device according to claim 1, wherein the control unit controls a storage apparatus to store information of the second radio network.

21. The communication control device according to claim 1, wherein the control unit controls a sensor apparatus configured to sense information of the second radio network to sense a frequency band wider than a frequency band utilized by the first radio network.

22. The communication control device according to claim 21, wherein the control unit controls the sensor apparatus to divide the frequency band into a plurality of bands and sense the bands.

23. The communication control device according to claim 1, wherein the priority ranking corresponds to a spectrum access for a predetermined frequency band.

24. A communication control method comprising:
communicating with a radio communication apparatus belonging to a first radio network;
controlling whether the radio communication apparatus belonging to the first radio network performs a radio communication by frequency hopping or performs the radio communication without frequency hopping based on information of a second radio network different from the first radio network, the information of the second radio network including information relating to a frequency band utilized by the second radio network, a time slot in which the second radio network is operated, a priority ranking of the second radio network, and a location where the second radio network is operated; and
controlling the radio communication apparatus belonging to the first radio network to transmit data while performing the radio communication by frequency hopping.

* * * * *